United States Patent
Takahashi et al.

(10) Patent No.: US 12,355,305 B2
(45) Date of Patent: Jul. 8, 2025

(54) ROTATING ELECTRICAL MACHINE

(71) Applicant: DENSO CORPORATION, Kariya (JP)

(72) Inventors: Yuki Takahashi, Kariya (JP); Aki Fukuhara, Kariya (JP)

(73) Assignee: DENSO CORPORATION, Kariya (JP)

(*) Notice: Subject to any disclaimer, the term of this patent is extended or adjusted under 35 U.S.C. 154(b) by 507 days.

(21) Appl. No.: 17/739,887

(22) Filed: May 9, 2022

(65) Prior Publication Data
US 2022/0294290 A1 Sep. 15, 2022

Related U.S. Application Data

(63) Continuation of application No. PCT/JP2020/041134, filed on Nov. 3, 2020.

(30) Foreign Application Priority Data

Nov. 7, 2019 (JP) .................. 2019-202680

(51) Int. Cl.
*H02K 1/2783* (2022.01)
*H02P 6/182* (2016.01)
*H02P 25/22* (2006.01)

(52) U.S. Cl.
CPC ........... *H02K 1/2783* (2022.01); *H02P 6/182* (2013.01); *H02P 25/22* (2013.01); *H02K 2213/03* (2013.01)

(58) Field of Classification Search
CPC ............. H02K 1/2783; H02K 2213/03; H02K 1/2792; H02K 3/522; H02K 21/22; H02K 5/225; H02P 6/182; H02P 25/22
See application file for complete search history.

(56) References Cited

U.S. PATENT DOCUMENTS

| 6,229,241 B1 | 5/2001 | Ishigami et al. |
| 2002/0180295 A1* | 12/2002 | Kaneda ................ H02K 1/2783 |
| | | 310/156.43 |
| 2014/0125182 A1 | 5/2014 | Takahashi |

(Continued)

FOREIGN PATENT DOCUMENTS

| JP | H07-59314 A | 3/1995 |
| JP | 2002-064028 A | 2/2002 |

(Continued)

*Primary Examiner* — Christopher M Koehler
*Assistant Examiner* — Riley Owen Stout
(74) *Attorney, Agent, or Firm* — Oliff PLC

(57) ABSTRACT

A rotating electrical machine equipped with a magnetic field-producing unit which includes a magnet unit having magnets each of which has easy axes of magnetization oriented to extend linearly parallel to each other and defines a plurality of magnetic paths along the easy axes of magnetization. The magnets are discrete from each other through a d-axis defined on the center of the magnetic pole and a q-axis defined on a magnetic boundary between the magnetic poles. The magnets are configured to have a back electromotive force constant which is higher than that of parallel-oriented magnets when an angle of rotation of the rotor lies in a first angle range including the gravity center of the magnets. The parallel-oriented magnets are designed to have magnetic paths which are different from those of the magnets of the magnet unit and oriented along easy axes of magnetization extending linearly parallel to the d-axis.

15 Claims, 41 Drawing Sheets

(56) References Cited

U.S. PATENT DOCUMENTS

| | | | |
|---|---|---|---|
| 2020/0161939 A1 | 5/2020 | Takahashi et al. |
| 2020/0162003 A1 | 5/2020 | Takahashi et al. |
| 2020/0328639 A1 | 10/2020 | Takahashi |
| 2020/0336033 A1 | 10/2020 | Takahashi |

FOREIGN PATENT DOCUMENTS

| | | |
|---|---|---|
| JP | 2002-272066 A | 9/2002 |
| JP | 2012-109101 A | 6/2012 |
| JP | 2013-031336 A | 2/2013 |
| JP | 2013-122849 A | 6/2013 |
| JP | 2015-128355 A | 7/2015 |
| JP | 2017-131046 A | 7/2017 |
| JP | 2019106864 A | 6/2019 |
| JP | 2019-122236 A | 7/2019 |
| JP | 2019-122242 A | 7/2019 |
| WO | 2008/093645 A1 | 8/2008 |

\* cited by examiner

COMPARATIVE EXAMPLE

ROTATING ELECTRICAL MACHINE

CROSS REFERENCE TO RELATED DOCUMENT

The present application claims the benefit of priority of Japanese Patent Applications No. 2019-202680 filed on Nov. 7, 2019, the disclosure of which is incorporated in its entirety herein by reference.

TECHNICAL FIELD

This disclosure generally relates to a rotating electrical machine.

BACKGROUND

In the past, rotating electrical machines, such as taught in patent literature 1, have been proposed which are equipped with magnets magnetically oriented to have substantially arc-shaped magnetic paths. Such a type of magnetic paths serve to improve the density of magnetic flux around the d-axis or enhance the degree of torque outputted by the rotating electrical machines.

PRIOR ART DOCUMENT

Patent Literature

PATENT LITERATURE 1 Japanese Patent First Publication No. 2019-106864

SUMMARY OF THE INVENTION

The above magnets enhance the output torque, but face a difficulty in creating arc-shaped magnetic paths in the magnets.

This disclosure was made in view of the above problem. It is an object of this disclosure to provide a rotating electrical machine which is capable of enhancing an output torque and facilitates the ease with which magnets are produced.

Various exemplary aspects disclosed in this specification respectively use different technical means for achieving their objects. The objects, features, and beneficial advantages in this specification will be apparent from the following detailed descriptions and the appended drawings.

In order to solve the above problem, the first means is to provide a rotating electrical machine comprising: (a) magnetic field-producing unit including a magnet unit which is equipped with a plurality of magnetic poles whose polarities alternate in a circumferential direction of the magnet unit; (b) an armature which includes a multi-phase armature winding; and (c) a rotor which is implemented by one of the magnetic field-producing unit and the armature. The magnet unit includes magnets each of which has a plurality of easy axes of magnetization oriented to extend linearly parallel to each other. The easy axes of magnetization define a plurality of magnetic paths extending therealong. The magnets of the magnet unit are discrete from each other through a d-axis defined on the center of the magnetic pole and a q-axis defined on a magnetic boundary between the magnetic poles. The magnets of the magnet unit are configured to have a back electromotive force constant which is higher than that of parallel-oriented magnets when an angle of rotation of the rotor lies in a first angle range including a gravity center of the magnets. The parallel-oriented magnets are designed to have magnetic paths which are different from those of the magnets of the magnet unit and oriented along easy axes of magnetization extending linearly parallel to the d-axis.

The above structure, therefore, serves to enhance the density of magnetic flux near the d-axis which is higher than that in the parallel-oriented magnets, thereby resulting in an increased degree of torque outputted by the rotating electrical machine and facilitating production of the magnets as compared with magnets oriented to have arc-shaped easy axes of magnetization.

The second means is to provide a rotating electrical machine which comprises: (a) a magnetic field-producing unit including a magnet unit which is equipped with a plurality of magnetic poles whose polarities alternate in a circumferential direction of the magnet unit; (b) an armature which includes a multi-phase armature winding; and (c) a rotor which is implemented by one of the magnetic field-producing unit and the armature. The magnet unit includes magnets each of which has a plurality of easy axes of magnetization oriented to extend linearly parallel to each other. The easy axes of magnetization define a plurality of magnetic paths extending therealong. The magnets of the magnet unit are discrete from each other through a d-axis defined on the center of the magnetic pole and a q-axis defined on a magnetic boundary between the magnetic poles. The magnets of the magnet unit are configured to have a back electromotive force constant which is higher than that of Halbach array magnets when an angle of rotation of the rotor lies in a second angle range including a gravity center of the magnets. The Halbach array magnets are designed to have magnetic paths different from those in the magnets of the magnet unit.

The above structure, therefore, serves to enhance the density of magnetic flux near the d-axis which is higher than that in the Halbach array magnets thereby resulting in an increased degree of torque outputted by the rotating electrical machine and facilitating production of the magnets as compared with magnets oriented to have arc-shaped easy axes of magnetization.

The third means is to provide the rotating electrical machine, as set forth in the first or second means, wherein the magnets are configured to have the back electromotive force constant which has a peak value when the angle of rotation of the rotor matches the gravity center of the magnets of the magnet unit.

The above structure results in density of magnetic flux near the d-axis which is the highest among magnets whose easy axes of magnetization are oriented linearly parallel to each other, thereby enhancing the degree of torque outputted by the rotating electrical machine.

The fourth means is to provide a rotating electrical machine which comprises: (a) a magnetic field-producing unit including a magnet unit which is equipped with a plurality of magnetic poles whose polarities alternate in a circumferential direction of the magnet unit; (b) an armature which includes a multi-phase armature winding; and (c) a rotor which is implemented by one of the magnetic field-producing unit and the armature. The magnet unit includes magnets each of which has a plurality of easy axes of magnetization oriented to extend linearly parallel to each other. The easy axes of magnetization define a plurality of magnetic paths extending therealong. The magnets of the magnet unit are discrete from each other through a d-axis defined on a center of the magnetic pole and a q-axis defined on a magnetic boundary between the magnetic poles. Each of the easy axes of magnetization of the magnets is oriented to extend parallel to a tangent line. The tangent line is a straight line touching a circle at the gravity center of a corresponding one of the magnets. The circle is defined around the center defined on the q-axis on a plane extending along an armature facing peripheral surface that is a peripheral surface of a corresponding one of the magnets which faces the armature.

The above structure of the magnets provides the back electromotive force constant which has a peak value when an angle of rotation of the rotor coincides with the center of gravity of the magnets. This results in density of magnetic flux closer to the d-axis than to the q-axis which is the highest among magnets whose easy axes of magnetization are oriented linearly parallel to each other, thereby enhancing the degree of torque outputted by the rotating electrical machine 10 and facilitating the ease of production of the magnets as compared with magnets oriented to have arc-shaped easy axes of magnetization.

The fifth means is to provide the rotating electrical machine, as set forth in any one of the first to fourth means, wherein each of the magnets has a chamfered corner that is at least one of a first corner which is located close to the q-axis and faces the armature and a second corner which is located close to the d-axis and faces away from the armature. The chamfered corner has a flat surface which extends along the easy axes of magnetization.

Each magnet has a corner which is located close to the q-axis and faces the armature or close to the d-axis and faces away from the armature and in which the magnetic path has a length shorter than in another region in the corresponding magnet, thus facilitating the ease of demagnetization of the above corner. In order to alleviate such a drawback, each magnet has the above structure, thereby minimizing a risk that the density of magnetic flux around the d-axis may be reduced, which enables the volume of material of each magnet to be decreased.

The sixth means is to provide the rotating electrical machine as set forth in any one of the first to fourth means, wherein each of the magnets has a q-axis facing end surface and a d-axis facing end surface at least one of which is shaped to be flat along the easy axes of magnetization.

Each magnet has a corner which is located close to the q-axis and faces the armature or close to the d-axis and faces away from the armature and in which the magnetic path has a length shorter than in another region in the corresponding magnet, thus facilitating the ease of demagnetization of the above corner. In order to alleviate such a drawback, each magnet has the above structure, thereby minimizing a risk that the density of magnetic flux around the d-axis may be reduced, which enables the volume of material of each magnet to be decreased.

BRIEF DESCRIPTION OF THE DRAWINGS

The above-described object, and other objects, features, or beneficial advantages in this disclosure will be apparent from the appended drawings or the following detailed discussion.

In the drawings.

EMBODIMENTS FOR CARRYING OUT THE INVENTION

Figure 1:
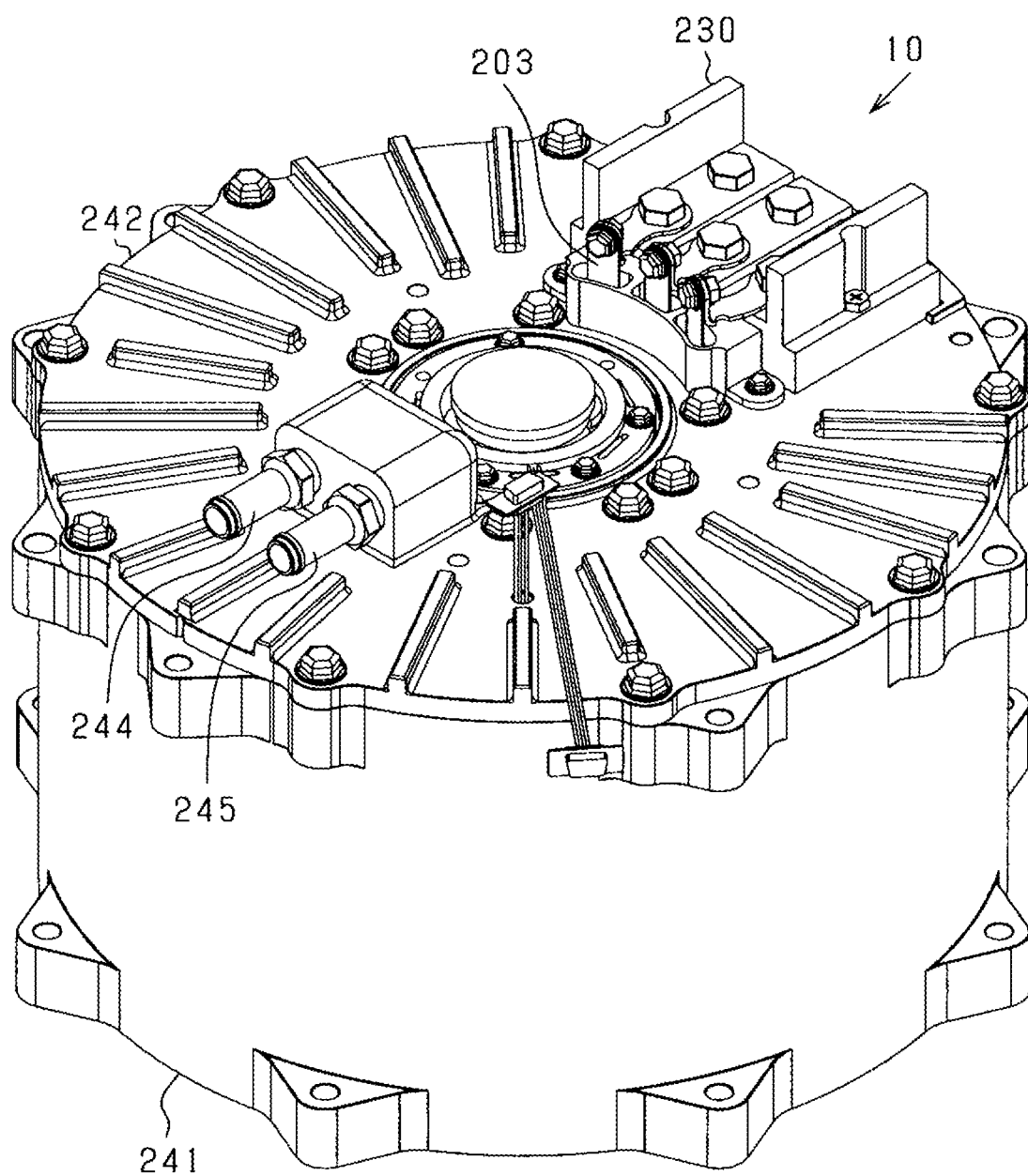
FIG. 1 is a perspective view which illustrates a whole structure of a rotating electrical machine according to the first embodiment.

The embodiments will be described below with reference to the drawings. Parts of the embodiments functionally or structurally corresponding to each other or associated with each other will be denoted by the same reference numbers or by reference numbers which are different in the hundreds place from each other. The corresponding or associated parts may refer to the explanation in the other embodiments.

The rotating electrical machine in the embodiments is configured to be used, for example, as a power source for vehicles. The rotating electrical machine may, however, be used widely for industrial, automotive, domestic, office automation, or gaming applications. In the following embodiments, the same or equivalent parts will be denoted by the same reference numbers in the drawings, and explanation thereof in detail will be omitted.

First Embodiment

Figure 2:
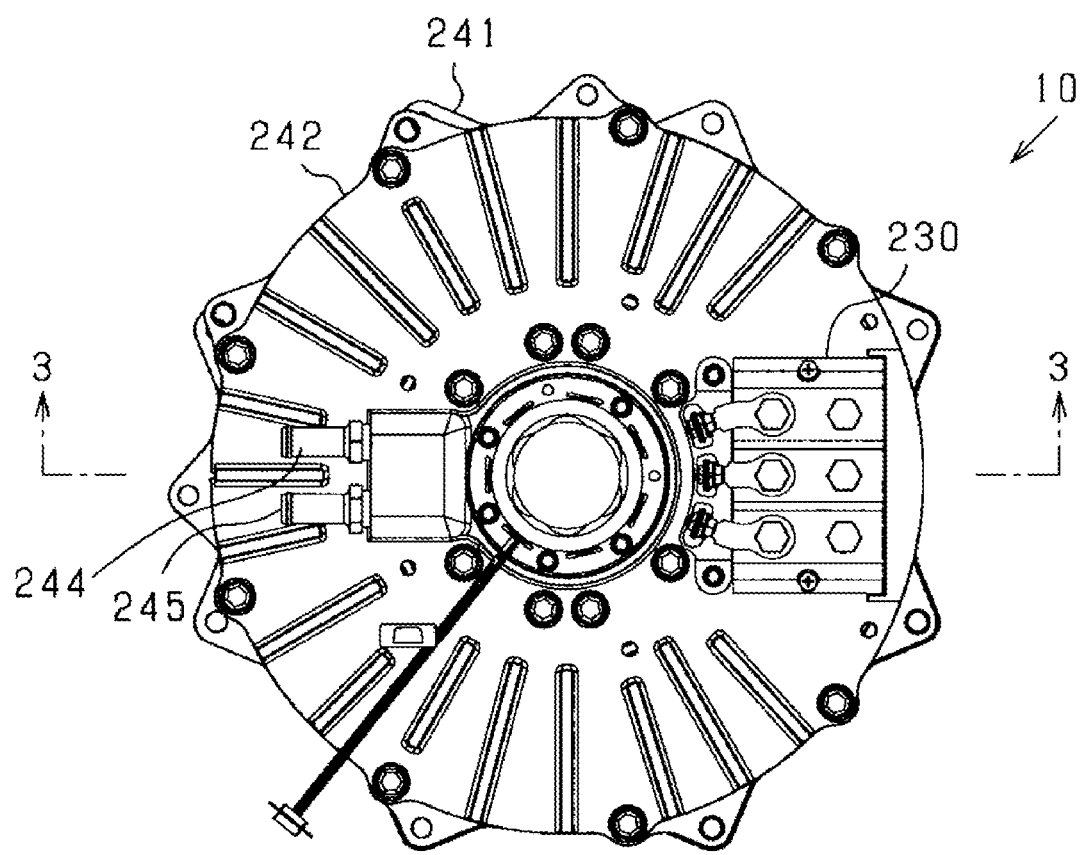
FIG. 2 is a plan view of a rotating electrical machine.
Figure 3:
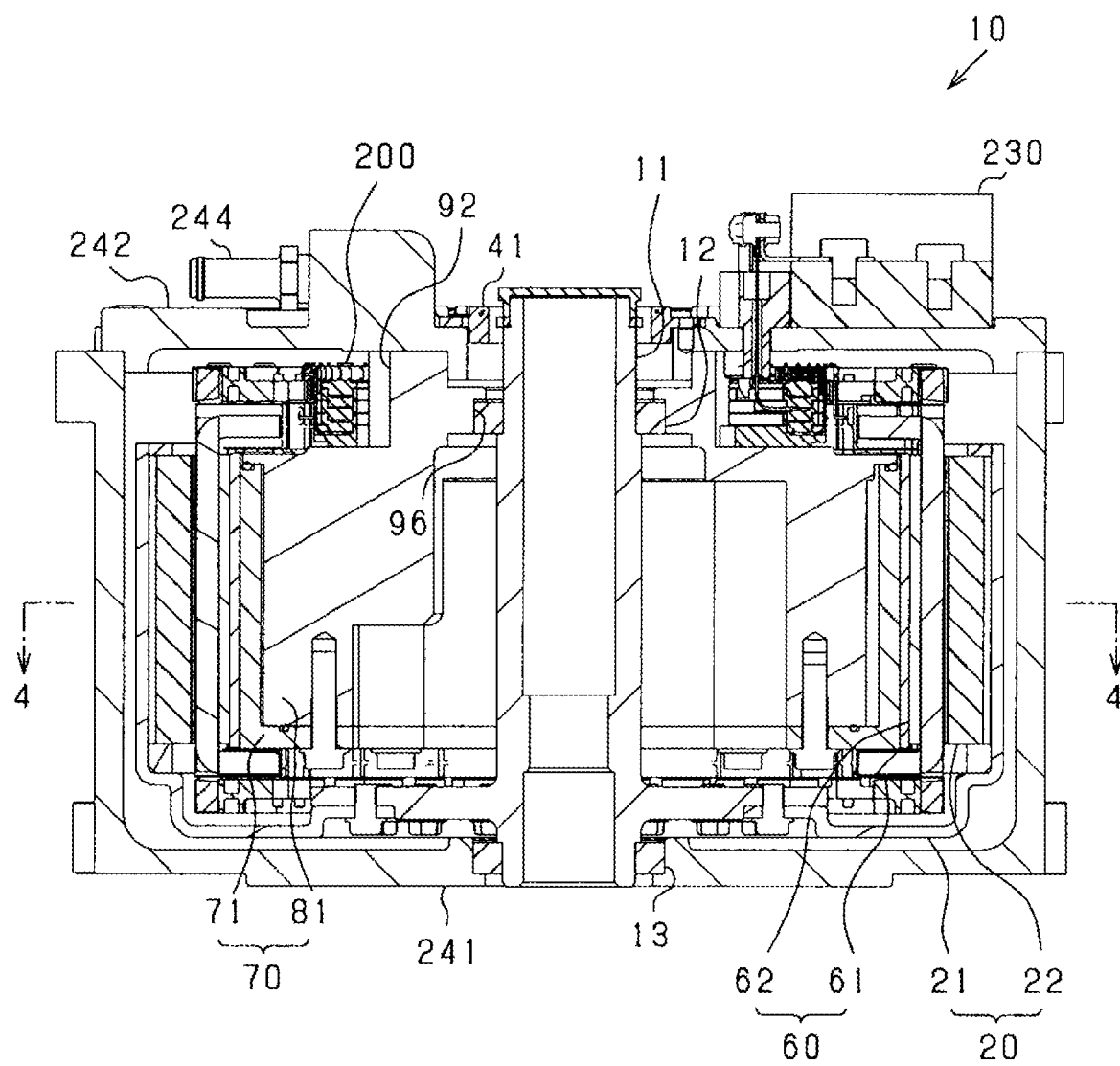
FIG. 3 is a longitudinal sectional view of a rotating electrical machine.
Figure 4:
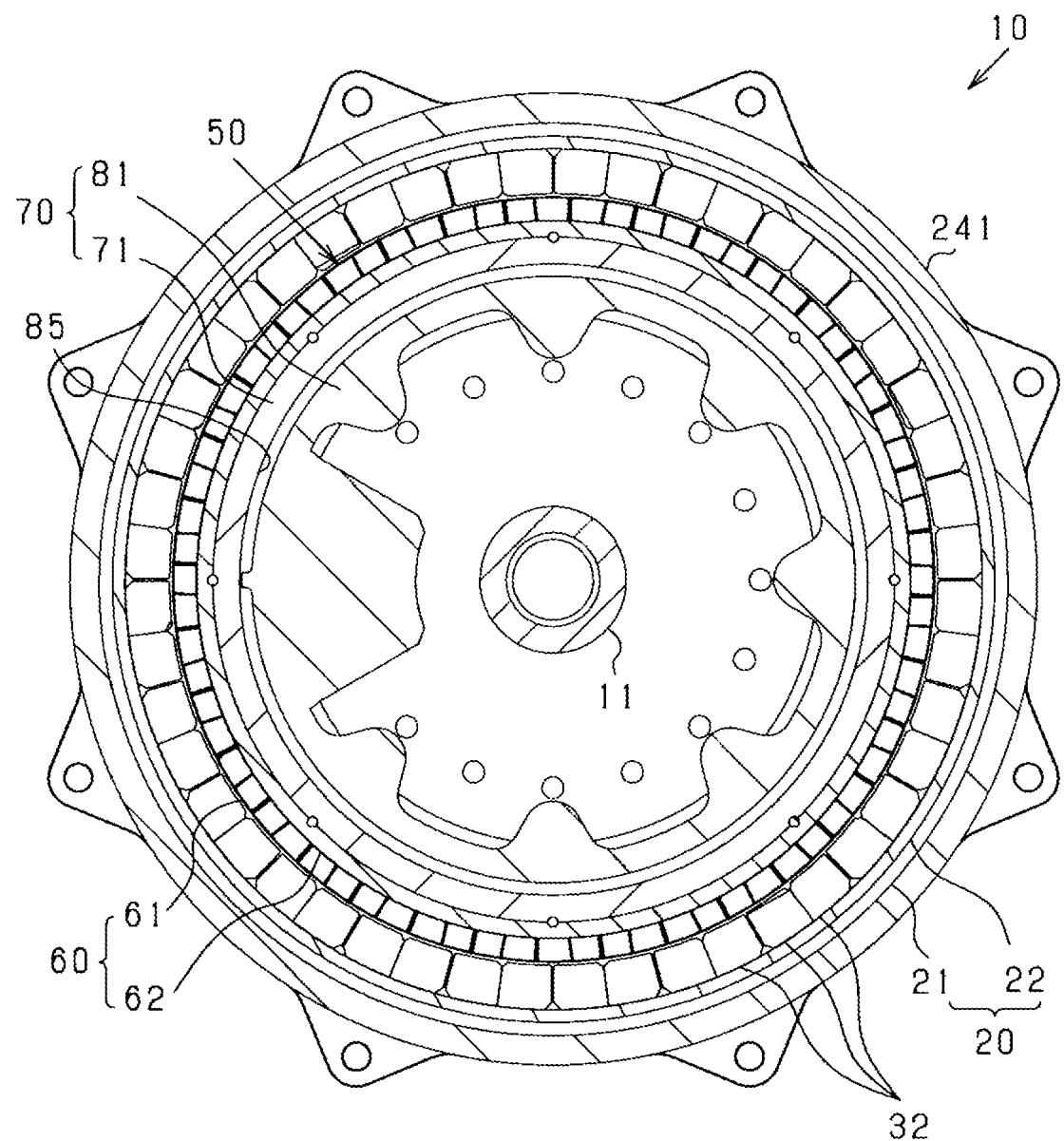
FIG. 4 is a transverse sectional view of a rotating electrical machine.
Figure 5:
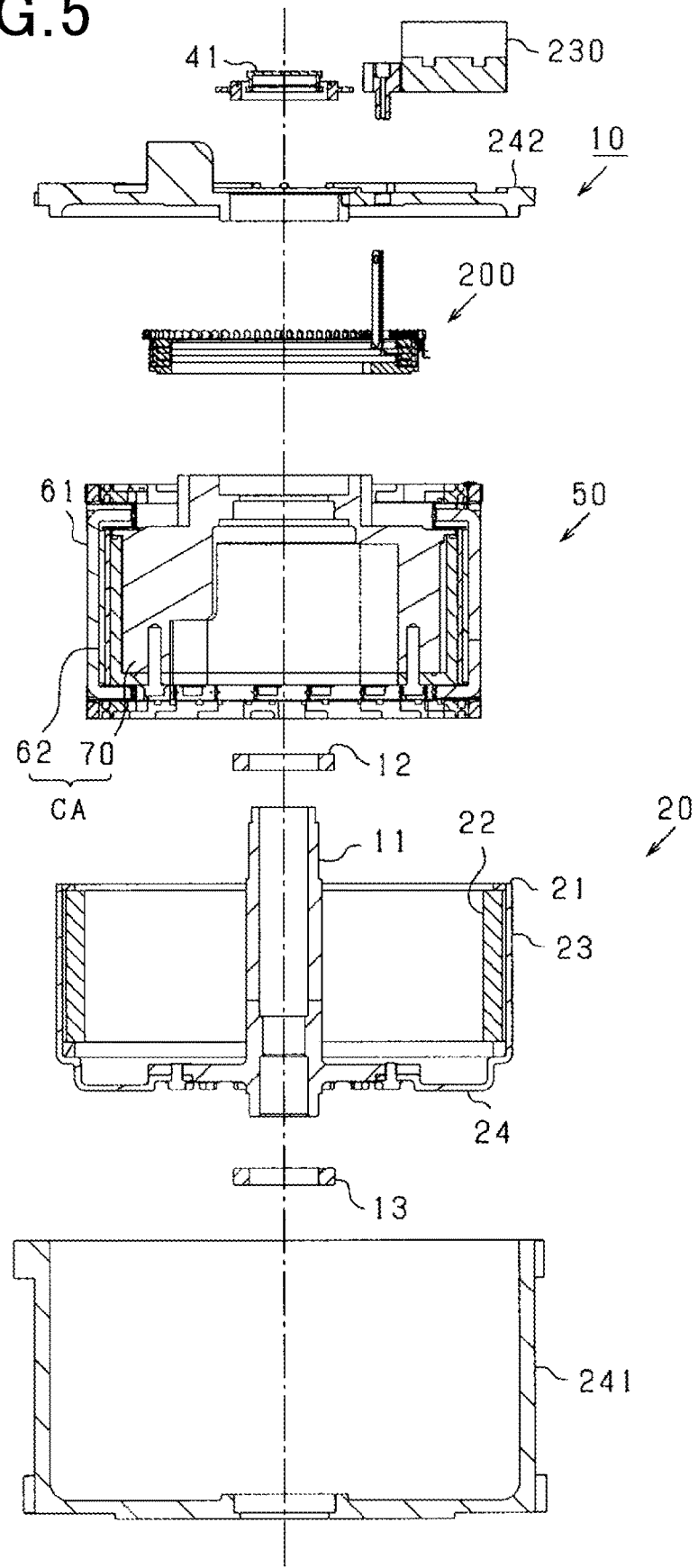
FIG. 5 is an exploded view of a rotating electrical machine.

The rotating electrical machine 10 in this embodiment is a synchronous polyphase ac motor having an outer rotor structure (i.e., an outer rotating structure). The outline of the rotating electrical machine 10 is illustrated in FIGS. 1 to 5. FIG. 1 is a perspective longitudinal sectional view of the rotating electrical machine 10. FIG. 2 is a plan view of the rotating electrical machine 10. FIG. 3 is a longitudinal sectional view (i.e., sectional view taken along the line III-III in FIG. 2) of the rotating electrical machine 10. FIG. 4 is a transverse sectional view (i.e., sectional view taken along the line IV-IV in FIG. 3) of the rotating electrical machine 10. FIG. 5 is an exploded view of component parts of the rotating electrical machine 10. In the following discussion, a direction in which the rotating shaft 11 of the rotating electrical machine 10 extends will be referred to as an axial direction. A direction extending radially from the center of the rotating shaft 11 will be referred to as a radial direction. A direction extending circumferentially about the center of the rotating shaft 11 thereof will be simply referred to as a circumferential direction.

The rotating electrical machine 10 generally includes a rotating electrical machine main body equipped with the rotor 20, the stator unit 50, and the busbar module 200, the housing 241 surrounding the rotating electrical machine main body, and the housing cover 242. These parts are placed coaxially with the rotating shaft 11 secured to the rotor 20 and fabricated in a given sequence of steps in alignment with the axial direction, thereby completing the rotating electrical machine 10. The rotating shaft 11 is retained by the bearings 12 and 13 installed in the stator unit 50 and the housing 241 to be rotatable. Each of the bearings 12 and 13 is implemented by, for example, a radial ball bearing equipped with an inner race, an outer race, and balls retained between the inner race and the outer race. The rotation of the rotating shaft 11 causes, for example, an axle of a vehicle to be rotated. The installation of the rotating electrical machine 10 in the vehicle may be achieved by securing the housing 241 to a frame of a body of the vehicle.

In the rotating electrical machine 10, the stator unit 50 is disposed to surround the rotating shaft 11. The rotor 20 is disposed radially outside the stator unit 50. The stator unit 50 includes the stator 60 and the stator holder 70 assembled to a radially inner periphery of the stator 60. The rotor 20 and the stator 60 are arranged to radially face each other with an air gap therebetween. Rotation of the rotor 20 radially outside the stator 60 causes the rotating shaft 11 to rotate together with the rotor 20. The rotor 20 works as a field generator (i.e., a magnetic field-producing unit). The stator 60 works as an armature.

Figure 6:
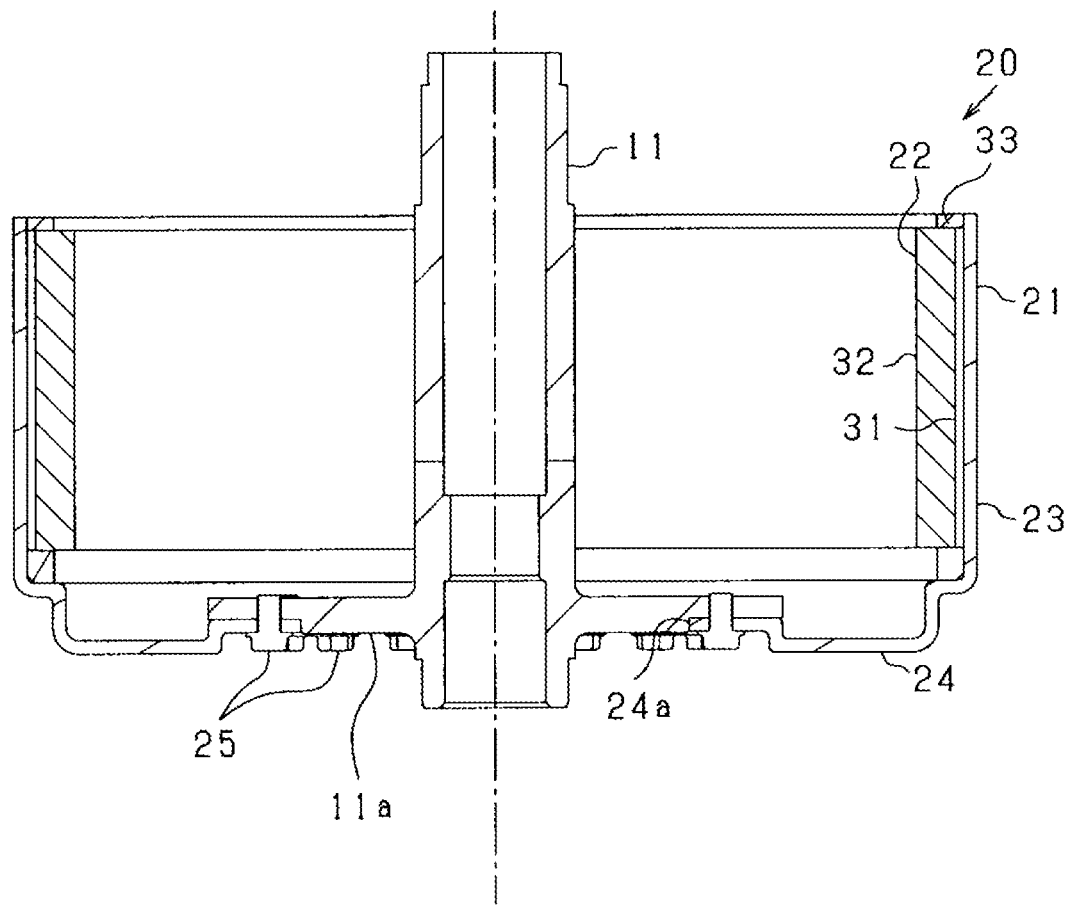
FIG. 6 is a sectional view of a rotor.

FIG. 6 is a longitudinal sectional view of the rotor 20. The rotor 20, as illustrated in FIG. 6, includes the substantially hollow cylindrical rotor carrier 21, and the annular magnet unit 22 secured to the rotor carrier 21. The rotor carrier 21 is comprised of the hollow cylindrical portion 23 and the end plate 24. The cylindrical portion 23 has opposing first and second ends in the axial direction, and the end plate 24 is mounted to the first end of the cylindrical portion 23, so that the cylindrical portion 23 and end plate 24 are integrally assembled to each other to thereby constitute the rotor carrier 21. The rotor carrier 21 serves as a magnet holder. The magnet unit 22 is mounted to a radially inner periphery of the cylindrical portion 23 in an arc-shape. The end plate 24 has the through hole 24a formed therethrough. The rotating shaft 11 passes through the through hole 24a and is retained by the end plate 24 with fasteners 25, such as bolts. The rotating shaft 11 has the flange 11a extending therefrom in a direction traversing or perpendicular to the axial direction of the rotating shaft 11. The flange 11a has an outer surface joined to an inner surface of the end plate 24, so that the rotating shaft 11 is secured to the rotor carrier 21.

The magnet unit 22 includes the cylindrica magnet holder 31, a plurality of magnets 32 secured to an inner peripheral surface of the magnet holder 31, and the end plate 33. The end plate 33 is secured to the second end of the rotor carrier 21 which is opposed to the first end of the rotor carrier 21 on which the end plate 24 is disposed. The magnet holder 31 has the same dimension as that of the magnets 32 in the axial direction. The magnets 32 are enclosed by the magnet holder 31 from radially outside it. The magnet holder 31 and the magnets 32 have axial ends firmly arranged in contact with the end plate 33.

Figure 7:
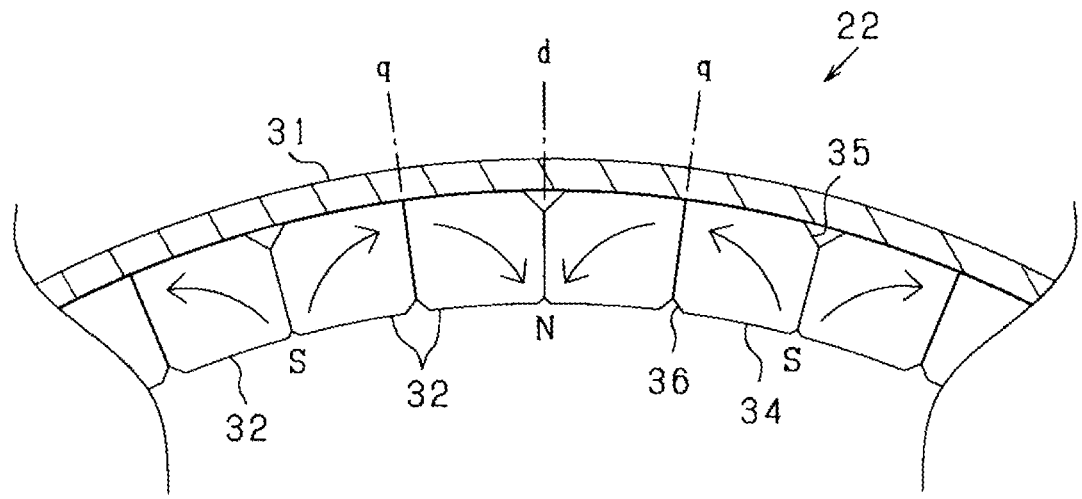
FIG. 7 is a partial transverse sectional view of a sectional structure of a magnet unit.

FIG. 7 is a partially transverse sectional view of a cross-sectional structure of the magnet unit 22. Easy axes of magnetization of the magnets 32 are illustrated by arrows in FIG. 7.

The magnets 32 are disposed in the magnet unit 22 to have different magnetic poles arranged alternately in a circumferential direction of the rotor 20. This results in the magnet unit 22 having a plurality of magnetic poles arranged in the circumferential direction of the rotor 20. Each magnet 32 is made of an anisotropic permanent sintered neodymium magnet whose intrinsic coercive force is 400 [kA/m] or more and whose remanent flux density is 1.0 [T] or more.

Each of the magnets 32 has a radially inner circumferential surface serving as the magnetic flux acting surface 34 into or from which magnetic flux flows. Each of the magnets 32 have easy axes of magnetization which are different in orientation from each other between regions close to the d-axis and the q-axis. Specifically, the easy axis of magnetization in the region close to the d-axis is oriented substantially parallel to the d-axis, while the easy axis of magnetization in the region close to the q-axis is oriented substantially perpendicular to the q-axis. Such orientations define an arc-shaped magnet-produced magnetic path extending along the easy axes of magnetization. In other words, each of the magnets 32 is magnetically oriented to have the easy axis of magnetization which extends more parallel to the d-axis in the region close to the d-axis that is the center of a magnetic pole than that in the region close to the q-axis that is a magnetic boundary between the N-pole and the S-pole.

The arc-shape of the magnetic paths in the magnets 32 causes each magnetic path to have a length longer than a radial dimension or thickness of the magnet 32, thereby enhancing the permeance in the magnets 32. This enables the magnets 32 to have substantially the same capability as that of magnets whose volume is larger than the magnets 32.

A respective circumferentially adjacent two of the magnets 32 constitute a magnet pair exhibiting one magnetic pole. In other words, each of the magnets 32 circumferentially arranged in the magnet unit 22 is shaped to have division surfaces coinciding with the d-axis and the q-axis. The magnets 32 are arranged in direct contact with or close to each other. The magnets 32, as described above, have the arc-shaped magnetic paths. A respective two of the magnets 32 which are arranged circumferentially adjacent each other across the q-axis have the N-pole and the S-pole facing each other. This results in an enhanced permeance near the q-axis. The magnets 32 which are arranged on opposite sides of the q-axis attract each other, thereby ensuring the stability in contact of the magnets 32 with each other, which also enhances the permeance.

Figure 8:
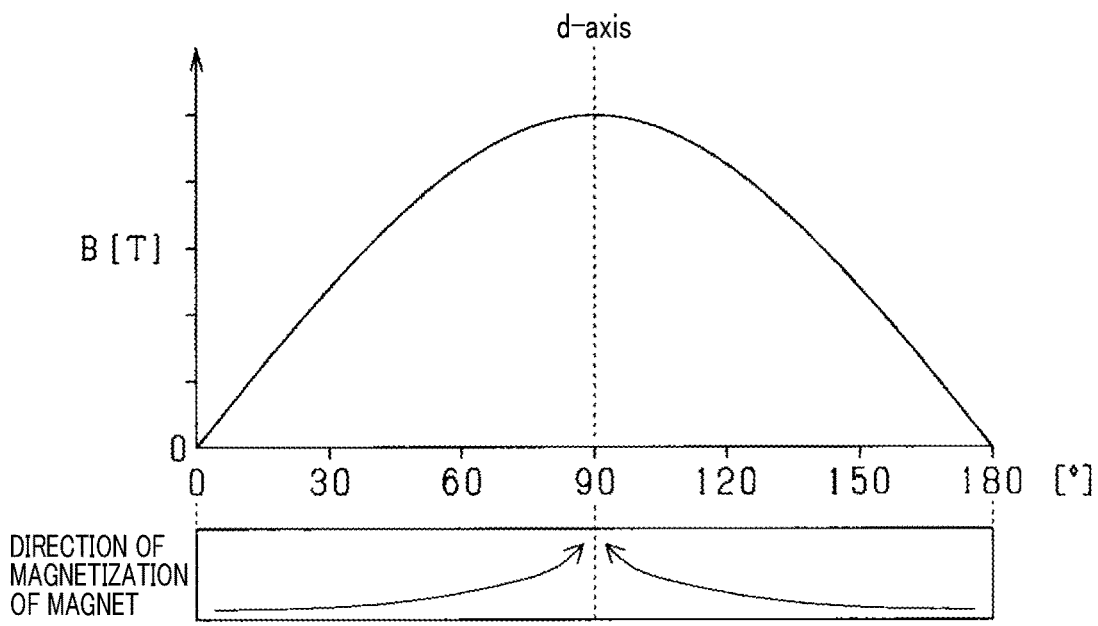
FIG. 8 is a view which represents a relation between an electrical angle and a density of magnetic flux in magnets according to an embodiment.
Figure 9:
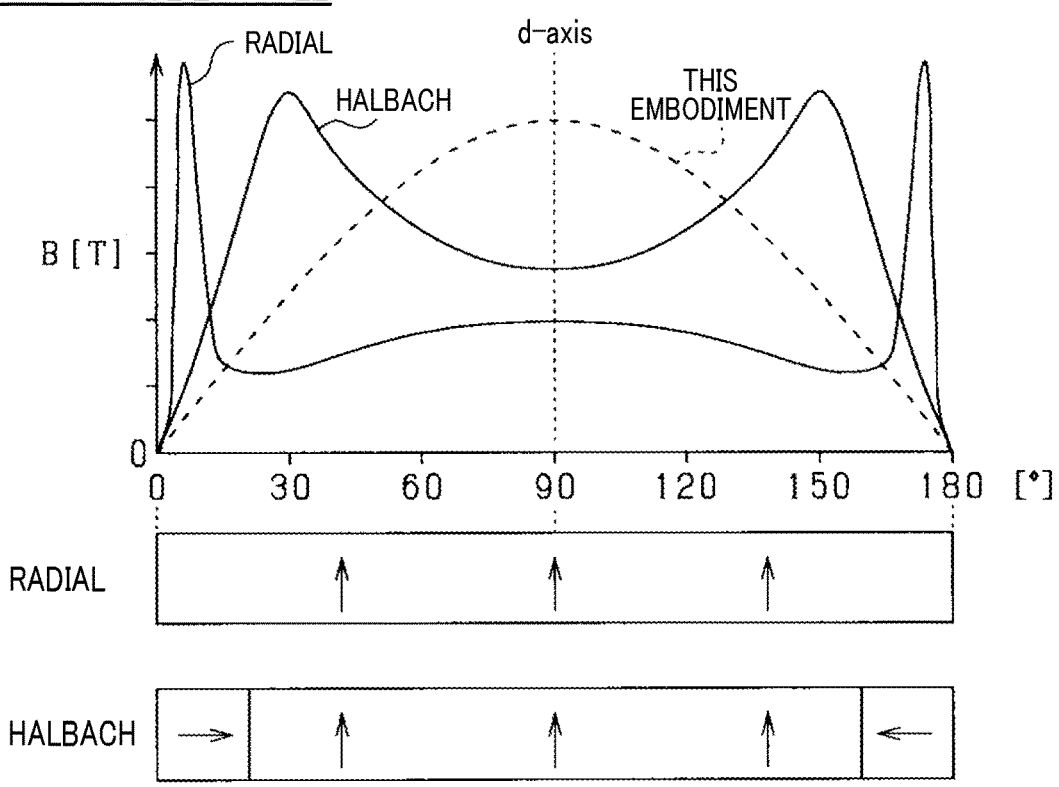
FIG. 9 is a view which represents a relation between an electrical angle and a density of magnetic flux in magnets in a comparative example.

In the magnet unit 22, a magnetic flux flows in an annular shape between a respective adjacent two of the N-poles and the S-poles of the magnets 91 and 92, so that each of the magnetic paths has an increased length, as compared with, for example, radial anisotropic magnets. A distribution of the magnetic flux density will, therefore, exhibit a shape similar to a sine wave illustrated in FIG. 8. This facilitates concentration of magnetic flux around the center of the magnetic pole unlike a distribution of magnetic flux density of a radial anisotropic magnet demonstrated in FIG. 9 as a comparative example, thereby enabling the degree of torque produced by the rotating electrical machine 10 to be increased. It has also been found that the magnet unit 22 in this embodiment has the distribution of the magnetic flux density distinct from that of a typical Halbach array magnet. In FIGS. 8 and 9, a horizontal axis indicates the electrical angle, while a vertical axis indicates the magnetic flux density. 90° on the horizontal axis represents the d-axis (i.e., the center of the magnetic pole). 0° and 180° on the horizontal axis represent the q-axis.

Accordingly, the above-described structure of each of the magnets 32 functions to enhance the magnet magnetic flux thereof on the d-axis and reduce a change in magnetic flux near the q-axis. This enables the magnets 32 to be produced which have a smooth change in surface magnetic flux from the q-axis to the d-axis on each magnetic pole.

The sine wave matching percentage in the distribution of the magnetic flux density is preferably set to, for example, 40% or more. This improves the amount of magnetic flux around the center of a waveform of the distribution of the magnetic flux density as compared with a radially oriented magnet or a parallel oriented magnet in which the sine wave matching percentage is approximately 30%. By setting the sine wave matching percentage to be 60% or more, the amount of magnetic flux around the center of the waveform is improved, as compared with a concentrated magnetic flux array, such as the Halbach array.

In the radial anisotropic magnet demonstrated in FIG. 9, the magnetic flux density changes sharply near the q-axis. The sharper the change in magnetic flux density, the more an eddy current generated in the stator winding 61 of the stator 60 will increase. The magnetic flux close to the stator winding 61 also sharply changes. In contrast, the distribution of the magnetic flux density in this embodiment has a waveform approximating a sine wave. A change in magnetic flux density near the q-axis is, therefore, smaller than that in the radial anisotropic magnet near the q-axis. This minimizes the generation of the eddy current.

Adjacent corners of the radially outer surfaces of the magnets 32 are each cut to form the recess 35 in a region including the corresponding d-axis. Each of the magnets 32 has the recess 36 which is formed in the radially inner surface thereof and occupies a region including the corresponding q-axis. The directions of the above easy axes of magnetization of the magnet 32 cause magnetic paths located close to each d-axis and the radially outer surface to be shorter. Similarly, the directions of the above easy axes of magnetization of the magnet 32 cause magnetic paths located close to the q-axis and the radially inner surface to be shorter. Each magnet 32 is, therefore, configured such that some portions, which have weaker magnetic fluxes due to the shorter magnetic paths, have been already eliminated, because each of the eliminated portions have difficulty in creating a sufficient amount of magnetic flux.

The magnet unit 22 may be designed to have as many magnets 32 as the magnetic poles. For instance, each of the magnets 32 may be shaped to have a size occupying a respective circumferentially adjacent two magnetic poles between the adjacent d-axes each of which lies at the center of the magnetic pole. In this case, the center of the circumference of each of the magnets 32 coincides with the q-axis. Each of the magnets 32 has the division surfaces each coinciding with the d-axis. Each of the magnets 32 may alternatively be shaped to have a circumference whose center lies on the d-axis, not the q-axis. Instead of twice as many magnets 32 or as many magnets 32 as the magnetic poles, a circular continuous magnet may be used.

The rotating shaft 11 has opposing first and second ends in its axial direction; the first end of the rotating shaft 11 is joined to the rotor carrier 21, which is the lower end of the rotating shaft 11 in FIG. 3. The resolver 41 is mounted on the second end of the rotating shaft 11, which is the upper end of the rotating shaft 11 in FIG. 3. The resolver 41 serves as a rotation sensor. The resolver 41 includes a resolver rotor secured to the rotating shaft 11, and a resolver stator disposed radially outside the resolver rotor to face the resolver rotor. The resolver rotor has an annular disc shape, and is coaxially mounted around the rotating shaft 11. The resolver stator includes a stator core and a stator coil, and is retained to the housing cover 242.

Figure 10:
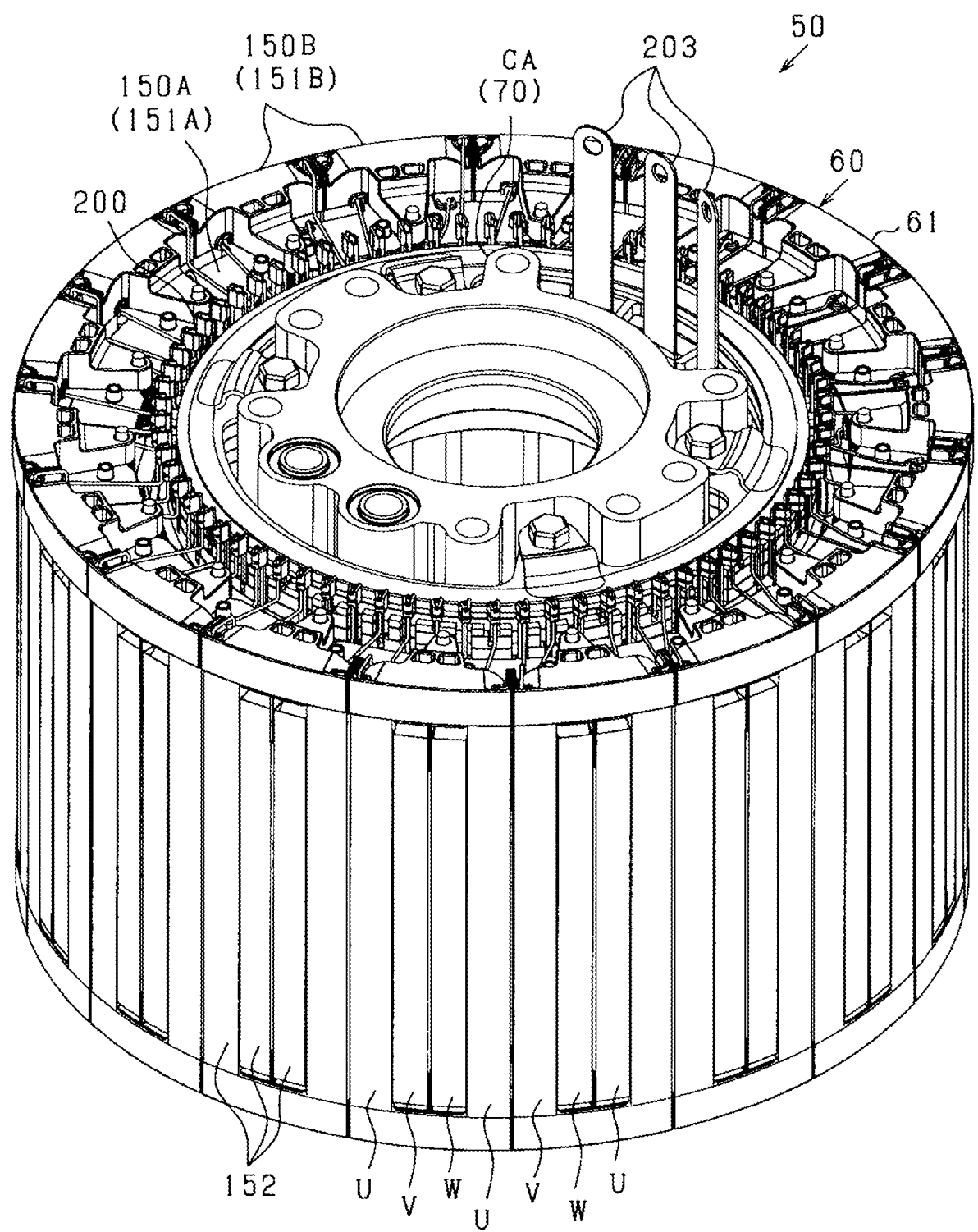
FIG. 10 is a perspective view of a stator unit.

Next, the following describes the structure of the stator unit 50. FIG. 10 is a perspective view of the stator unit 50.

Figure 11:
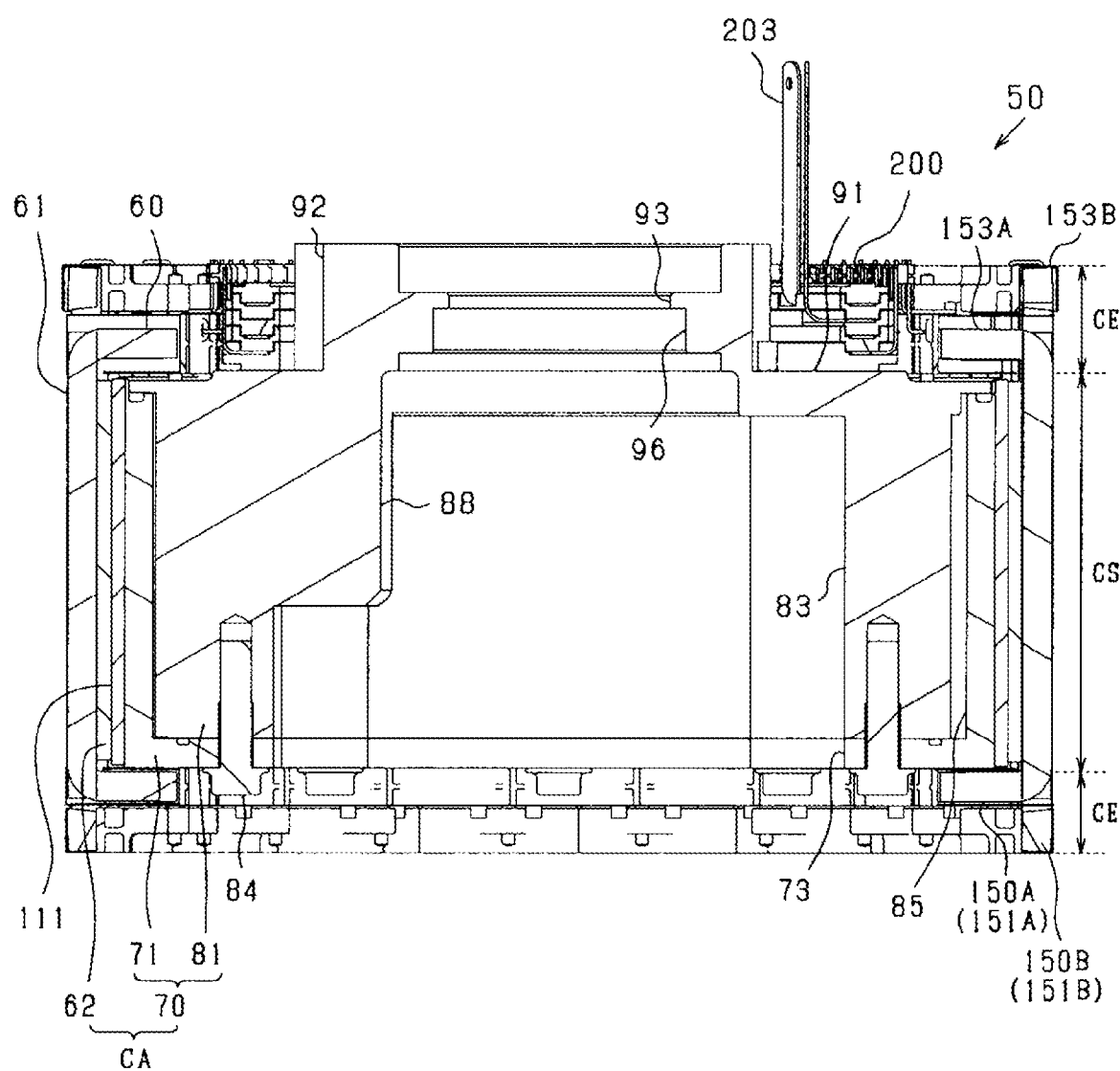
FIG. 11 is a longitudinal sectional view of a stator unit.

FIG. 11 is a longitudinal sectional view of the stator unit 50 which is taken along the same line as in FIG. 3.

The stator unit 50 is schematically comprised of the stator 60 and the stator holder 70 disposed radially inside the stator 60. The stator 60 includes the stator winding 61 and the stator core 62. The stator core 62 and the stator holder 70 are integrally assembled to each other as a core assembly CA. The stator winding 61 is made up of a plurality of winding segments 151 which are disposed in the core assembly CA.

The stator winding 61 serves as an armature winding. The stator core 62 serves as an armature core. The stator holder 70 serves as an armature holder. The core assembly CA serves as a retainer.

Figure 12:
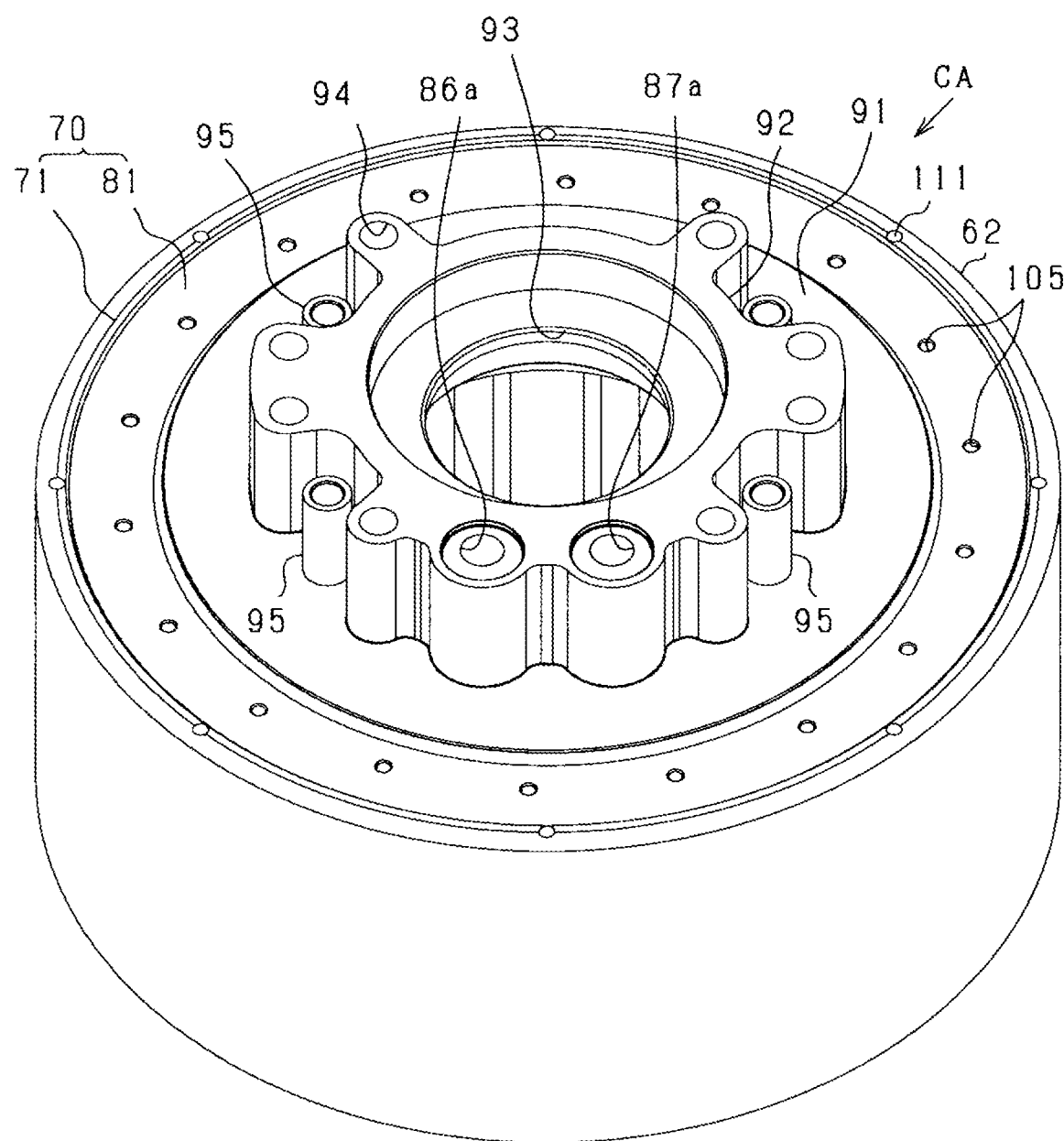
FIG. 12 is a perspective illustration of a core assembly, as viewed in a first axial direction.
Figure 13:
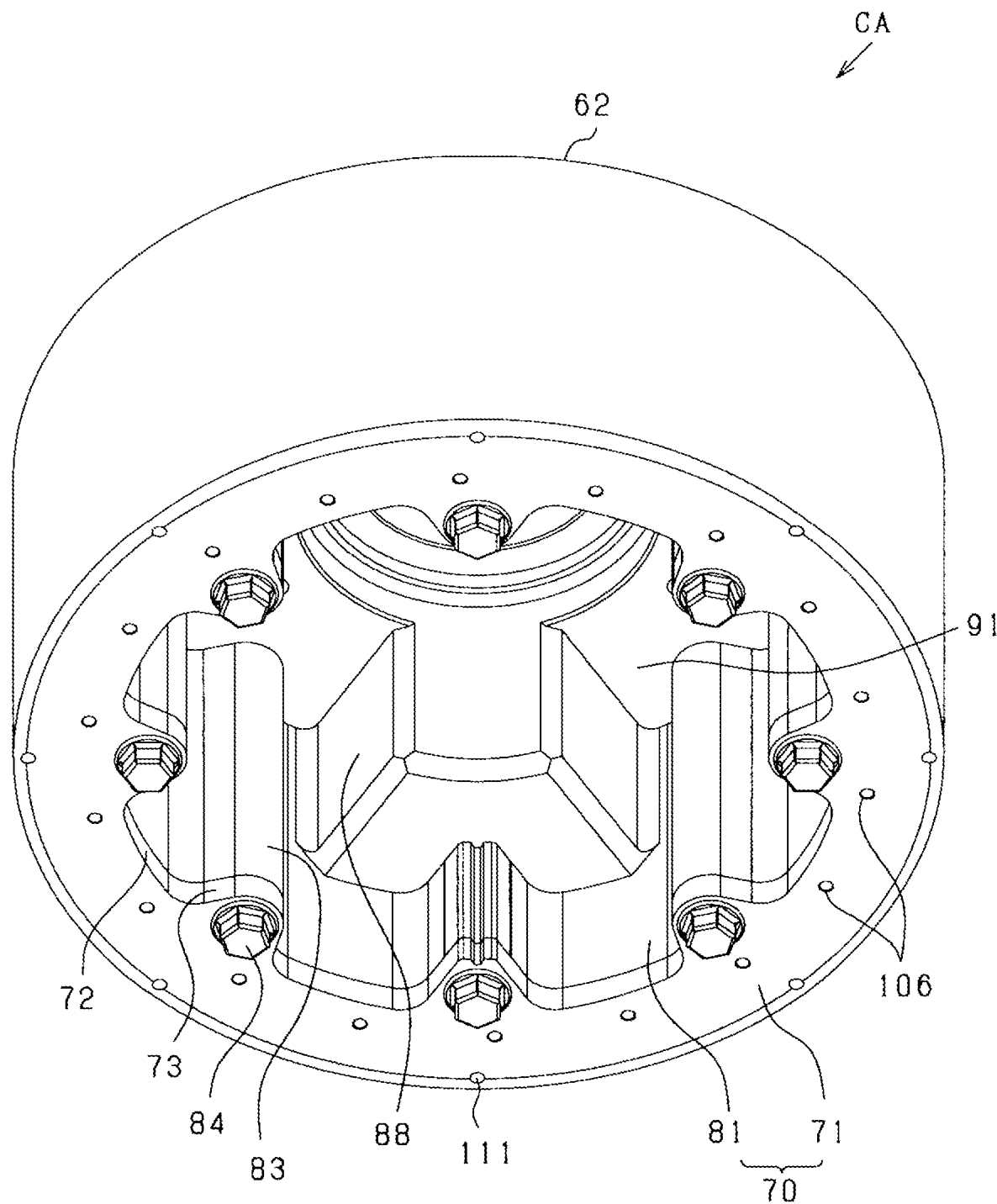
FIG. 13 is a perspective illustration of a core assembly, viewed from a second axial direction.
Figure 14:
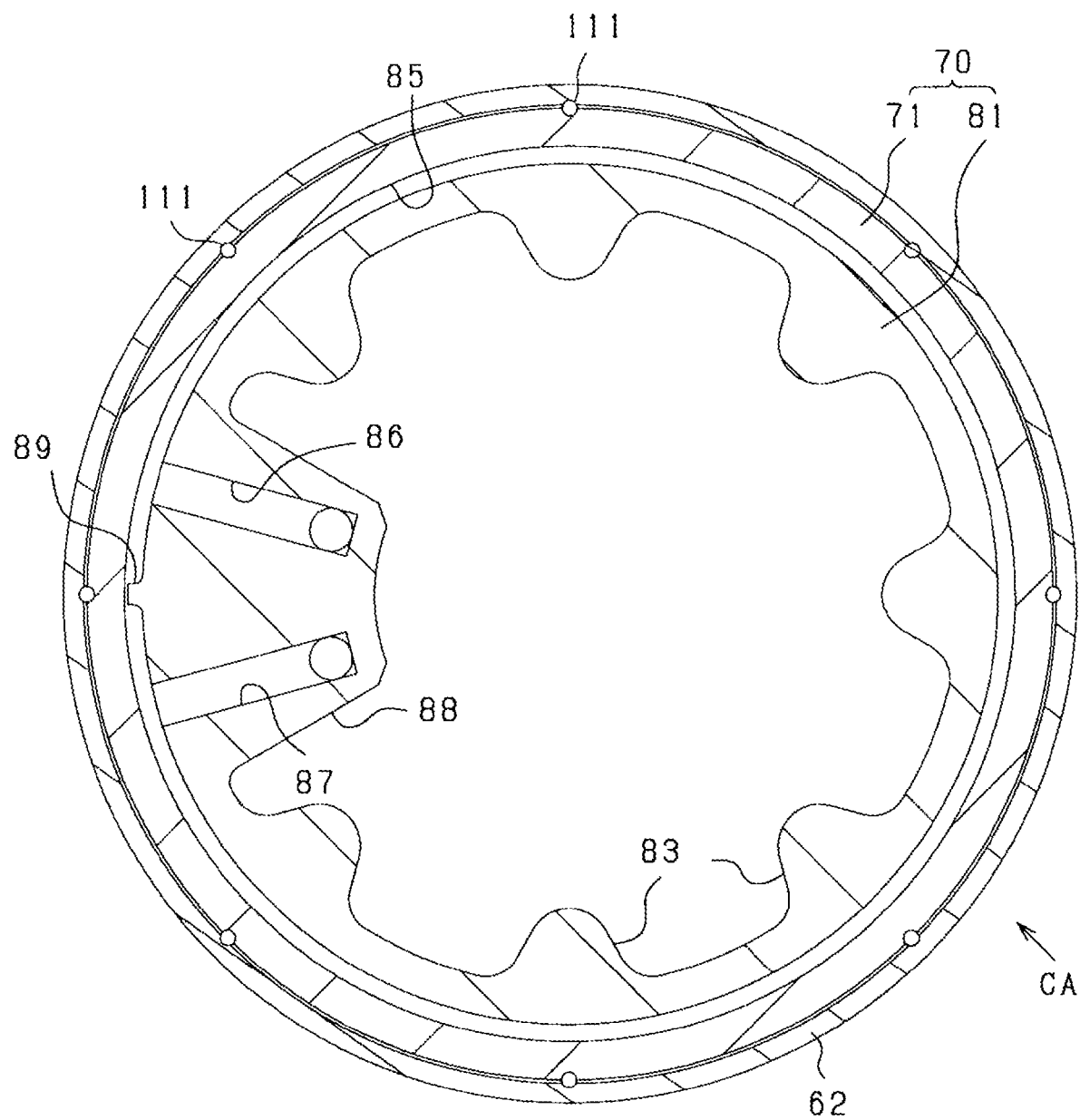
FIG. 14 is a transverse sectional view of a core assembly.
Figure 15:
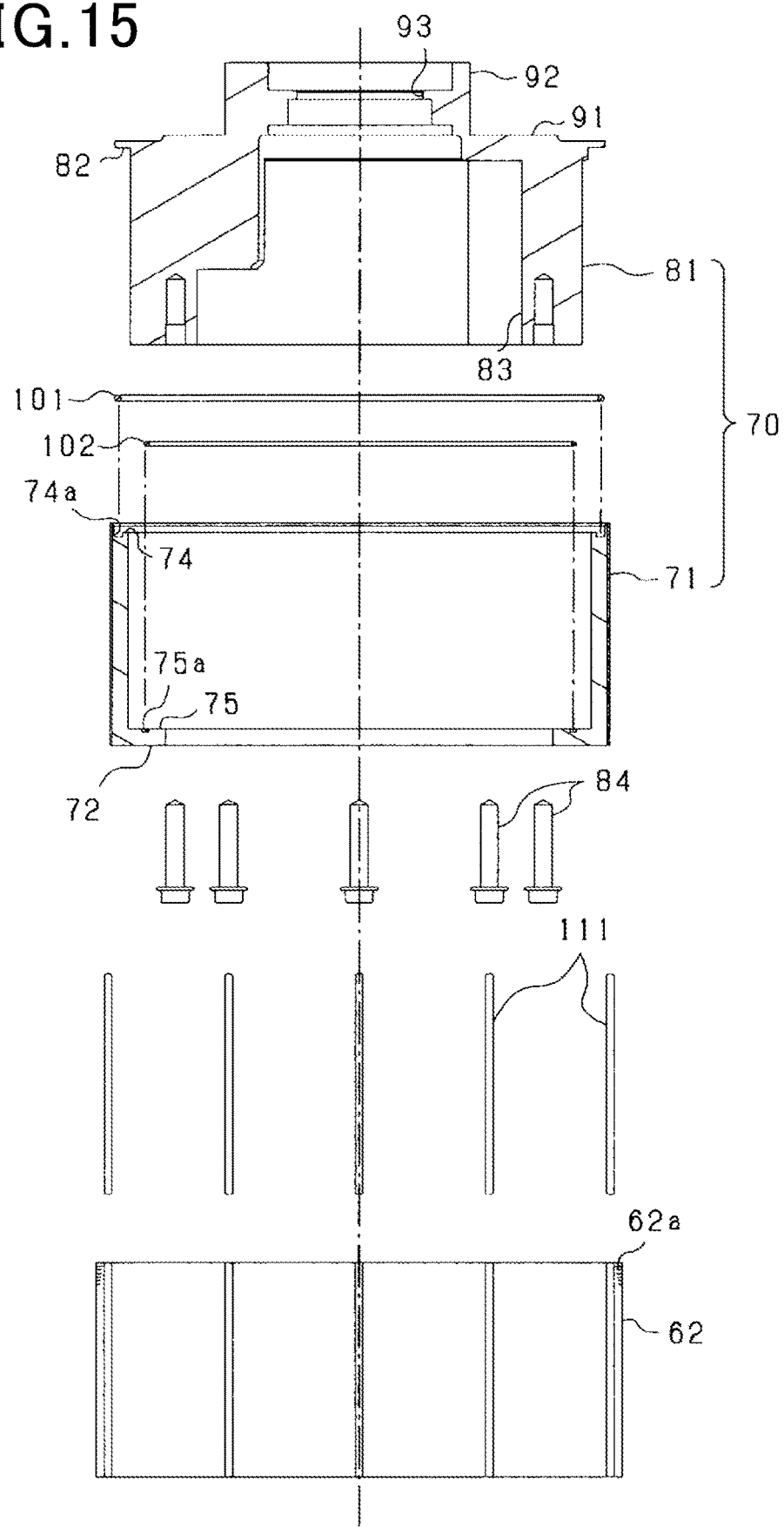
FIG. 15 is an exploded view of a core assembly.

First, the following describes the core assembly CA. FIG. 12 is a perspective view of the core assembly CA, as viewed from one side of the axial direction. FIG. 13 is a perspective view of the core assembly CA, as viewed from the other side of the axial direction. FIG. 14 is a transverse sectional view of the core assembly CA. FIG. 15 is an exploded sectional view of the core assembly CA.

The core assembly CA is comprised of, as described above, the stator core 62 and the stator holder 70 assembled to the radially inner periphery of the stator core 61. In other words, the stator core 62 is integrally assembled to the outer peripheral surface of the stator holder 70.

The stator core 62 is, for example, comprised of a plurality of core sheets 62a, each of which is made of a magnetic steel plate, stacked in the axial direction in the shape of a hollow cylinder having a given thickness in the radial direction. The stator winding 61 is mounted on the outer peripheral surface of the stator core 62 which faces the rotor 20. The stator core 62 has no irregularities on the outer peripheral surface thereof. The stator core 62 functions as a back yoke. The stator core 62 is, for example, comprised of the plurality of core sheets 62a stacked in the axial direction; each core sheet 62a has been punched out to have an annular plate-like shape. For the stator core 62 having a helical configuration, the stator core 62 may be comprised of elongated sheets helically wound and stacked in the axial direction to be shaped overall as a hollow cylindrical shape.

The stator 60 is designed to have a slot-less structure with no teeth for defining slots. Specifically, the stator 60 has any of the following structures:

(A) The stator 60 has inter-conductor members, each of which is disposed between conductor portions (intermediate conductor portions 152 described later) in the circumferential direction. As the inter-conductor members, magnetic material is used which meets a relation of Wt×Bs≤Wm×Br where Wt is a width of the inter-conductor members in the circumferential direction within one magnetic pole, Bs is the saturation magnetic flux density of the inter-conductor members, Wm is a width of the magnets 32 equivalent to one magnetic pole in the circumferential direction, and Br is the remanent flux density in the magnet 32.

(B) The stator 60 has the inter-conductor members each of which is disposed between the conductor portions (intermediate portions 152) in the circumferential direction. The inter-conductor members are each made of a non-magnetic material.

(C) The stator 60 has no inter-conductor member disposed between the conductor portions (i.e., the intermediate portions 152) in the circumferential direction.

The stator holder 70 is, as illustrated in FIG. 15, comprised of an outer cylindrical member 71 and an inner cylindrical member 81. The outer and inner cylindrical members 71 and 81 are integrally assembled to each other while the inner cylindrical member 81 is disposed radially inside the outer cylindrical member 71, in other words, the outer cylindrical member 71 is disposed radially outside the inner cylindrical member 81. Each of the outer and inner cylindrical members 71 and 81 is made of, for example, metal, such as aluminum or cast iron, or carbon fiber reinforced plastic (CFRP).

The outer cylindrical member 71 has a hollow cylindrical shape with the curvature of each of the outer and inner peripheral surfaces thereof being an exact circle. The outer cylindrical flange 72 has opposing first and second ends in its axial direction, and has the annular flange 72 extending radially inward from the first end thereof. The flange 72 has protrusions 73 arranged at a regular interval away from each other in the circumferential direction thereof (see FIG. 13). The outer cylindrical member 71 has the axially facing surfaces 74 and 75 which lie at the first and second ends thereof axially opposed to each other and face the inner cylindrical member 81 in the axial direction. The axially facing surfaces 74 and 75 have annular grooves 74a and 75a formed therein.

The inner cylindrical member 81 has an outer diameter smaller than that of the outer cylindrical member 71. The inner cylindrical member 81 has a hollow cylindrical shape with the curvature of the outer peripheral surface thereof being an exact circle. The inner cylindrical member 81 has opposing first and second ends in its axial direction, and has the annular outer flange 82 extending radially outward from the second end thereof. The inner cylindrical member 81 is assembled to the outer cylindrical member 71 while being in contact with the axially facing surfaces 74 and 75 of the outer cylindrical member 71. As illustrated in FIG. 13, the inner and outer cylindrical members 71 and 81 are fastened to each other using fasteners 84, such as bolts. Specifically, the inner cylindrical member 81 has a plurality of protrusions 83 formed on an inner peripheral surface thereof. The protrusions 83 are arranged at a regular interval away from each other in the circumferential direction of the inner cylindrical member 81 and protrude radially inward. The protrusions 83 have axially end surfaces placed laid to overlap the protrusions 73 of the outer cylindrical member 71. The protrusions 73 and 83 are joined together using the fasteners 84.

The outer and inner cylindrical members 71 and 81 are, as illustrated in FIG. 14, integrally assembled to each other. The inner peripheral surface of the outer cylindrical member 71 and the outer peripheral surface of the inner cylindrical member 81 are disposed to face each other with an annular clearance therebetween; the annular clearance serves as a coolant path 85 through which coolant, such as water, is supplied to flow. The coolant path 85 is formed to have an annular shape in the circumferential direction of the stator holder 70. More specifically, the inner cylindrical member 81 has the path formation wall 88 protruding from the inner peripheral surface of the inner cylindrical member 81; the path formation wall 88 has formed therein the inlet path 86 and the outlet path 87. Each of the paths 86 and 87 opens at the outer peripheral surface of the inner cylindrical member 81. The inner cylindrical member 81 has the partition 89 formed on the outer peripheral surface thereof to divide the coolant path 85 into an input side and an output side. This enables a coolant entering the input path through the inlet path 86 to flow the coolant path 85 in the circumferential direction, and thereafter to flow out from the outlet path 87.

Each of the inlet path 86 and the outlet path 87 has opposing first and second ends in its length direction. The first end of each of the inlet path 86 and outlet path 87 radially extends and opens at the outer peripheral surface of the inner cylindrical member 81. The second end of each of the inlet path 86 and the outlet path 87 axially extends and opens at an axial end of the inner cylindrical member 81. FIG. 12 shows the inlet opening 86a communicating with the inlet path 86 and the outlet opening 87a communicating with the outlet path 87. The inlet path 86 and the outlet path 87 communicate with the inlet port 244 and the outlet port 245 of the housing cover 242 (see FIG. 1), so that the coolant flows into the inlet port 244 and out of the outlet port 245.

The seal member 101 is disposed between the second end of the outer cylindrical member 71 and the second end of the inner cylindrical member 81 that is joined to the second end of the outer cylindrical member 71. The seal member 102 is disposed between the first end of the outer cylindrical member 71 and the first end of the inner cylindrical member 81 that is joined to the first end of the outer cylindrical member 71 (see FIG. 15). Specifically, the seal member 101, which is, for example, an O-ring, is disposed in the annular groove 74a of the outer cylindrical member 71 while being compressed by the inner cylindrical member 81. Similarly, the seal member 102, which is, for example, an O-ring, is disposed in the annular groove 75a of the outer cylindrical member 71 while being compressed by the inner cylindrical member 81.

The inner cylindrical member 81 has, as illustrated in FIG. 12, the annular end plate 91 at the second end thereof. The boss 92, which has a hollow cylindrical shape, is mounted on an outer surface of the end plate 91 to extend outwardly therefrom in the axial direction. The boss 92 extends around the through hole 93 through which the rotating shaft 11 passes. The boss 92 has a plurality of fasteners 94 for use in securement of the housing cover 242. The end plate 91 has disposed thereon a plurality of rods 95 which are located radially outside the boss 92 and extend in the axial direction. The rods 95, as will be described later in detail, serve as retainers for use in securement of the busbar module 200. The boss 92 serves as a bearing retainer which retains the bearing 12. Specifically, the bearing 12 is firmly mounted in the bearing holder 96 formed in an inner portion of the boss 92 (see FIG. 3).

the outer cylindrical member 71 and the inner cylindrical member 81, as clearly illustrated in FIGS. 12 and 13, have the recesses 105 and 106 for use in securement of a plurality of coil modules 150 which will be described later.

Specifically, the recesses 105 are, as clearly illustrated in FIG. 12, formed in an axial end of the inner cylindrical member 81, i.e., an axial outer end of the end plate 91 around the boss 92. The recesses 105 are arranged at equal intervals away from each other in the circumferential direction of the end plate 91. The recesses 106 are, as clearly illustrated in FIG. 13, formed in an axial end of the outer cylindrical member 71, i.e., an axial outer end of the flange 72. The recesses 106 are arranged at equal intervals away from each other in the circumferential direction of the flange 72. The recesses 105 and 106 are arranged on an imaginary circle defined to be coaxial with the core assembly CA. The recesses 105 are aligned with the recesses 106 in the axial direction. The recesses 105 and 106 are identical in number and spacing therebetween with each other.

The stator holder 70 is assembled to the stator core 62 while the stator core 62 applies radial compression force to the stator holder 70 for ensuring sufficient force to assemble the stator holder 70 and the stator core 62 to each other. Specifically, the stator holder 70 is fixedly fit in the stator core 62 using shrinkage-fitting or press-fitting with a predetermined degree of interference therebetween. This results in the stator core 62 and the stator holder 70 being assembled to each other while one of the stator core 62 and the stator holder 70 applies radial stress to the other thereof. For obtaining a high degree of torque from the rotating electrical machine 10, let us consider a measure to, for example, make the size of the stator 60 larger, resulting in a larger degree of force of the stator core 62, which tightens the stator holder 70 to the stator core 62, in order to firmly join the stator core 62 to the stator holder 70 together. An increase in compressed stress of the stator core 62, in other words, residual stress of the stator core 62, may result in a risk of causing the stator core 62 to be broken down.

In light of the above drawback, the structure in this embodiment in which the stator holder 79 is fit in the stator core 62 with a given amount of interference therebetween is designed to have a stopper which is arranged in portions of the stator core 62 and the stator holder 70 which radially face each other and works to achieve engagement of the stator core 62 and the stator holder 70 to hold the stator core 62 from moving in the circumferential direction thereof. Specifically, a plurality of engagement members 111 are, as illustrated in FIGS. 12 to 14, disposed between the stator core 62 and the outer cylindrical member 71 of the stator holder 70. The engagement members 111 are arranged at a given interval away from each other in the circumferential direction and function as stoppers to control misalignment between the stator core 62 and the stator holder 70 in the circumferential direction. For instance, one of the stator core 62 and the outer cylindrical member 71 may have formed therein recesses in which the engagement members 111 are fit. Instead of the engagement members 111, one of the stator core 62 and the outer cylindrical member 71 may alternatively have formed thereon protrusions fit in the recesses.

The above structure, therefore, serves to eliminate the risk of misalignment between the stator core 62 and the stator holder 70 (i.e., the outer cylindrical member 71) in the circumferential direction as well as to ensure an interference fit between the stator core 62 and the stator holder 70 (i.e., the outer cylindrical member 71). This, therefore, ensures the stability in alignment between the stator core 62 and the stator holder 70 even if the amount of interference between the stator core 62 and the stator holder 70 is relatively small and also eliminates the risk of damage to the stator core 62 which usually rises from an increase in amount of interference fit between the stator core 62 and the stator holder 70.

The inner cylindrical member 81 has an annular inner chamber formed radially thereinside around the rotating shaft 11. Electrical components, such as electrical components constitute, for example, an inverter serving as a power converter, may be installed in the annular inner chamber. The electrical components for example include one or more electrical modules in each of which semiconductor switches and capacitors are packaged. The electrical components are arranged while being in contact with the inner peripheral surface of the inner cylindrical member 81. The cooling of the electrical modules using the coolant flowing in the coolant path 85 may be achieved by arranging the electrical modules in contact with the inner periphery of the inner cylindrical member 81. The volume of the inner chamber located inside the inner periphery of the inner cylindrical member 81 may be increased by eliminating the protrusions 83 on the inner periphery of the inner cylindrical member 81 or decreasing the height of the protrusions 83.

Next, the structure of the stator winding 61 installed in the core assembly CA will be described below in detail. The stator winding 61 mounted in the core assembly CA is shown in FIGS. 10 and 11. Specifically, the winding segments 151, which constitute the stator winding 61, are circumferentially arranged radially outside the core assembly CA, i.e., the stator core 62.

The stator winding 61 is comprised of plural-phase windings that are arranged in a predetermined order in the circumferential direction; the assembly of the plural-phase windings arranged in the circumferential direction has a hollow cylindrical shape, i.e., an annular shape. The stator winding 61 in this embodiment includes three-phase windings: a U-phase winding, a V-phase winding, and a W-phase winding.

The stator 60, as illustrated in FIG. 11, includes an axial inside portion serving as the coil side CS that radially faces the magnet unit 22 of the rotor 20 and axial outside portions serving as the coil ends CE located axially outside the coil side CS. The stator core 62 is disposed inside the coil side CS such that the axial length of the stator core 62 occupies the axial length of the coil side CS.

Each-phase winding in the stator winding 61 includes a plurality of winding segments 151 (see FIG. 16), and each of the winding segments 151 constitutes the coil module 150. In other words, the coil module 150 of each phase winding is comprised of a modularized winding segment 151 of the corresponding phase winding. The stator winding 61 is made of a predetermined number of coil modules 150, which is determined based on the number of magnet poles of the rotating electrical machine.

Arranging the coil modules 150 of the plural-phase windings in the predetermined order in the circumferential direction results in the conductor portions of the plural-phase windings being arranged in the predetermined order; the arranged conductor portions of the plural-phase windings constitute the coil side CS of the stator winding 61. FIG. 10 illustrates the predetermined order of arrangement of the conductor portions of the U-, V-, and W-phase windings in the coil side CS of the stator winding 61. The number of magnet poles of the rotating electrical machine is set to 24, but may be optional.

Figure 16:
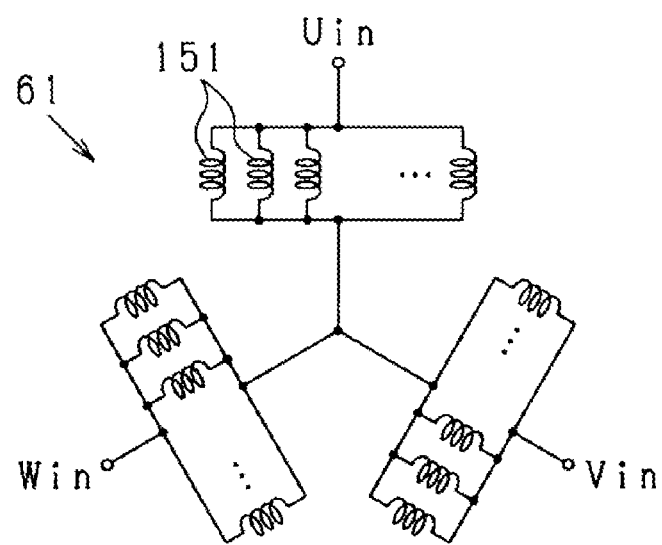
FIG. 16 is a circuit diagram which shows connections of winding segments of a three-phase winding.

The winding segments 151 of the coil modules 150 of each phase winding are connected in parallel or series to each other to thereby constitute the corresponding phase winding. FIG. 16 illustrates electrical connections among the winding segments 151 of each of the U-, V-, and W-phase windings. In FIG. 16, the winding segments 151 of each of the U-, V-, and W-phase windings are connected in parallel to each other.

The coil modules 150 are, as illustrated in FIG. 11, attached to the radial outside of the stator core 62. The coil modules 150 are attached to the stator core 62 while both end portions of the coil modules 150 in the axial direction project outside of the stator core 62, i.e., project toward the respective coil ends CE, in the axial direction. Specifically, the stator winding 61 includes an axial inside portion serving as the coil side CS and axial outside portions serving as the coil ends CE located on the axial outside of the coil side CS.

The coil modules 150 include a first type of coil modules 150 and a second type of coil modules 150. The configuration of each coil module 150 included in the first type is different from the configuration of each coil module 150 included in the second type. The winding segment 151 of each coil module 150 included in the first type has opposing first and second ends in the axial direction of the stator core 62, and each of the first and second ends of the winding segment 151 of each coil module 150, which constitutes a corresponding one of the coil ends CE, is bent radially inside the stator core 62. In contrast, the winding segment 151 of each coil module 150 included in the second type has opposing first and second ends in the axial direction of the stator core 62, and each of the first and second ends of the winding segment 151 of each coil module 150, which constitutes a corresponding one of the coil ends CE, extends linearly in the axial direction of the stator core 62 without being bent. In the following discussion for the sake of convenience, the winding segment 151, whose first and second ends are bent radially inside the stator core 62, will be referred to as a first winding segment 151A, and the coil module 150 including the first winding segment 151A will be referred to as a first coil module 150A. Similarly, the winding segment 151, whose first and second ends extend in the axial direction of the stator core 62 without being bent, will be referred to as a second winding segment 151B, and the coil module 150 including the second winding segment 151B will be referred to as a second coil module 150B.

Figure 17:
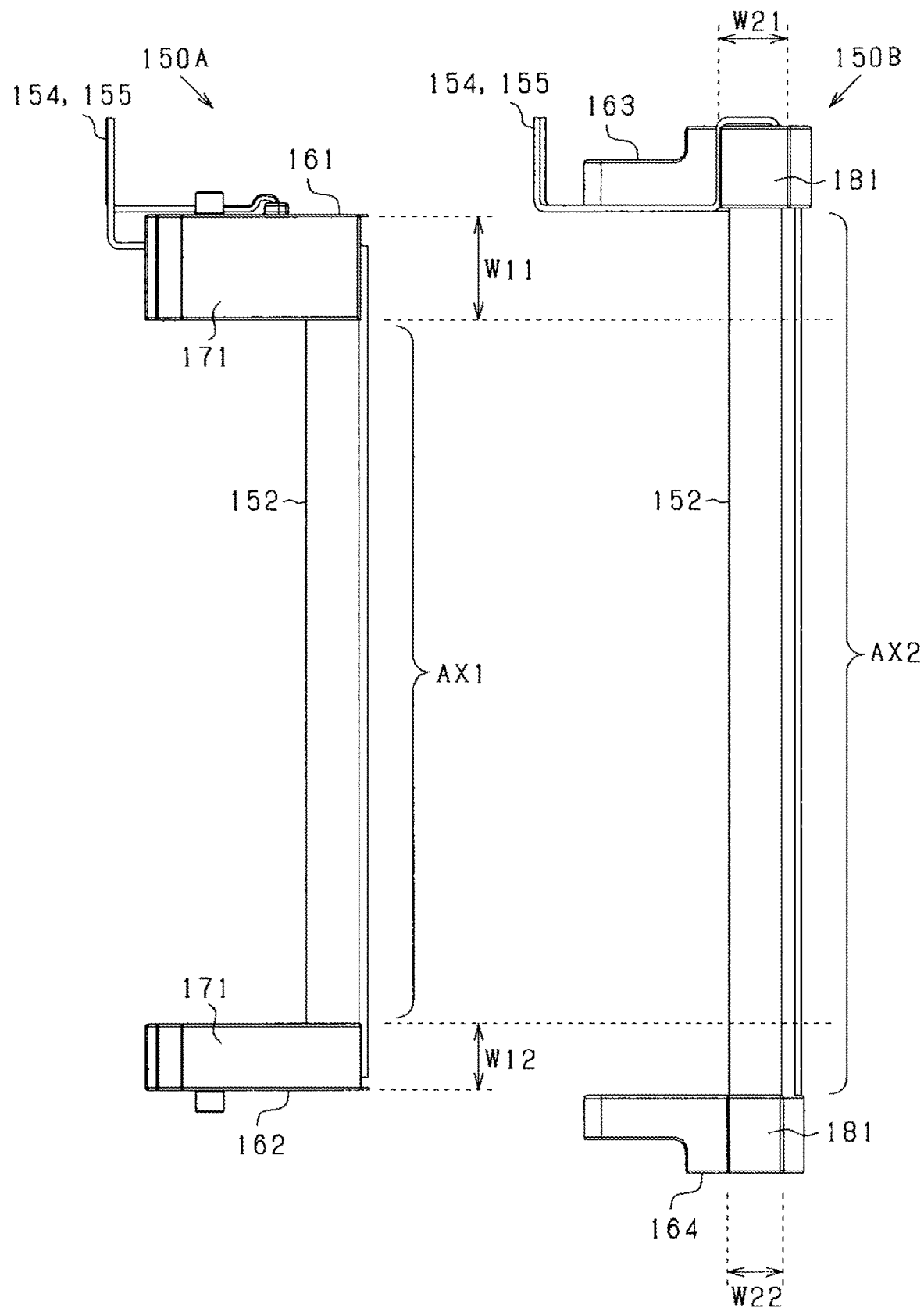
FIG. 17 is a side view which illustrates a first coil module and a second coil module arranged adjacent the first coil module for the sake of ease of comparison.
Figure 18:
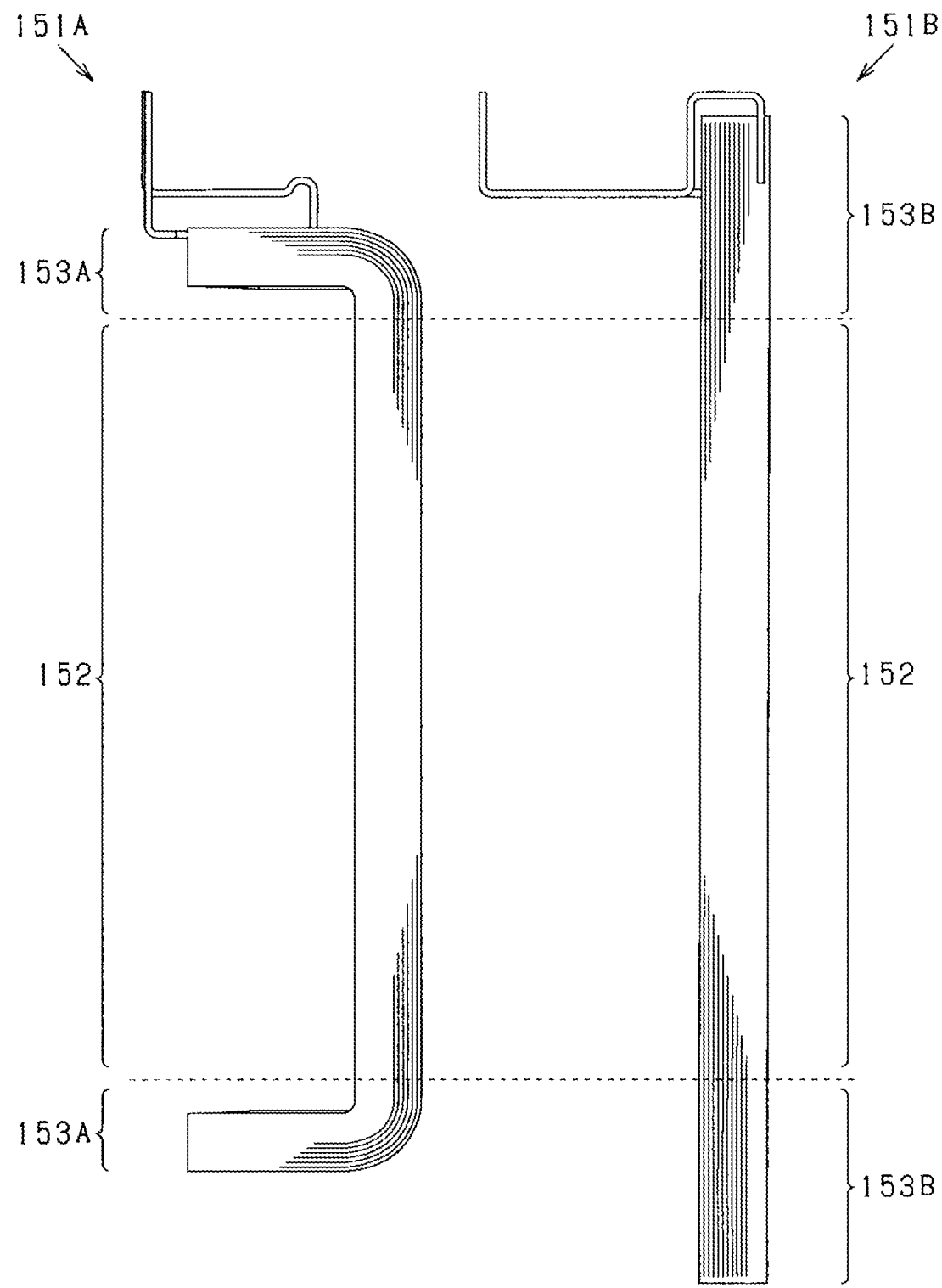
FIG. 18 is a side view which illustrates a first winding segment and a second winding segment arranged adjacent the first winding segment for the sake of ease of comparison.

FIG. 17 is a side view of each of the first coil module 150A and second coil module 150B which are arranged side by side for ease of comparison therebetween. FIG. 18 is a side view of each of the first winding segment 151A and second winding segment 151B which are arranged side by side for ease of comparison therebetween. As illustrated in each of FIGS. 17 and 18, each of the first and second coil modules 150A and 150B has a length in the axial direction of the stator core 62, and the axial length of the first coil module 150A is different from that of the second coil module 150B. Similarly, each of the first and second winding segments 151A and 151B has a length in the axial direction of the stator core 62, and the axial length of the first winding segment 151A is different from that of the second winding segment 151B. Additionally, the shape of each of the first and second ends of the first coil module 150A is different from that of the corresponding one of the first and second ends of the second coil module 150B. Similarly, the shape of each of the first and second ends of the first winding segment 151A is different from that of the corresponding one of the first and second ends of the second winding segment 151B. The first winding segment 151A has a substantially C-shape as viewed from the side, and the second winding segment 151B has a substantially I-shape as viewed from the side. Insulating covers 161 and 162, each of which serves as a first insulating cover, are mounted on the respective first and second ends of the first winding segment 151A in the axial direction. Similarly, insulating covers 163 and 164, each of which serves as a second insulating cover, are mounted on the respective first and second ends of the second winding segment 151B in the axial direction.

The following describes the configuration of each of the coil modules 150A and 150B in detail.

Figure 19A:
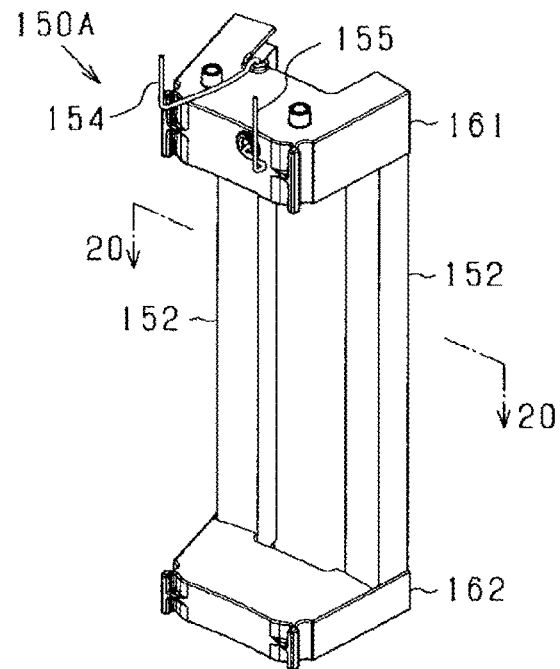
FIGS. 19(a) and 19(b) are views which illustrate a structure of a first coil module.
Figure 19B:
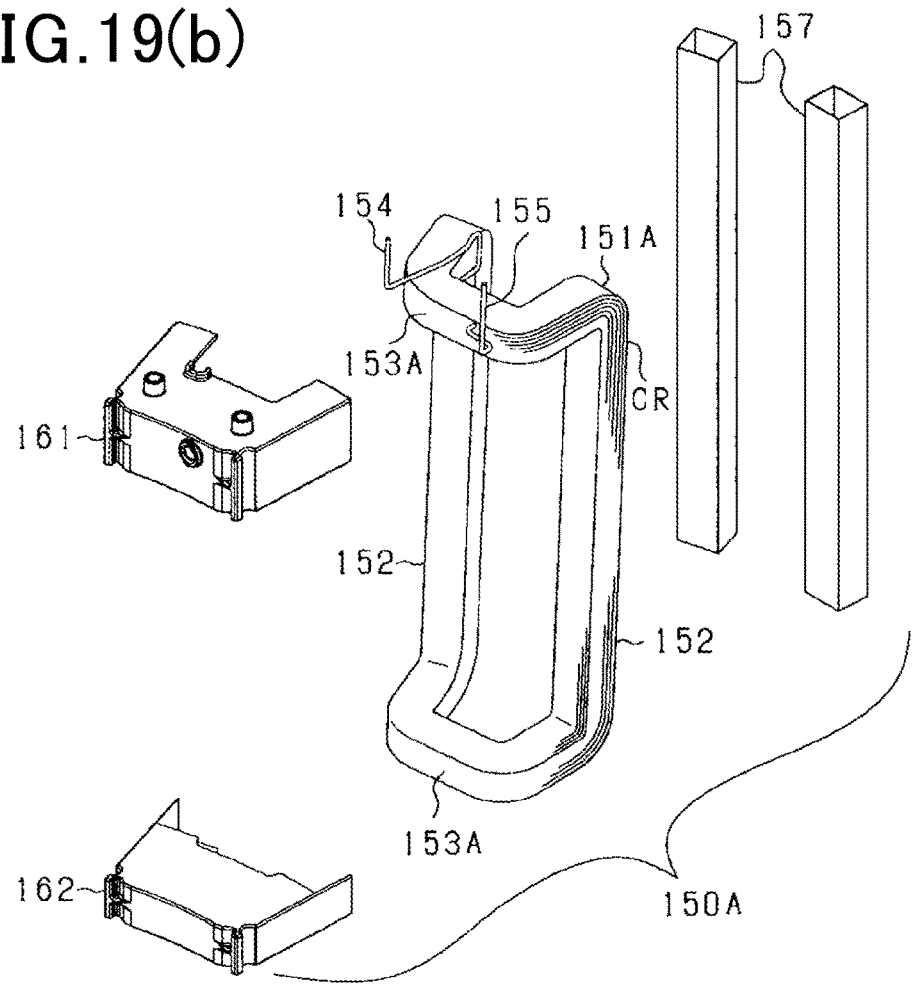
Figure 20:
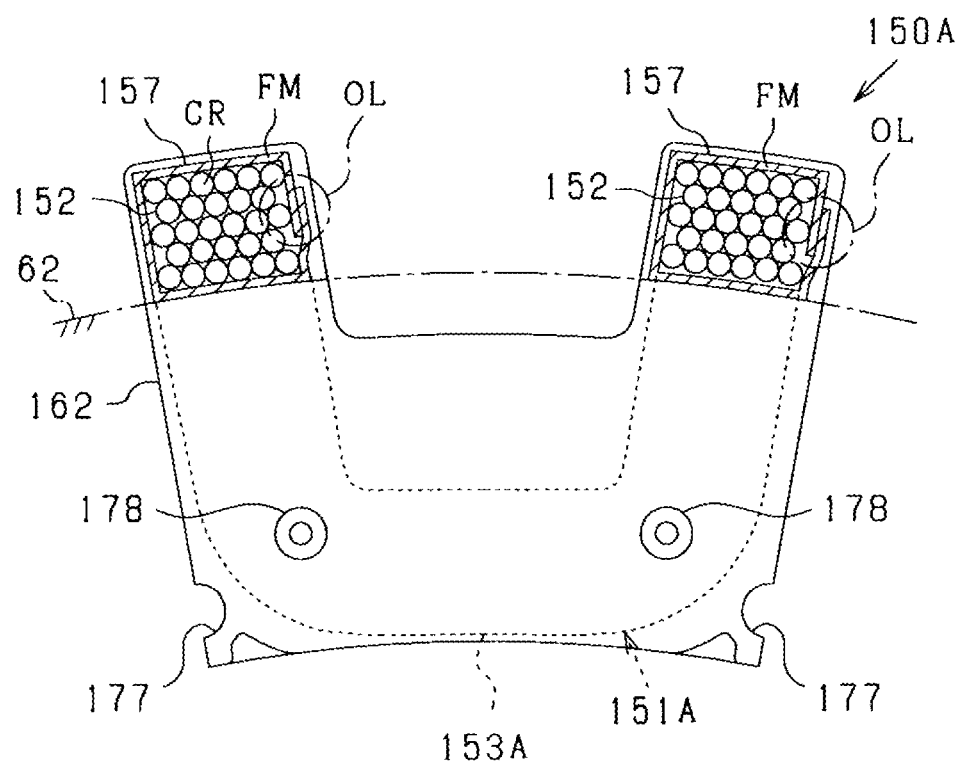
FIG. 20 is a sectional view taken along the line 20-20 in FIG. 19(a)

First, the following describes the configuration of the first coil module 150A. FIG. 19(*a*) is a perspective view of the first coil module 150A, and FIG. 19(*b*) is an exploded perspective view of components of the first coil module 150A. FIG. 20 is a sectional view taken along the line 20-20 in FIG. 19(*a*).

As illustrated in FIGS. 19(*a*) and 19(*b*), the first coil module 150A includes the first winding segment 151A, and the insulating covers 161 and 162. The winding segment 151A is comprised of a conductive wire member CR that is multiply wound. The insulating covers 161 and 162 are mounted on the respective first and second ends of the first winding segment 151A in the axial direction. Each of the insulating covers 161 and 162 is molded by an insulating material, such as a synthetic resin material.

The first winding segment 151A is comprised of a pair of intermediate conductor portions 152 and a pair of link portions 153A. The intermediate conductor portions 152 are disposed to linearly extend in parallel to each other. Each of the intermediate conductor portions 152 has opposing first and second axial ends respectively correspond to the first and second axial ends of the first winding segment 151A. One of the link portions 153A links or joints the first axial ends of the respective intermediate conductor portions 152 to each other, and the other of the link portions 153A links or joints the second axial ends of the respective intermediate conductor portions 152 to each other. The assembly of the intermediate conductor portions 152 and the link portions 153A constitutes the first winding segment 151A having an annular shape. The intermediate conductor portions 152 are arranged at a predetermined number of coil pitches away from each other. This arrangement of the intermediate conductor portions 152 of each phase winding enables at least one intermediate conductor portion 152 of at least one other-phase winding to be arranged between the intermediate conductor portions 152 of the corresponding phase winding. The intermediate conductor portions 152 of each phase winding in this embodiment are arranged two coil pitches away from each other. This arrangement of the intermediate conductor portions 152 of each phase winding enables two intermediate conductor portions 152 of the respective other phase windings to be arranged between the intermediate conductor portions 152 of the corresponding phase winding.

Each of the link portions 153A has the same shape. Each of the link portions 153A constitutes the corresponding one of the coil ends CE (see FIG. 11). Specifically, each of the link portions 153A is bent to extend perpendicularly to the intermediate conductor portions 152, i.e., to the axial direction.

Each of the first winding segments 151A, as clearly illustrated in FIG. 18, has axially opposed ends defining the link portions 153A. Each of the second winding segments 151B has axially opposed ends defining the link portions 153B. The link portions 153A and 153B of the winding segments 151A and 151B are different in configuration from each other. For ease of identification between the link portions 151A and 153B, the link portions 153A of the first winding segments 151A will also be referred to below as the first link portions 153A. The link portions 153B of the second winding segments 151B will also be referred to below as the second link portions 153B.

The intermediate conductor portions 152 of each of the winding segments 151A and 151B serve as coil side conductor portions that are circumferentially arranged away from each other and constitute the coil side CS. Each of the link portions 153A and 153B serves as a coil end link portion that links two of the intermediate conductor portions 152, which are located at different circumferential positions, of a corresponding same phase with each other; each of the link portions 153A constitutes the corresponding one of the coil ends CE.

The first winding segment 151A is, as illustrated in FIG. 20, comprised of the multiply wound conductive wire member CR to thereby have a substantially rectangular or square shape in its transverse section. FIG. 20 illustrates the transverse section of the intermediate conductor portions 152. As illustrated in FIG. 20, the conductive wire member CR is multiply wound, so that parts of the multiply-wound conductive wire member CR are arrayed in each intermediate conductor portion 152 in both the circumferential and radial directions. The arrayed parts of the multiply-wound conductive wire member CR in each intermediate conductor portion 152 of the first winding segment 151A in both the circumferential and radial directions result in the corresponding intermediate conductor portion 152 having a substantially rectangular shape. In each of the first link portions 153A, parts of the multiply wound conductive wire member CR are bent so that the bent parts of the multiply wound conductive wire member CR are arrayed in both the axial and radial directions in a radian end of the corresponding one of the first link portions 153A. In particular, the conductive wire member CR in this embodiment is concentrically wound to thereby constitute the first winding segment 151A. Howe to wound the conductive wire member CR is, however, optional. For example, the conductive wire segment CR may be multiply wound in the form of an alpha winding coil.

The conductive wire member CR has both ends 154 and 155 opposite to each other. The ends 154 and 155, which will be referred to as winding ends 154 and 155, of the multiply wound conductor wire member CR are drawn out from the respective ends of one of the first link portions 153A, which is located at the second end (upper end) of the first winding segment 151A in FIG. 19(b). One of the winding ends 154 and 155 represents the start of winding of the multiply wound conductor wire member CR, and the other thereof represents the end of winding of the multiply wound conductor wire member CR. One of the winding ends 154 and 155 is connected to a current input/output (I/O) terminal, and the other of the winding ends 154 and 155 is connected to the neutral point.

Each intermediate conductor portion 152 of the first winding segment 151A is covered with the sheet-like insulating jacket 157. FIG. 19(a) illustrates the first coil module 150A in which the intermediate conductor portions 152 are covered with the insulating jackets 157, in other words, the intermediate conductor portions 152 are disposed inside the insulating jackets 157, but however, a combination of each of the intermediate conductor portions 152 and a corresponding one of the insulating jackets 157 is denoted by numeral 152 for the sake of convenience. The same applies to FIG. 22(a), as will be referred to later.

Each of the insulating jackets 157 is made of a film member FM that has a predetermined length that corresponds to an axial length of a portion of the intermediate conductor portion 152; the portion should be covered with an insulating material. The film member FM is wrapped around the intermediate conductor portion 152. The film member FM is for example made of polyethylene naphthalate (PEN). Specifically, the film member FM is comprised of a film base having opposing first and second surfaces, and a foamable adhesion layer mounted on the first surface of the film base. The film member FM is wrapped around and attached to an outer peripheral surface of the intermediate conductor portion 152 using the adhesion layer. The adhesion layer may be made from a non-foamable adhesive.

As illustrated in FIG. 20, parts of the multiply-wound conductive wire member CR are arrayed in each intermediate conductor portion 152 in both the circumferential and radial directions. This results in each intermediate conductor portion 152 having a substantially rectangular shape in its transverse cross section. The film member FM is wrapped around the outer peripheral surface of each intermediate conductor portion 152 while both circumferential ends of the film member FM are overlapped with each other, so that the insulating jacket 157 is disposed on the intermediate conductor portion 152. The film member FM is comprised of a rectangular sheet that has a predetermined longitudinal length that is longer than a single wrap-around length of each intermediate conductor portion 152, and has a predetermined lateral length that is longer than that of the corresponding intermediate conductor portion 152. The rectangular film member FM is wrapped around the outer peripheral surface of each intermediate conductor portion 152 while being folded along respective sides of the corresponding intermediate conductor portion 152. Foam produced from the adhesion layer is filled in a clearance between the intermediate conductor portion 152 and the film member FM wrapped therearound. The adhesion layer of one of the overlapped circumferential ends of the film member FM is joined to the adhesion layer of the other of the overlapped circumferential ends of the film member FM.

More specifically, each intermediate conductor portion 152 has a pair of first and second circumferential sides opposite to each other, each of which extends in a corresponding circumferential direction of the stator core 62, and a pair of first and second radial sides opposite to each other, each of which extends in a corresponding radial direction of the stator core 62. The insulating jacket 157 is wrapped around each intermediate conductor portion 152 to cover all the sides thereof. The first circumferential side of each intermediate conductor portion 152 of one phase winding faces the first circumferential side of a circumferentially adjacent intermediate conductor portion 152 of another phase winding. The overlapped circumferential ends of the film member FM will also be referred to as an overlapped portion OL. The overlapped portion OL of the film member FM wrapped around each intermediate conductor portion 152 of one phase winding is located on the first circumferential side of the corresponding intermediate conductor portion 152 of the one phase winding. That is, in the first winding segment 151A, the overlapped portion OL of the film member FM is located on the same first circumferential side of each of the intermediate conductor portions 152.

In the first winding segment 151A, the insulating jacket 157 wrapped around each intermediate conductor portion 152 extends between a part of the lower-side link portion 153A and a part of the upper-side link portion 153A; the part of the lower-side link portion 153A is covered with the insulating cover 162 and the part of the upper-side link portion 153A is covered with the insulating cover 161. In other words, the part of the lower-side link portion 153A is located within the insulating cover 162 and the part of the upper-side link portion 153A is located within the insulating cover 161. Referring to FIG. 17, reference character AX1 represents a portion of the first coil module 150A, which is uncovered with the insulating covers 161 and 162. The insulating jacket 157 is provided to cover over an extended portion of the first coil module 150A, which is axially wider than the portion AX1 of the first coil module 150A.

Next, the following describes the structure of each of the insulating covers 161 and 162.

Figure 21A:
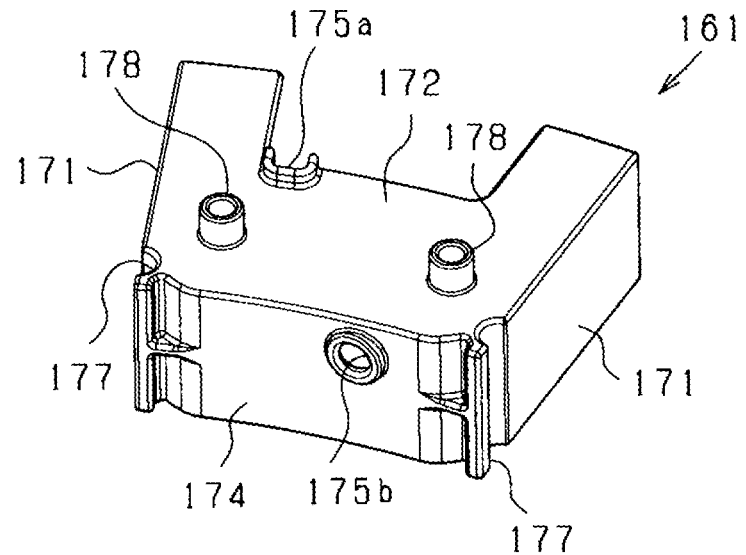
FIGS. 21(a) and 21(b) are perspective views which illustrate a structure of an insulating cover.
Figure 21B:
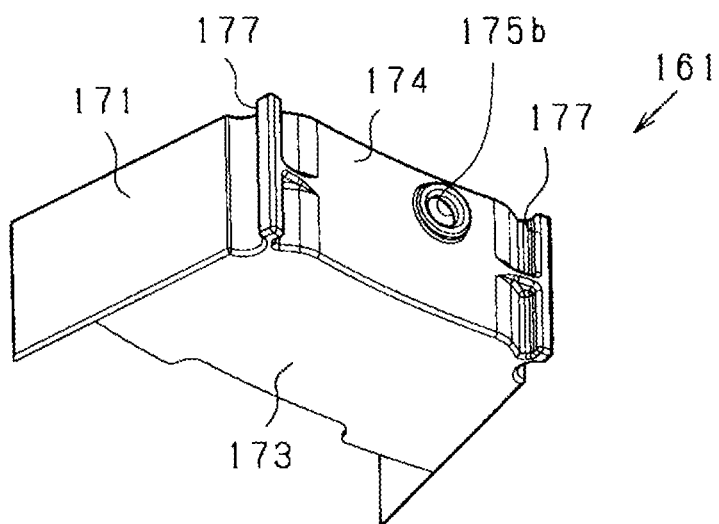

The insulating cover 161 is mounted to cover over the first link portion 153A disposed at the second end of the first winding segment 151A in the axial direction. The insulating cover 162 is mounted to cover over the first link portion 153A disposed at the first end of the first winding segment 151A in the axial direction. FIGS. 21(*a*) and 21(*b*) are perspective views respectively illustrating the insulating cover 161 as viewed from different directions.

As illustrated in FIGS. 21(*a*) and 21(*b*), the insulating cover 161 includes a pair of side walls 171, an outer wall 172, an axially inner wall 173, and a front wall 174. The side walls 171 constitute sides of the insulating cover 161 arranged at different positions in the circumferential direction of the stator core 62. The outer wall 172 constitutes an axially outer side of the insulating cover 161. The front wall 174 constitutes a radially inner side of the insulating cover 161. Each of the walls 171 to 174 has a plate-like shape, and are assembled to each other to have a solid shape with a radially outer opening surface. Each of the side walls 171 is disposed to be oriented toward the center axis of the core assembly CA to which the stator winding 61 including the side walls 171 is assembled. While the first coil modules 150A are arranged in the circumferential direction, the side walls 171 of each circumferentially adjacent pair of the insulating covers 161 face one another with being in contact with or adjacent to one another. This enables the first coil modules 150A to be arranged in the circumferential direction while being electrically isolated from each other.

The outer wall 172 of the insulating cover 161 has the opening 175*a* formed therethrough. The opening 175*a* enables the winding end 154 of the first winding segment 151A to be drawn out therethrough from the inside of the insulating cover 161. The front wall 174 of the insulating cover 161 has the opening 175*b* formed therethrough from the inside of the insulating cover 161. The opening 175*b* enables the winding end 155 of the first winding segment 151A to be drawn out therethrough from the inside of the insulating cover 161. The winding end 154 of the first winding segment 151A is drawn out through the opening 175*a* of the outer wall 172 in a corresponding radial direction and thereafter extends in the axial direction. The winding end 155 of the first winding segment 151A is drawn out from the inside of the insulating cover 161 through the opening 175*b* of the front wall 174 in the circumferential direction, and thereafter extends in a corresponding radial direction.

Each of the side walls 171 of the insulating cover 161 has the recess 177 disposed at a corner at the intersection of the corresponding one of the side walls 171 and the front wall 174. The recess 177 of each side wall 171 extends in the axial direction, and has a semi-circular shape in its transverse cross section. The insulating cover 161 has a center line along a corresponding radial direction; one side of the insulating cover 161 relative to the center line in the circumferential direction and the other side of the insulating cover 161 relative to the center line in the circumferential direction are symmetrical with each other about the center line. The outer wall 172 of the insulating cover 161 has a pair of protrusions 178 disposed at respective positions that are symmetrical with one another about the center line in the circumferential direction. Each protrusion 178 extends in the axial direction.

The following describes additional information about the recesses 177 of the insulating cover 161. As illustrated in FIG. 20, the first link portions 153A of the first winding segment 151A have a recessed shape that is convex toward the radial inside, i.e., toward the core assembly CA. This results in a circumferential space being formed between the circumferentially adjacent first link portions 153A of each circumferentially adjacent pair of first coil modules 150A; the circumferential space becomes wider as the space approaches the core assembly CA. This embodiment uses the circumferential spaces to form the recesses 177 in the side walls 171 of the insulating cover 161, that is, outside the curved portion of the first link portion 153A.

A temperature sensor, such as a thermistor, may be mounted to the first winding segment 151A. In this modification, the insulating cover 161 preferably has an opening formed therethrough. The opening enables signal lines extending from the temperature sensor to be drawn out from the inside of the insulating cover 161. This modification enables the temperature sensor to be efficiently installed in the insulating cover 161.

Although not described in detail using drawings, the insulating cover 162 has substantially the same structure as that of the insulating cover 161. Specifically, the insulating cover 162, like the insulating cover 161, includes a pair of side walls 171, the outer wall 172, the axially inner wall 173, and the front wall 174. The side walls 171 constitute sides of the insulating cover 162 arranged at different positions in the circumferential direction of the stator core 62. The outer wall 172 constitutes an axially outer side of the insulating cover 162. The front wall 174 constitutes a radially inner side of the insulating cover 162.

Each of the side walls 171 of the insulating cover 162 has the recess 177 disposed at a corner at the intersection of the corresponding one of the side walls 171 and the front wall 174. The recess 177 of each side wall 171 extends in the axial direction, and has a semi-circular shape in its transverse cross section. The outer wall 172 of the insulating cover 162 has a pair of protrusions 178 disposed thereon. As different points of the insulating cover 162 from the insulating cover 161, the insulating cover 162 has no openings formed therethrough for drawing out the winding ends 154 and 155 from the inside thereof.

Each of the insulating covers 161 and 162 has a predetermined height W11, W12 in the axial direction. Specifically, the insulating cover 161 has the height W11 (i.e., width of a portion of the insulating cover 161 constituted by the side walls 171 and front wall 174 in the axial direction). Similarly, the insulating cover 162 has the height W12 (i.e., width of a portion of the insulating cover 162 constituted by the side walls 171 and front wall 174 in the axial direction). As illustrated in FIG. 17, the height W11 of the insulating cover 161 is set to be larger than the height W12 of the insulating cover 162, which is expressed by the relation W11>W12. That is, if the winding segment 151A is comprised of the multiply wound conductive wire member CR, the multiply wound conductive wire member CR is comprised of many turns of the conductive wire member CR while the turns are shifted in a direction perpendicular to the winding direction of each turn. This may result in the axial width of the turns of the conductive wire member CR becomes larger. Additionally, the insulating cover 161 covers over the first link portion 153A that includes the start of winding of the multiply wound conductor wire member CR, and the end of winding of the multiply wound conductor wire member CR. This may result in the number of overlapped parts of the multiply wound conductor wire member CR in the first link portion 153A being larger, resulting in the axial width of the turns of the conductor wire member CR becoming larger. From this viewpoint, the height W11 of the insulating cover 161 is set to be larger than the height W12 of the insulating cover 162. This prevents a limitation of the number of turns of the conductor wire member CR as compared with a case where the insulating covers 161 and 162 have the same height.

Next, the following describes the configuration of the second coil module 150B.

Figure 22A:
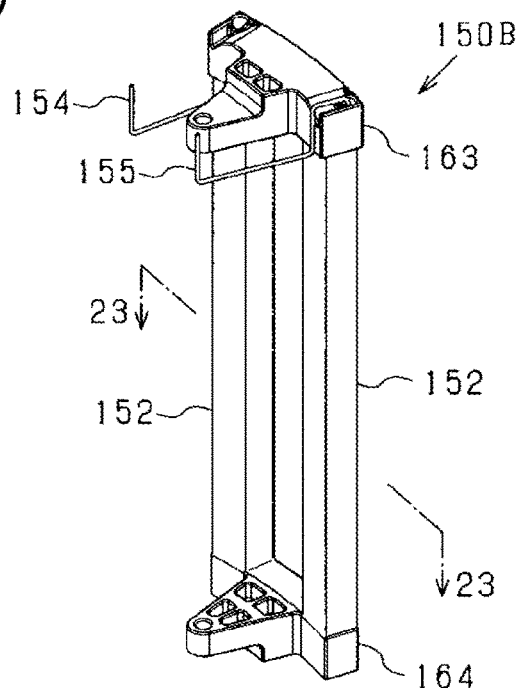
FIGS. 22(a) and 22(b) are views which illustrate a structure of a second coil module.
Figure 22B:
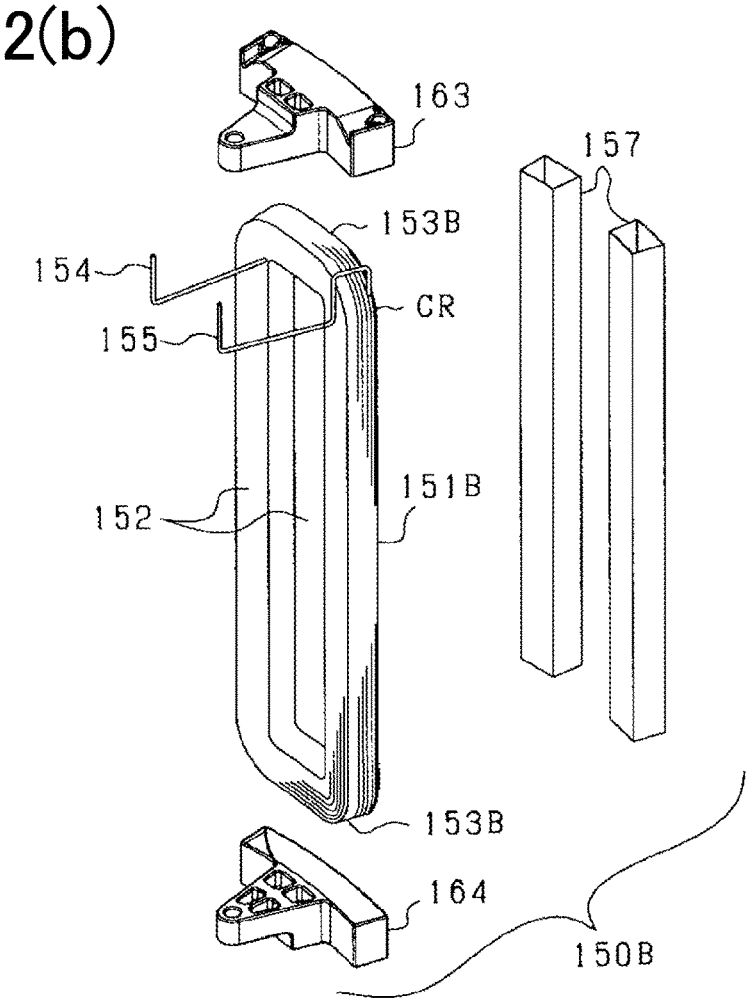
Figure 23:
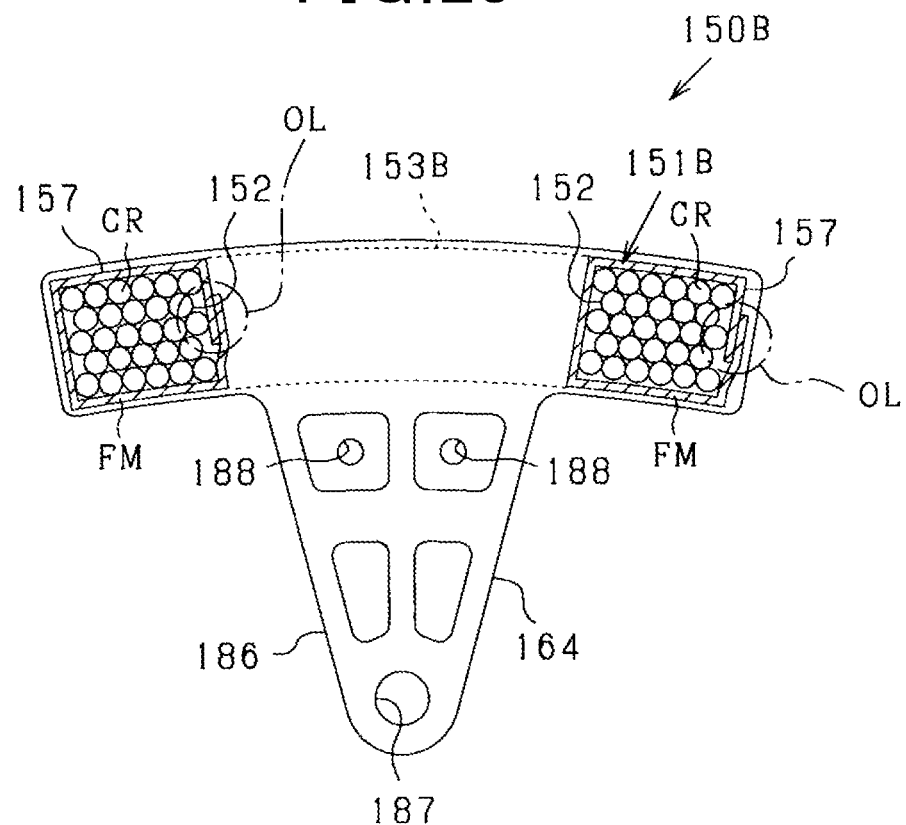
FIG. 23 is a sectional view taken along the line 23-23 in FIG. 19(a)

FIG. 22(a) is a perspective view of the coil module 150B, and FIG. 22(b) is an exploded perspective view of components of the first coil module 150B. FIG. 23 is a sectional view taken along the line 23-23 in FIG. 22(a).

As illustrated in FIGS. 22(a) and 22(b), the second coil module 150B includes the second winding segment 151B, and the insulating covers 163 and 164, which is similar to the first coil module 150A. The second winding segment 151B is comprised of a conductive wire member CR that is multiply wound. The insulating covers 163 and 164 are mounted on the respective first and second ends of the second winding segment 151B in the axial direction. Each of the insulating covers 163 and 164 is molded into the corresponding shape by an insulating material, such as a synthetic resin material.

The second winding segment 151B is comprised of a pair of intermediate conductor portions 152, and the pair of second link portions 153B. The intermediate conductor portions 152 are disposed to linearly extend in parallel to each other. Each of the intermediate conductor portions 152 has opposing first and second axial ends respectively correspond to the first and second axial ends of the second winding segment 151B. One of the second link portions 153B links the first axial ends of the respective intermediate conductor portions 152 to each other, and the other of the second link portions 153B links the second axial ends of the respective intermediate conductor portions 152 to each other. The assembly of the intermediate conductor portions 152 and the second link portions 153B constitutes the winding segment 151B having an annular shape. The configuration of each intermediate conductor portion 152 of the second winding segment 151B is the same as that of the corresponding intermediate conductor portion 152 of the first winding segment 151A. In contrast, the configuration of each of the second link portions 153B is different from that of the corresponding one of the first link portions 153A. Specifically, each of the second link portions 153B extends from the intermediate conductor portion 152 linearly in the axial direction without being radially bent. FIG. 18 illustrates the first winding segment 151A and the second winding segment 151B while being compared with each other.

The conductive wire member CR has both ends 154 and 155 opposite to each other. The ends 154 and 155, which will be referred to as winding ends 154 and 155, of the multiply wound conductor wire member CR are drawn out from the respective ends of one of the second link portions 153B, which is located at the second end (upper end) of the second winding segment 151B in FIG. 22(b). One of the winding ends 154 and 155 represents the start of winding of the multiply wound conductor wire member CR, and the other thereof represents the end of winding of the multiply wound conductor wire member CR. One of the winding ends 154 and 155 is connected to the current input/output (I/O) terminal, and the other of the winding ends 154 and 155 is connected to the neutral point.

Each intermediate conductor portion 152 of the second winding segment 151B is covered with the sheet-like insulating jacket 157, which is similar to the first winding segment 151A. The insulating jacket 157 is comprised of a film member FM that has a predetermined length that corresponds to an axial length of a portion of the intermediate conductor portion 152; the portion should be covered with an insulating material. The film member FM is wrapped around the intermediate conductor portion 152.

The configuration of the insulating jacket 157 of the second winding segment 151B is substantially identical to that of the insulating jacket 157 of the first winding segment 151A. Specifically, as illustrated in FIG. 23, the film member FM is wrapped around the outer peripheral surface of each intermediate conductor portion 152 while both circumferential ends of the film member FM are overlapped with each other. More specifically, each intermediate conductor portion 152 has a pair of first and second circumferential sides opposite to each other, each of which extends in a corresponding circumferential direction of the stator core 62, and a pair of first and second radial sides opposite to each other, each of which extends in a corresponding radial direction of the stator core 62. The insulating jacket 157 is wrapped around each intermediate conductor portion 152 to cover all the sides thereof. The first circumferential side of each intermediate conductor portion 152 of one phase winding faces the first circumferential side of a circumferentially adjacent intermediate conductor portion 152 of another phase winding. The overlapped portion OL of the film member FM wrapped around each intermediate conductor portion 152 of one phase winding are located on the first circumferential side of the corresponding intermediate conductor portion 152 of the one phase winding. That is, in the second winding segment 151B, the overlapped portion OL of the film member FM is located on the same first circumferential side of each of the intermediate conductor portions 152.

In the second winding segment 151B, the insulating jacket 157 wrapped around each intermediate conductor portion 152 extends between a part of the lower-side link portion 153B and a part of the upper-side link portion 153B; the part of the lower-side link portion 153B is covered with the insulating cover 164 and the part of the upper-side link portion 153B is covered with the insulating cover 163. In other words, the part of the lower-side link portion 153B is located within the insulating cover 164 and the part of the upper-side link portion 153B is located within the insulating cover 163. Referring to FIG. 17, reference character AX2 represents a portion of the second coil module 150B, which is uncovered with the insulating covers 163 and 164. The insulating jacket 157 is provided to cover over an extended portion of the second coil module 150B, which is axially wider than the portion AX2 of the second coil module 150B.

The insulating jacket 157 of the winding segment 151A extends to cover over a part of each of the link portions 153A, and the insulating jacket 157 of the winding segment 151B similarly extends to cover over a part of each of the link portions 153B. Specifically, each insulating jacket 157 of the first winding segment 151A is disposed to cover over (i) a corresponding one of the intermediate conductor portions 152 and (ii) a part of each link portion 153A, which continuously extends linearly from the corresponding one of the intermediate conductor portions 152. Because the axial length of the winding segment 151A is different from that of the winding segment 151B, the axial range of the winding segment 151A, which is covered with the insulating jacket 157, is also different from the axial range of the winding segment 151B, which is covered with the insulating jacket 157.

the following describes the structure of each of the insulating covers 163 and 164.

Figure 24A:
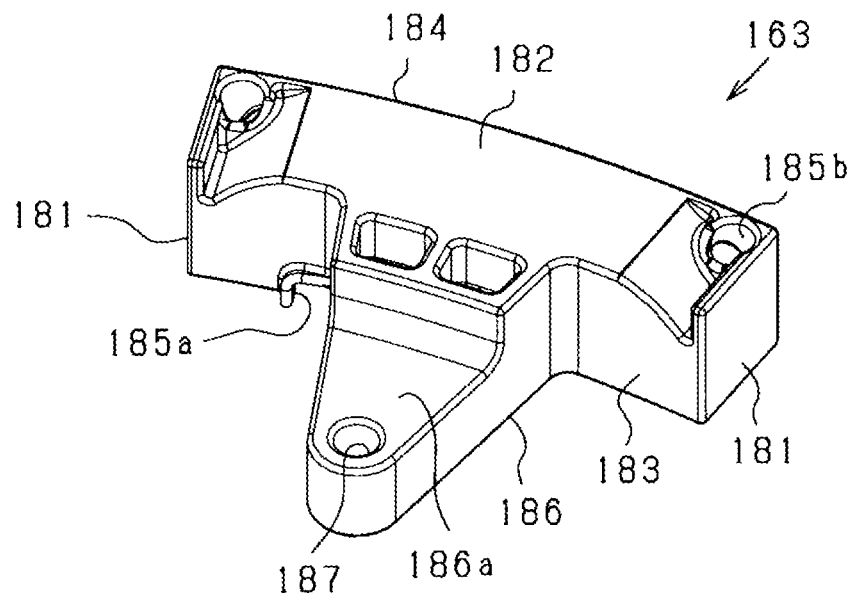
FIGS. 24(a) and 24(b) are perspective views which illustrate a structure of an insulating cover.
Figure 24B:
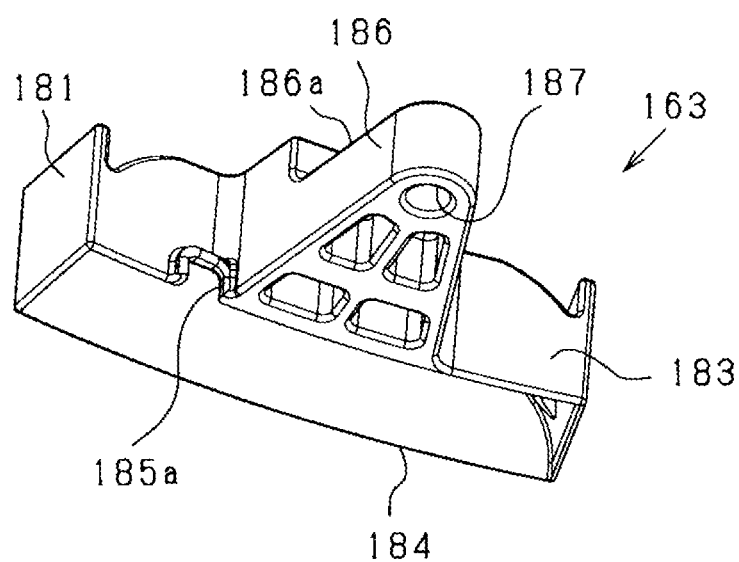

The insulating cover 163 is mounted to cover over the second link portion 153B disposed at the second end of the second winding segment 151B in the axial direction. The insulating cover 164 is mounted to cover over the second link portion 153B disposed at the first end of the second winding segment 151B in the axial direction. FIGS. 24(a) and 24(b) are perspective views respectively illustrating the insulating cover 163 as viewed from different directions.

As illustrated in FIGS. 24(a) and 24(b), the insulating cover 163 includes a pair of side walls 181, the outer wall 182, the radially inner front wall 183, and the rear wall 184. The side walls 181 constitute sides of the insulating cover 163 arranged at different positions in the circumferential direction of the stator core 62. The outer wall 182 constitutes an axially outer side of the insulating cover 163. The front wall 183 constitutes a radially inner side of the insulating cover 163. The rear wall 184 constitutes a radially outer side of the insulating cover 163. Each of the walls 181 to 184 has a plate-like shape, and are assembled to each other to have a solid shape with an axially inner opening surface. Each of the side walls 181 is disposed to be oriented toward the center axis of the core assembly CA to which the stator winding 61 including the side walls 181 is assembled. While the second coil modules 150B are arranged in the circumferential direction, the side walls 181 of each circumferentially adjacent pair of the insulating covers 163 face one another with being in contact with or adjacent to one another. This enables the second coil modules 150B to be arranged in the circumferential direction while being electrically isolated from each other.

The front wall 183 of the insulating cover 163 has the opening 185a formed therethrough from the inside of the insulating cover 163. The opening 185a enables the winding end 154 of the second winding segment 151B to be drawn out therethrough from the inside of the insulating cover 163. The outer wall 182 of the insulating cover 163 has an opening 185b formed therethrough from the inside of the insulating cover 163. The opening 185b enables the winding end 155 of the second winding segment 151B to be drawn out therethrough from the inside of the insulating cover 163.

The front wall 183 of the insulating cover 163 has the protrusion 186 protruding radially inward from the front wall 183. The protrusion 186 is disposed at the middle between the side walls 181 in the circumferential direction, and is configured to protrude more radially inward than each second link portion 153B does. That is, the protruding length of the protrusion 186 is larger than the protruding length of each second link portion 153B. The protrusion 186 has a tapered shape that becomes tapered as extending radially inward as viewed from above. The protrusion 186 has an extending end, and the through hole 187 formed through the extending end; the through hole 187 extends in the axial direction. The configuration of the protrusion 186 may be freely designed as long as (1) The protrusion 186 protrudes more radially inward than each second link portion 153B does.
(2) The extending end of the protrusion 186 has formed therethrough the through hole 187 that is disposed at qual distances away from the side walls 181 in the circumferential direction.

Preferably, for considering an overlapped state of the protrusion 163 and the radially disposed insulating covers 161, the circumferential width of the protrusion 186 is as narrow as possible for preventing interference between the protrusion 186 and the winding ends 154 and 155.

In particular, the extending end of the protrusion 186 has an axial thickness smaller than an axial thickness of the remaining portion of thereof. The extending end of the protrusion 186, which has a smaller thickness, is defined as a low-height portion 186a. The low-height portion 186a of the protrusion 186 has the through hole 187 formed therethrough. The axial height of the low-height portion 186a of the protrusion 186 of each second coil module 150B relative to the end surface of the first end of the inner cylindrical member 81 is lower than the axial height of the upper link portion 153B of the corresponding second coil module 150B while the second coil modules 150B are assembled to the core assembly CA.

As illustrated in FIG. 23, the remaining part of the protrusion 186 has a pair of through holes 188 formed therethrough. The through holes 188 of the protrusion 186 enable, while the insulating covers 161 and 163 are axially overlapped with each other, adhesive to be applied through the through holes 188. This results in the applied adhesive being filled between the axially overlapped insulating covers 161 and 163.

Although omitted in the drawings, the insulating cover 164 has substantially the same structure as that of the insulating cover 163. Specifically, the insulating cover 164, like the insulating cover 163, includes a pair of side walls 181, the outer wall 182, the radially inner front wall 183, and the rear wall 184. The side walls 181 constitute sides of the insulating cover 164 arranged at different positions in the circumferential direction of the stator core 62. The outer wall 182 constitutes an axially outer side of the insulating cover 164. The front wall 183 constitutes a radially inner side of the insulating cover 164. The rear wall 184 constitutes a radially outer side of the insulating cover 164. The front wall 183 of the insulating cover 164 has the protrusion 186 protruding radially inward from the front wall 183. The protrusion 186 has the through hole 187 formed through the extending end. As different points of the insulating cover 164 from the insulating cover 163, the insulating cover 164 has no openings formed therethrough for drawing out the winding ends 154 and 155 of the second winding segment 151B from the inside thereof.

Each side wall 181 of the insulating cover 163 has a predetermined radial width W21, and each side wall 181 of the insulating cover 164 has a predetermined radial width W22. Specifically, as illustrated in FIG. 17, the radial width W21 of the insulating cover 163 is set to be larger than the radial width W22 of the insulating cover 164, which is expressed by the following relation "W21>W22". That is, if the winding segment 151B is comprised of the multiply wound conductive wire member CR, the insulating cover 163 covers over the second link portion 153B that includes the start of winding of the multiply wound conductor wire member CR, and the end of winding of the multiply wound conductor wire member CR. This may result in the number of overlapped parts of the multiply wound conductor wire member CR in the second link portion 153B being larger, resulting in the axial width of the turns of the conductive wire member CR becoming larger. From this viewpoint, the radial width W21 of the insulating cover 163 is set to be larger than the radial width W22 of the insulating cover 164. This prevents a limitation of the number of turns of the conductor wire member CR as compared with a case where the insulating covers 163 and 164 have the same radial width.

Figure 25:
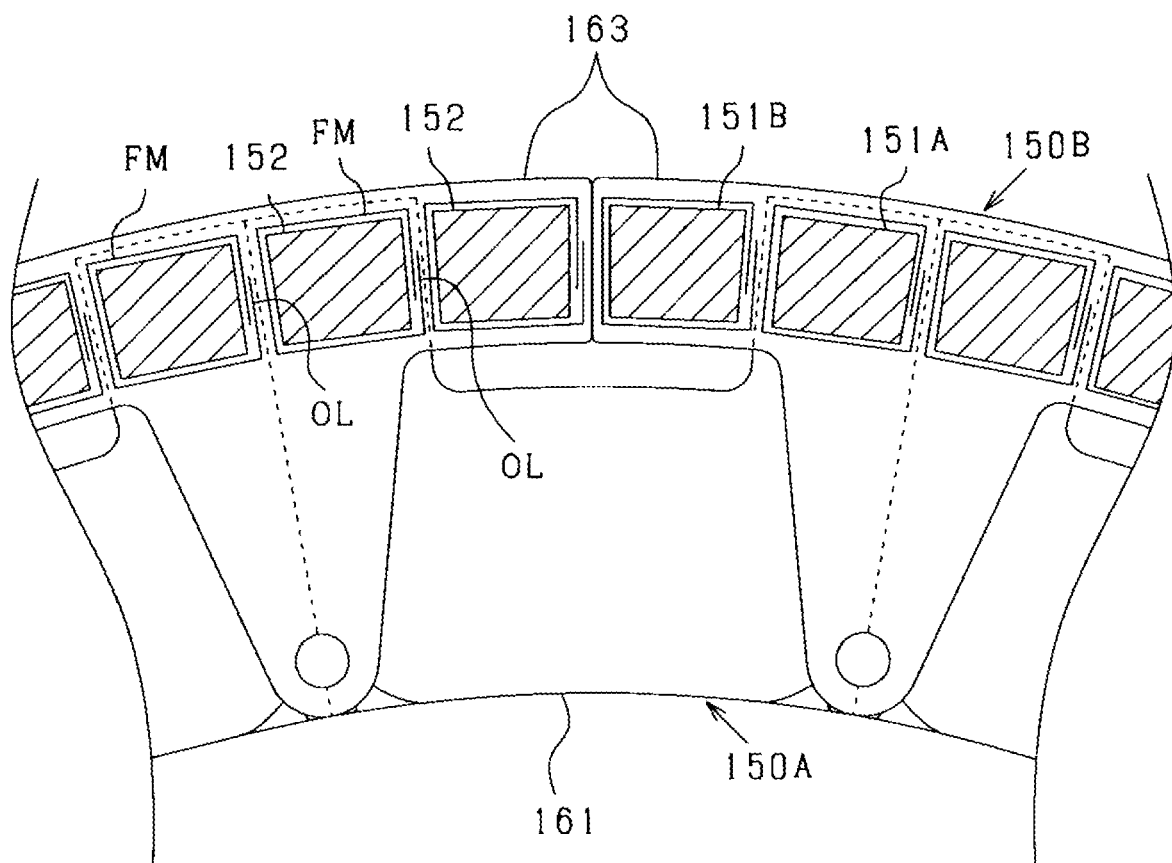
FIG. 25 is a view which illustrates an overlap of film members in a circumferential array of coil modules.

FIG. 25 is a view illustrating how the overlapped portions OL of the respective film members FM are arranged while the coil modules 150A and 150B are circumferentially arranged. As described above, the film member FM is wrapped around the outer peripheral surface of each intermediate conductor portion 152 of each coil module 150A, 150B while (1) Both circumferential ends of the film member FM are overlapped with each other as the overlapped portion OL
(2) The overlapped portion OL of the film member FM is located at the first circumferential side of the corresponding intermediate conductor portion 152; the first circumferential side faces the intermediate conductor portion 152 of another phase (see FIGS. 20 and 23).

This results in the overlapped portion OL of each film member FM being located on the same side, i.e., the right side in FIG. 25, of the corresponding intermediate conductor portion 152 in the circumferential direction. This therefore results in the overlapped portion OL of the film member FM of the intermediate conductor portion 152 of a one-phase winding segment 151A and the overlapped portion OL of the film member FM of the intermediate conductor portion 152 of another-phase winding segment 151B, which is circumferentially adjacent to the one-phase winding segment 151A, being circumferentially not overlapped with each other. Between the circumferentially adjacent pair of intermediate conductor portions 152, at most three parts of the film members FM are located.

Next, the following describes the structure of the coil modules 150A and 150B being assembled to the core assembly CA.

The axial length of the coil module 150A is different from that of the coil module 150B, and the configuration of each link portion 153A of the coil module 150A is different from that of the corresponding link portion 153B of the coil module 150B. The coil modules 150A and 150B are assembled to the core assembly CA while the first link portions 153A of each coil module 150A are disposed radially closer to the core assembly CA and the second link portions 153B of each coil module 150B are disposed radially farther from the core assembly CA. The insulating covers 161 to 164 are secured to the core assembly CA while the insulating covers 161 and 163 are axially overlapped with each other at the second end of the core assembly CA and the insulating covers 162 and 164 are axially overlapped with each other at the first end of the core assembly CA.

Figure 26:
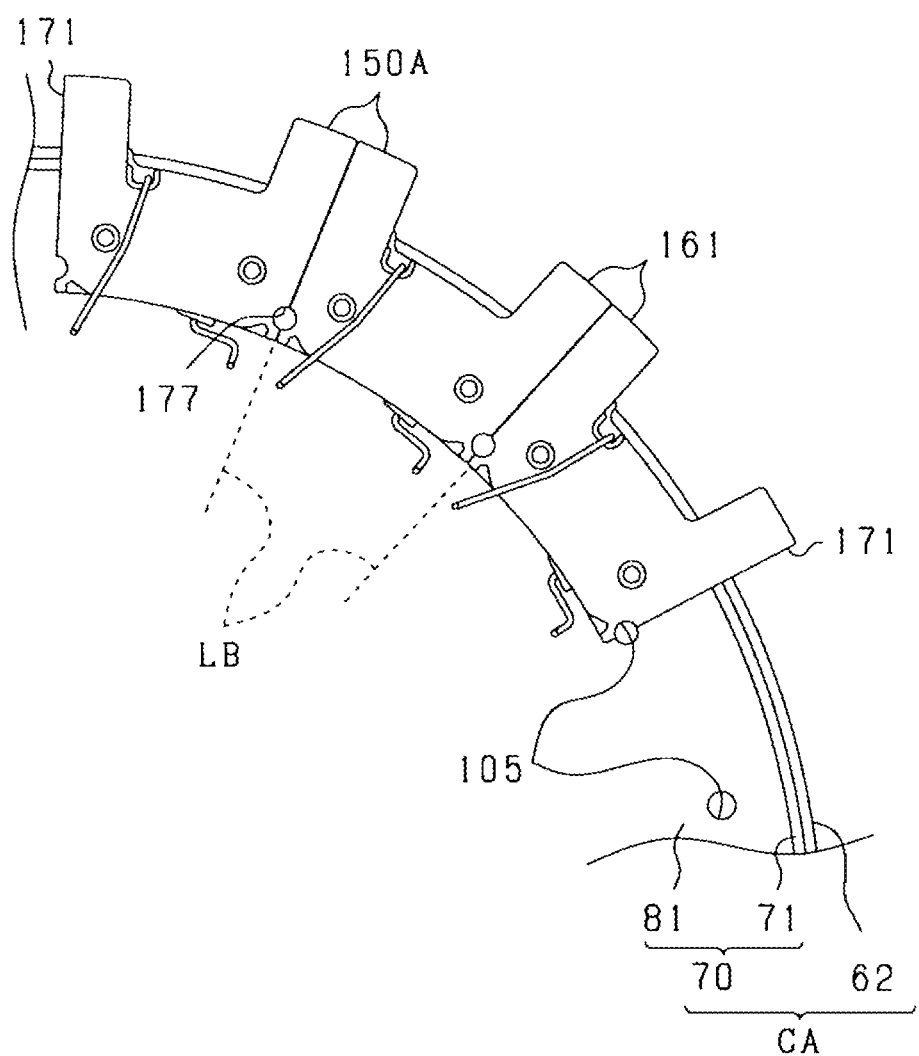
FIG. 26 is a plan view which illustrates attachment of a first coil module to a core assembly.
Figure 27:
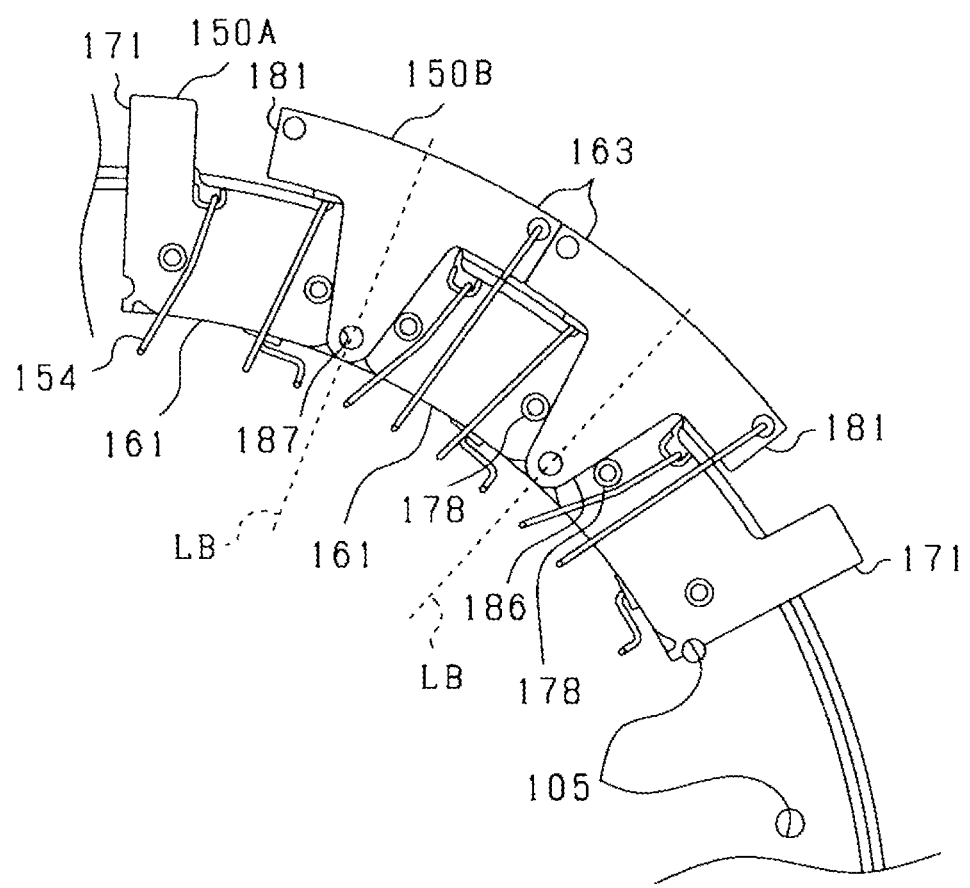
FIG. 27 is a plan view which illustrates attachment of a first coil module and a second coil module to a core assembly.
Figure 28A:
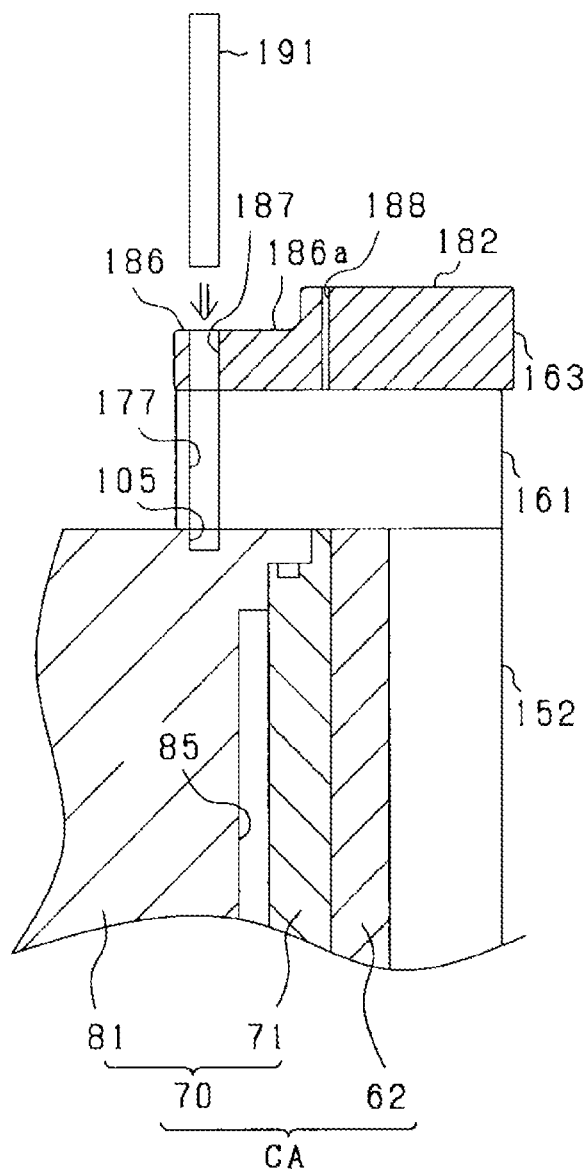
FIGS. 28(a) and 28(b) are longitudinal sectional views which illustrate a fastened state using fastening pins.
Figure 28B:
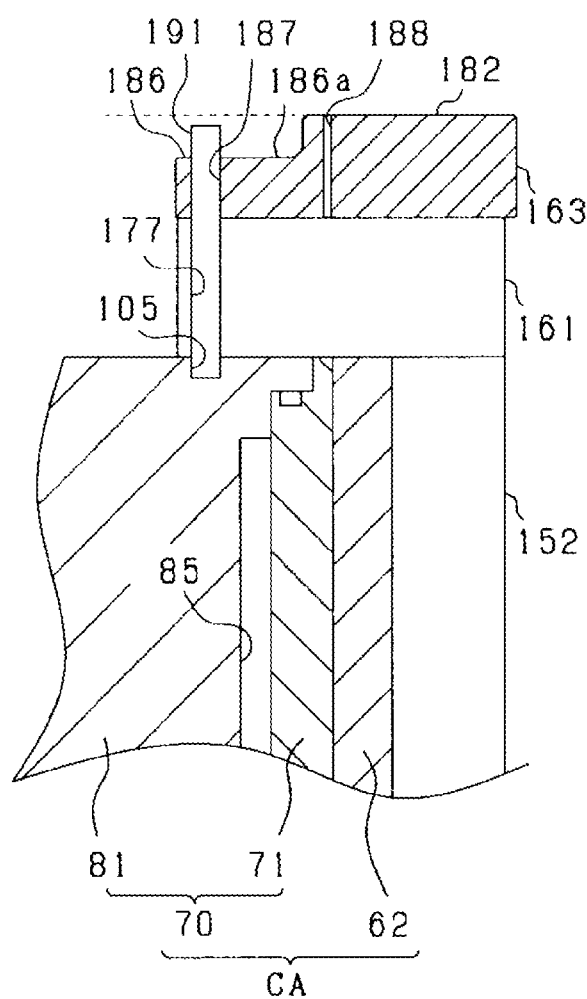

FIG. 26 is a plan view illustrating that the insulating covers 161 are circumferentially arranged while the first coil modules 150A are assembled to the core assembly CA. FIG. 27 is a plan view illustrating that the insulating covers 161 and 163 are circumferentially arranged while the first and second coil modules 150A and 150B are assembled to the core assembly CA. FIG. 28(a) is a longitudinal sectional view illustrating that the coil modules 150A and 150B are assembled to the core assembly CA before fastening of the insulating covers 161 and 163 to the core assembly CA using fastening pins 191. FIG. 28(b) is a longitudinal sectional view illustrating that the coil modules 150A and 150B are assembled to the core assembly CA after fastening of the insulating covers 161 and 163 to the core assembly CA using the fastening pins 191.

As illustrated in FIG. 26, while the first coil modules 150 are assembled to the core assembly CA, the insulating covers 161 are circumferentially arranged such that the side walls 171 of each circumferentially adjacent pair of the insulating covers 161 face one another with being in contact with or adjacent to one another. Each circumferentially adjacent pair of the insulating covers 161 is arranged such that a boundary line LB extending along the facing side walls 171 is axially aligned with a corresponding one of the recesses 105 formed in the outer surface of the end plate 91 of the inner cylindrical member 81. Since the side walls 171 of each circumferentially adjacent pair of the insulating covers 161 are in contact with or adjacent to one another, the recesses 177 of each circumferentially adjacent pair of the insulating covers 161 form a through hole extending in the axial direction. The through hole formed in each circumferentially adjacent pair of the insulating covers 161 is axially aligned with the corresponding one of the recesses 105 of the end plate 91 of the inner cylindrical member 81.

The second coil modules 150B are, as illustrated in FIG. 27, assembled to the assembly of the first coil modules 150A and the core assembly CA. This assembling of the second coil modules 150B to the core assembly CA results in the side walls 181 of each circumferentially adjacent pair of the insulating covers 163 facing one another with being in contact with or adjacent to one another. This assembling of the second coil modules 150B to the core assembly CA also results in the link portions 153A and 153B intersecting with each other on a virtual circle along which the intermediate conductor portions 152 are circumferentially arranged while the assembly of the coil modules 150A and 150B and the core assembly CA is viewed above. Each insulating cover 163 is disposed such that (1) The protrusion 186 is axially overlapped with a boundary of a corresponding circumferentially adjacent pair of the insulating covers 161
(2) The through hole 187 is axially aligned with the through hole defined by the recesses 177 of a corresponding one circumferentially adjacent pair of the insulating covers 161.

When the second coil modules 150B are assembled to the assembly of the first coil modules 150A and the core assembly CA, the protrusion 186 of each insulating cover 163 is guided by the protrusions 178 of a corresponding circumferentially adjacent pair of insulating covers 161. This results in the through hole 187 of the protrusion 186 of each insulating cover 163 being axially aligned with (1) The through hole defined by the recesses 177 of a corresponding one circumferentially adjacent pair of the insulating covers 161
(2) A corresponding one of the recesses 105 of the end plate 91 of the inner cylindrical member 81

When the coil modules 150B are assembled to the assembly of the core assembly CA and the coil modules 150A, the through hole defined by the recesses 177 of each circumferentially adjacent pair of the insulating covers 161 is located inwardly. There may be therefore a concern that it is difficult to axially align the through hole 187 of the protrusion 186 of each insulating cover 163 with the through hole defined by the recesses 177 of a corresponding circumferentially adjacent pair of the insulating covers 161. Regarding such a concern, the protrusion 186 of each insulating cover 163 is guided by the protrusions 178 of a corresponding circumferentially adjacent pair of insulating covers 161. This makes it possible to easily axially align the through hole 187 of the protrusion 186 of each insulating cover 163 with the through hole defined by the recesses 177 of a corresponding one circumferentially adjacent pair of the insulating covers 161.

Joining of the insulating cover 161 and the insulating cover 613 is, as illustrated in FIGS. 28(*a*) and 28(*b*), achieved by the fastening pin 191 at an overlap of the insulating cover 161 with the protrusion 186 of the insulating cover 163. Specifically, such joining is accomplished by aligning the recess 105 of the inner cylindrical member 81, the recess 177 of the insulating cover 161, and the through hole 187 of the insulating cover 163 with each other and then inserting the fastening pin 191 into them, thereby firmly securing the insulating covers 161 and 163 to the inner cylindrical member 81. This results in joint of a respective circumferentially adjacent coil modules 150A and 150B to the core assembly CA at the coil end CE using the common fastening pin 191. It is advisable that each of the fastening pins 191 be made from high-thermal conductive material, such as metal.

As illustrated in FIG. 28(*b*), the fastening pin 191, which has opposing upper and lower ends in its axial direction, for each insulating cover 163 is mounted through the low-height portion 186*a* of the corresponding insulating cover 163. In this state, the upper end of the fastening pin 191 is disposed to project over the low-height portion 186*a* while being axially lower than an outer surface, i.e., an upper surface, of the outer wall 182 of the insulating cover 163. The fastening pin 191 has a length in its axial direction, and the length of the fastening pin 191 is larger than the axially overlapped portion of the low-height portion 186*a* of the protrusion 186 and the insulating cover 161, so that the upper end of the fastening pin 191, which projects over the low-height portion 186*a*, serves as a margin. The margin of the fastening pin 191 enables, for insertion of each fastening pin 191 through the corresponding through hole 187 and the corresponding through hole formed by the recesses 177 into the corresponding recess 105, the corresponding fastening pin 191 to be easily inserted through the corresponding through hole 187 and the corresponding through hole formed by the recesses 177 into the corresponding recess 105. The upper end of the fastening pin 191 is disposed to be axially lower than the outer surface 173, i.e., the upper surface, of the insulating cover 163. This prevents an increase in the axial length of the stator 60 due to the projecting fastening pins 191.

After the insulating covers 161 and 163 are fastened to the core assembly CA using the fastening pins 191, adhesive is applied through the through holes 188 of the insulating cover 163, so that the applied adhesive is filled between the axially overlapped insulating covers 161 and 163. This results in the axially overlapped insulating covers 161 and 163 being strongly joined to each other. For the sake of simplicity, FIGS. 28(*a*) and 28(*b*) illustrate the through holes 188 as being formed through the remaining part of the protrusion 186 except the low-height portion 186*a* of the insulating cover 163 between the outer surface (upper surface) of the outer wall 182 and an outer surface, i.e., a lower surface) of a bottom wall of the insulating cover 163; the bottom wall is opposite to the outer wall 182. Actually, the through holes 188 may be formed through a thinner-thickness part of the protrusion 186; the thinner-thickness part of the protrusion 186 is smaller in axial thickness than the remaining of the protrusion 186.

The securement of the insulating covers 161 and 163 using the fastening pin 191 is, as illustrated in FIG. 28(*b*), achieved on the axial end surface of the stator holder 70 which is located radially inside the stator core 62 (i.e., the left side of the drawing). The insulating covers 161 and 163 are attached to the stator holder 70 using the fastening pin 191. In other words, the first link portions 153A are fixed on the axial ends of the stator holder 70. The stator holder 70 has the coolant path 85 therein, so that heat generated from the first winding segments 151A will be transferred directly from the first upper link portions 153A to the coolant path 85 of the stator holder 70 or a region of the stator holder 70 around the coolant path 85. Additionally, each fastening pin 191 is disposed in a corresponding one of the recesses 105 of the stator holder 70, thereby facilitating the transfer of heat to the stator holder 70 through the corresponding fastening pin 191. The above configuration of the rotating electrical machine 10, therefore, has a higher performance of cooling the stator winding 61.

Eighteen insulating covers 161 and eighteen insulating covers 163 are arranged to be axially overlapped with one another; the axially overlapped insulating covers 161 and 173 constitute the coil end CE. Eighteen recesses 105 are formed in the outer surface of the stator holder 70. The eighteen insulating covers 161 and eighteen insulating covers 163 are secured to the core assembly CA at the respective eighteen recesses 105 and eighteen fastening pins 191.

How the insulating covers 162 and 164 are assembled to the first end of the core assembly CA in the axial direction, which is although unillustrated, is similar to how the insulating covers 161 and 163 are assembled to the second end of the core assembly CA in the axial direction. Specifically, the securement of the first coil modules 150A is first achieved by placing the side walls 171 of the respective circumferentially adjacent insulating covers 162 in contact with or close to each other to define an axially extending through hole by the recesses 177 of the insulating covers 162. The axially extending through hole is aligned with a corresponding one of the recesses 106 formed in the axial end of the outer cylindrical member 71. The securement of each of the second coil module 150B is achieved to align the through-hole 187 of the insulating cover 164 with the through-hole of the insulating cover 163 and the recess 106 of the outer cylindrical member 71. The fastening pin 191 is inserted into the recesses 106 and 177 and the through-hole 187, thereby firmly attaching the insulating covers 162 and 164 to the outer cylindrical member 71.

Preferably, all the coil modules 150A are assembled to the outer peripheral surface of the core assembly CA, and thereafter all the coil modules 150B are assembled to the outer peripheral surface of the core assembly CA and the insulating covers 161 to 164 are fastened to the core assembly CA using the fastening pins 191. Alternatively, a first step of fastening a pair of one first coil module 150A and one second col module 150B to one another using one fastening pin 191 is carried out. Next, a second step of assembling, to the outer peripheral surface of the core assembly CA, the first coil module 150A and second coil module 150B fastened to each other by the fastening pin 191 is carried out. Then, the first step and second step are repeatedly carried out.

Next, the following describes the busbar module 200.

The busbar module 200 is electrically connected to the winding segments 151 of the coil modules 150, so that
(1) First ends of the winding segments 151 for the U-phase are connected in parallel to each other
(2) First ends of the winding segments 151 for the V-phase are connected in parallel to each other
(3) First ends of the winding segments 151 for the W-phase are connected in parallel to each other
(4) Second ends, which are opposite to the first ends, of the winding segments 151 for all the phases are connected to each other at a neutral point.

Figure 29:
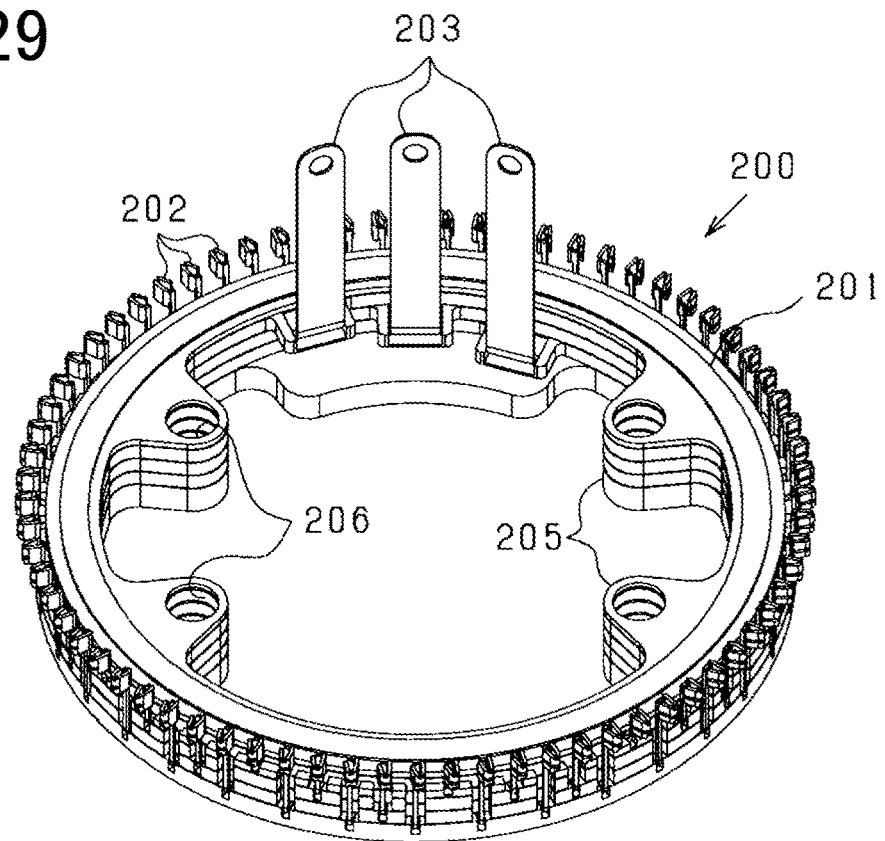
FIG. 29 is a perspective view of a bus module.
Figure 30:
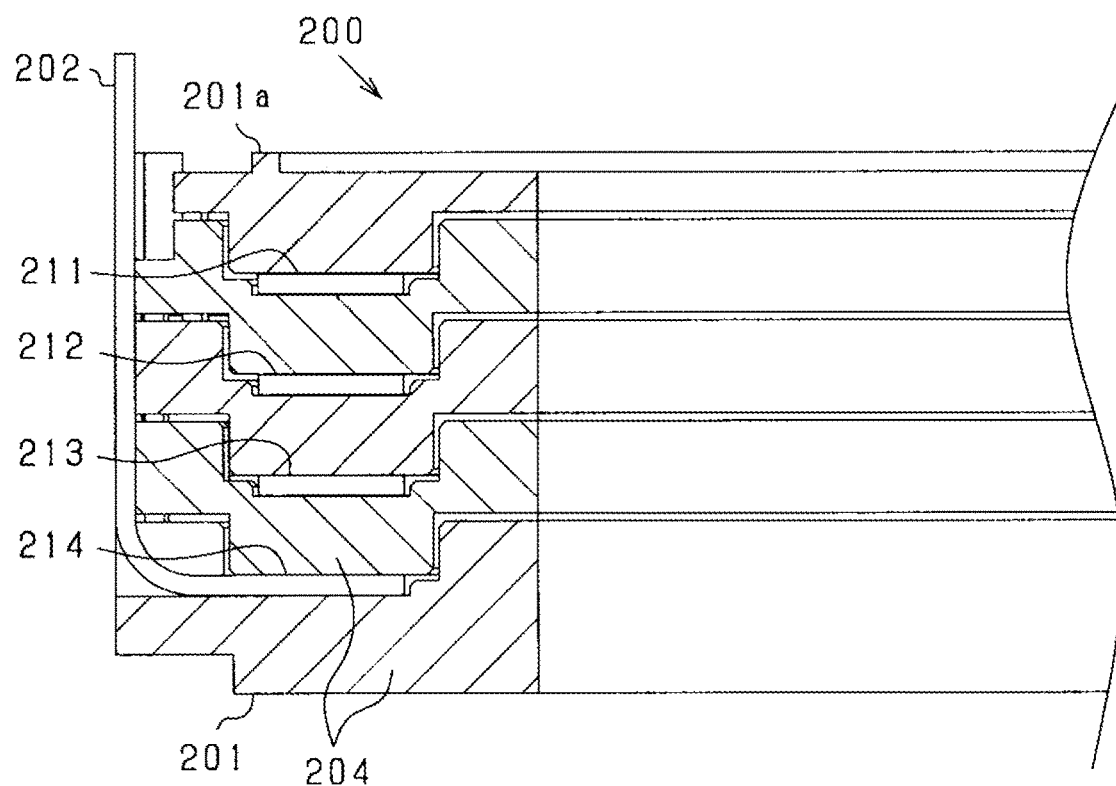
FIG. 30 is a partial longitudinal sectional view of a bus module.

FIG. 29 is a perspective view of the busbar module 200. FIG. 30 is a longitudinal sectional view of a part of the busbar module 200.

The busbar module 200 includes the annular ring 201, a plurality of connection terminals 202, and three input/output (I/O) terminals 203 provided for the respective phase windings. The connection terminals 202 extend from the annular ring 201. The annular ring 201 is made of an insulating member, such as resin, in a circular shape.

The annular ring 201, as illustrated in FIG. 30, includes a plurality of, i.e., five in this modification, substantially annular plates 204 stacked in the same axial direction. The annular plates 204 will be also referred to as substantially annular stacked plates 204. The busbar module 200 also includes four busbars 211 to 214. Each of the busbars 211 to 214 is interposed between a corresponding axially adjacent pair of annular stacked plates 204. Each of the busbars 211 to 214 has an annular shape. The busbars 211 to 214 include a U-phase busbar 211, a V-phase busbar 212, a W-phase busbar 213, and a neutral-point busbar 214. These busbars 211 to 214 are aligned in the axial direction of the annular ring 201 while their major surfaces face each other. Each of the busbars 211 to 214 is adhered to a corresponding axially adjacent pair of annular stacked plates 204. For example, adhesive sheets are preferably used for bonding each of the busbars 211 to 214 to a corresponding axially adjacent pair of annular stacked plates 204. Semi-liquid adhesive or liquid adhesive may alternatively be applied to opposing major surfaces of each stacked plate 204 for bonding each of the busbars 211 to 214 to a corresponding axially adjacent pair of annular stacked plates 204. First ends of the connection terminals 202 are each connected to a corresponding one of the busbars 211 to 214 in the annular ring 201, and second ends of the connection terminals 202 protrude radially outside the annular ring 201.

An upper surface of the annular ring 201, that is, an outermost one of the five stacked plates 204 has formed thereon the protrusion 201a which extends in an annular shape.

The busbar module 200 may be designed as long as the busbars 211 to 214 are embedded in the annular ring 201. For example, the annular ring 201 and the busbars 211 to 214 arranged at regular intervals may be integrally insert molded. Although the busbars 211 to 214 of the busbar module 200 are aligned in the axial direction while the bar surface of each busbar 211 to 214 is perpendicular to the axial direction, but the arrangement of the busbars 211 to 214 may be optionally selected. For example, the busbars 211 to 214 of the busbar module 200 are aligned in the radial direction. Two of the busbars 211 to 214 may alternatively be aligned in the axial direction, and the remaining two thereof may be aligned in the radial direction. The busbars 211 to 214 may extend in respective directions.

The connection terminals 202 are, as illustrated in FIG. 29, aligned in the circumferential direction of the annular ring 201. Each of the connection terminals 202 extends in the axial direction of the annular ring 201 radially outside the bus bar module 200. The connection terminals 202 include connection terminals connected to the U-phase busbar 211, connection terminals connected to the V-phase busbar 212, connection terminals connected to the W-phase busbar 213, and connection terminals connected to the neutral-point busbar 214. The number of connection terminals 202 is set to be identical to the number of winding ends 154 and 155 of the winding segments 151 of the coil modules 150, so that the connection terminals 202 are respectively connected to the winding ends 154 and 155. This results in the busbar module 200 being connected to each of the U-phase winding segments 151, the V-phase winding segments 151, and the W-phase winding segments 151.

The I/O terminals 203 are made of, for example, a busbar material and extend in the axial direction. The I/O terminals 203 include a U-phase I/O terminal 203 U, a V-phase I/O terminal 203V, and a W-phase I/O terminal 203W. The U-phase I/O terminal 203 U, V-phase I/O terminal 203V, and W-phase I/O terminal 203W are connected to the respective U-phase busbar 211, V-phase busbar 212, and W-phase busbar 213 in the annular ring 201. Electrical power is inputted to each-phase winding of the stator winding 61 from an unillustrated inverter through a corresponding one of the I/O terminals 203. Electrical power is outputted to the unillustrated inverter from each-phase winding of the stator winding 61 from an unillustrated inverter through a corresponding one of the I/O terminals 203.

Current sensors may be integrally installed in the busbar module 200 for respectively measuring a U-phase current, a V-phase current, and a W-phase current. In this case, current measurement terminals may be provided for the busbar module 200. Electrical current information measured by each current sensor may be output to an unillustrated controller through a corresponding one of the current measurement terminals.

The annular ring 201 has an inner peripheral surface, and protrusions 205 extending radially inward from the inner peripheral surface. Each of the protrusions 205 serves as a fixture to be fixed to the stator holder 70. Each of the protrusions 205 has an extending end, and the through hole 206 formed through the extending end thereof. The through hole 206 of each protrusion 205 extends in the axial direction of the annular ring 201.

Figure 31:
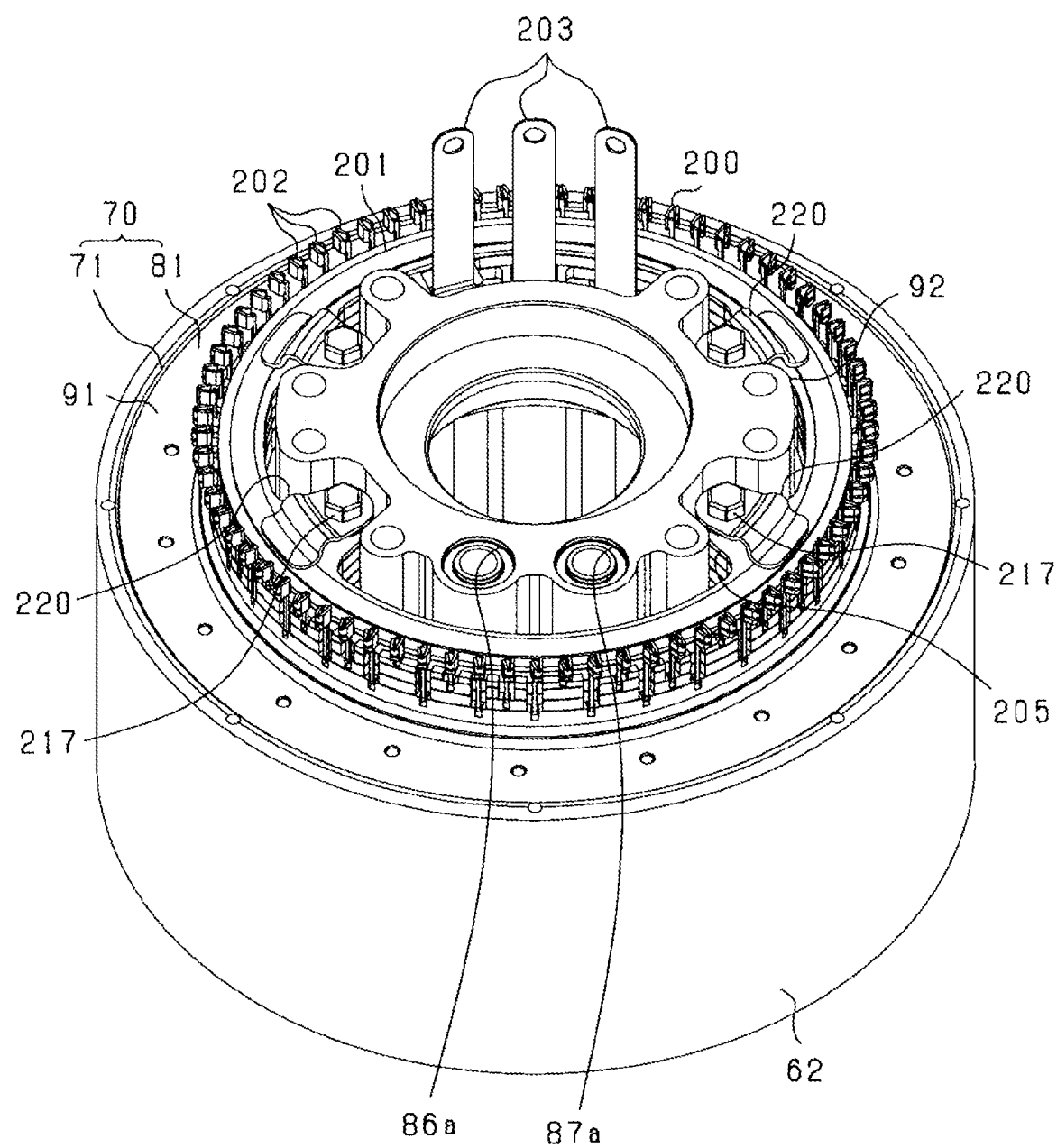
FIG. 31 is a perspective view which shows a bus module attached to a stator holder.
Figure 32:
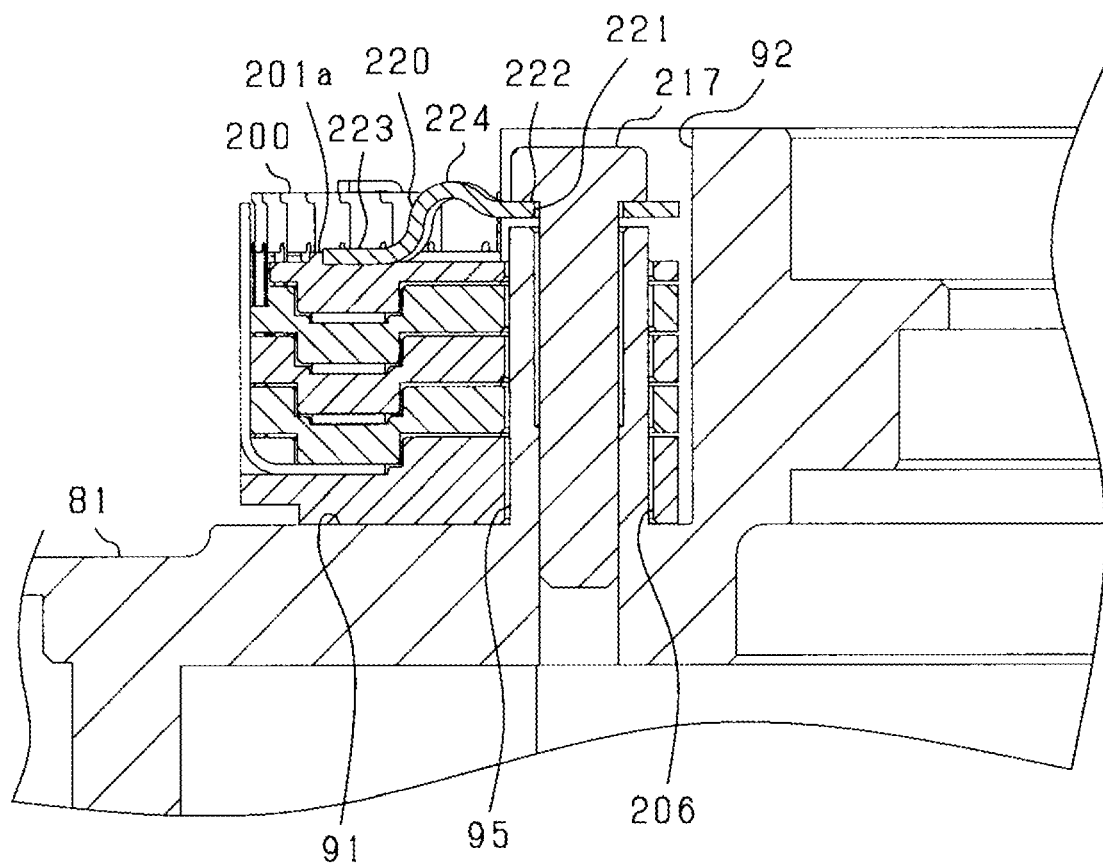
FIG. 32 is a longitudinal view which a fastening portion for fastening a bus module.

FIG. 31 is a perspective view illustrating the busbar module 200 assembled to the stator holder 70. FIG. 32 is a longitudinal sectional view illustrating how the busbar module 200 is fixed to the stator holder 70. The structure of the stator holder 70 before the busbar module 200 is assembled to the stator holder 70 is illustrated in FIG. 12.

The busbar module 200 is, as illustrated in FIG. 31, mounted on the end plate 91 and surrounds the boss 92 of the inner cylindrical member 81. The busbar module 200 is assembled to the rods 95 (see FIG. 12), so that the busbar module 200 is positioned. The busbar module 200 is then assembled to the inner cylindrical member 81 of the stator holder 70 using fasteners 217, such as bolts.

More specifically, as illustrated in FIG. 32, the rods 95 are mounted on the end plate 91 of the inner cylindrical member 81 and located radially outside the boss 92. Each of the rods 95 extends from the end plate 91 in the axial direction of the end plate 91. The busbar module 200 is secured by the fasteners 217 to the rods 95 with the rods 95 inserted into the through-holes 206 formed in the protrusions 205. In this embodiment, the securement of the busbar module 20 is achieved using the retainer plates 220 made from metallic material, such as iron. Each of the retainer plates 220 includes the mating fastener portion 222, the press portion 223, and the bent 224. The mating fastener portion 222 has formed therein the through-hole 221 through which the fastener 217 passes. The press portion 223 works to press the upper surface of the annular ring 201 of the busbar module 200. The bent 224 is located between the mating fastener portions 222 and the press portion 223.

Each of the retainer plates 220 is disposed on the annular ring 201 with the fastener 217 inserted into the through-hole 221 of the retainer plate 220 and threadedly engaging the rods 95 of the inner cylindrical member 81. The press portion 223 of the retainer plate 220 is placed in contact with the upper surface of the annular ring 201 of the busbar module 200. The screwing of the fasteners 217 into the rods 95 causes the retainer plates 220 to be pressed downward, as viewed in the drawing, so that the annular ring 201 is pressed downward by the press portions 223. The downward pressure, as produced by the screwing of each of the fasteners 217, is transmitted to the press portion 223 through the bent 224, so that the annular ring 201 is pressed by the press portion 223 with the aid of elastic pressure created by the bent 224.

The annular ring 201, as described above, has the annular protrusion 201a disposed on the upper surface thereof. The head (i.e., the press portion 223) of each of the retainer plates 220 is contactable with the annular protrusion 201a. This eliminates a risk that the downward pressure produced by the retainer plate 220 may be dispersed radially outward, thereby ensuring the stability in transmitting the pressure, as produced by the tightening of the fasteners 217, to the press portions 223.

After the busbar module 200 is secured to the stator holder 70, the I/O terminals 203 are, as illustrated in FIG. 31, disposed to be circumferentially 180 degrees opposite to the inlet opening 86a and the outlet opening 87a that communicate with the coolant path 85. The I/O terminals 203 and the inlet and outlet openings 86a and 87a may alternatively be disposed to be close to each other.

Next, the following describes the lead member 230 that electrically connects the I/O terminals 203 of the busbar module 200 to an external device of the rotating electrical machine 10.

The rotating electrical machine 10 is, as illustrated in FIG. 1, configured to have the I/O terminals 203 of the busbar module 200 disposed to project outward from the housing cover 242. The I/O terminals 203 are connected to the lead member 230 outside the housing cover 242. The lead member 230 is configured to connect the I/O terminals 203 for the respective phases extending from the busbar module 200 to power lines for the respective phases extending from an external apparatus, such as an inverter.

Figure 33:
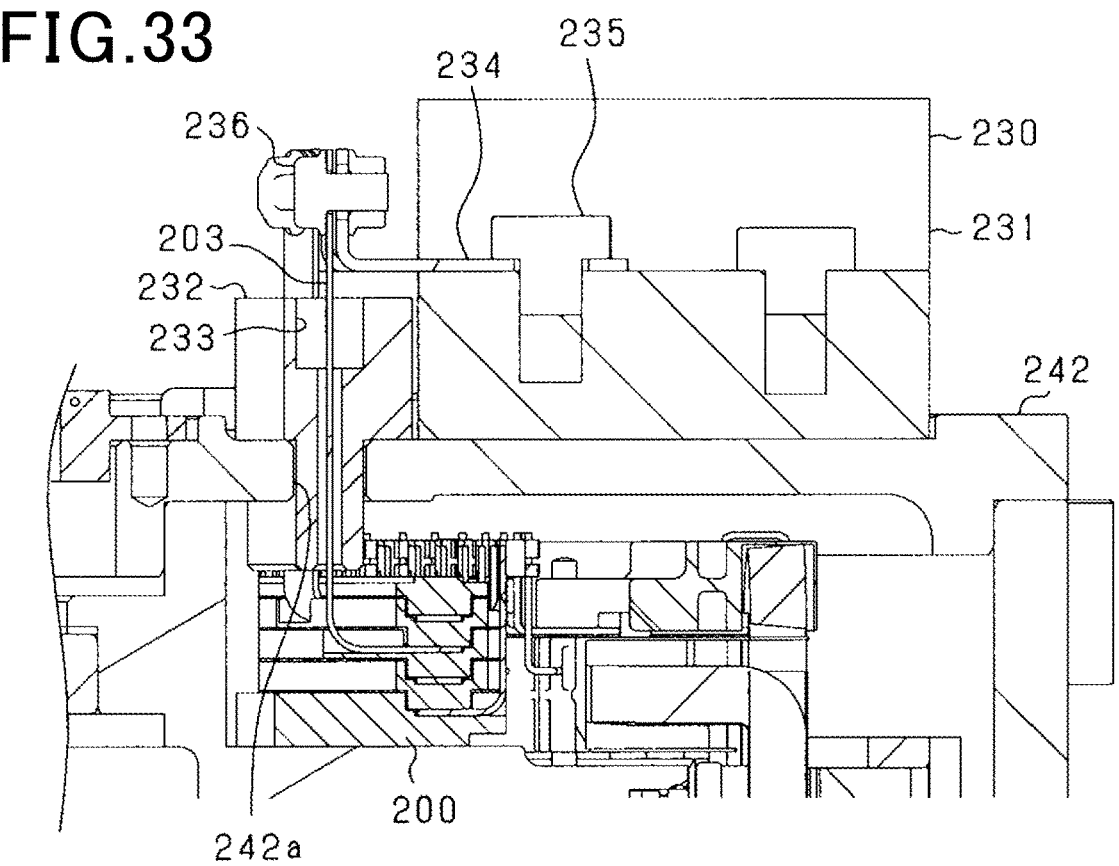
FIG. 33 is a longitudinal sectional view which illustrates a lead member mounted on a housing cover.
Figure 34:
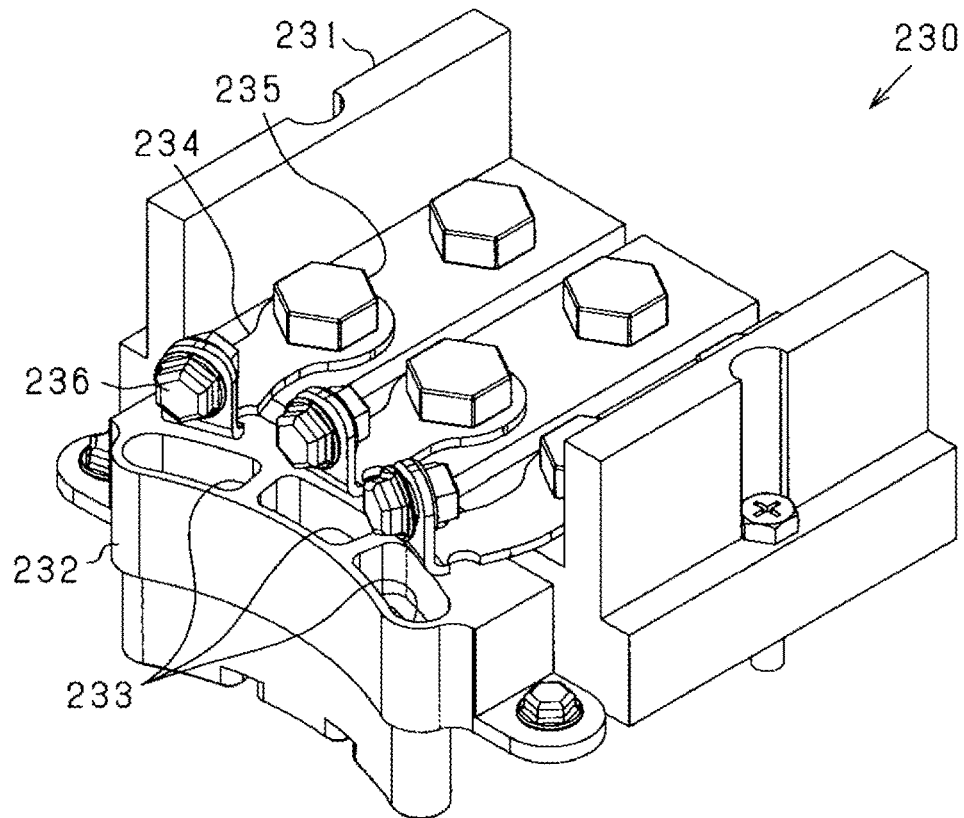
FIG. 34 is a perspective view of a lead member.

FIG. 33 is a longitudinal sectional view illustrating the housing cover 242 to which the lead member 230 is mounted. FIG. 34 is a perspective view of the lead member 230. The housing cover 242, as can be seen in FIG. 34, has the through holes 242a formed therethrough. The through holes 242a enable the I/O terminals 203 to be drawn out from the inside of the housing cover 242.

The lead member 230 includes the base 231 secured to the housing cover 242 and the terminal plug 232 fit in the through-hole 242a of the housing cover 242. The terminal plug 232 has formed therein three through-holes 233 through which the three I/O terminals 203 for the respective phases pass. The through-holes 233 are shaped to have elongated sections which are substantially aligned with each other.

The base 231 has mounted thereon three lead busbars 234 for the respective phases. Each of the lead busbars 234 is bent in an L-shape and secured to the base 231 using the fastener 235, such as a bolt. Each of the lead busbars 234 is also connected using the fastener 236, such as a combination of a bolt and a nut, to the head of the I/O terminal 203 disposed in a corresponding one of the through-holes 233 of the terminal plug 232.

To the lead member 230, unillustrated three-phase power wires can be connected. This enables power to be input to or output from each of the three-phase I/O terminals 203.

Figure 35:
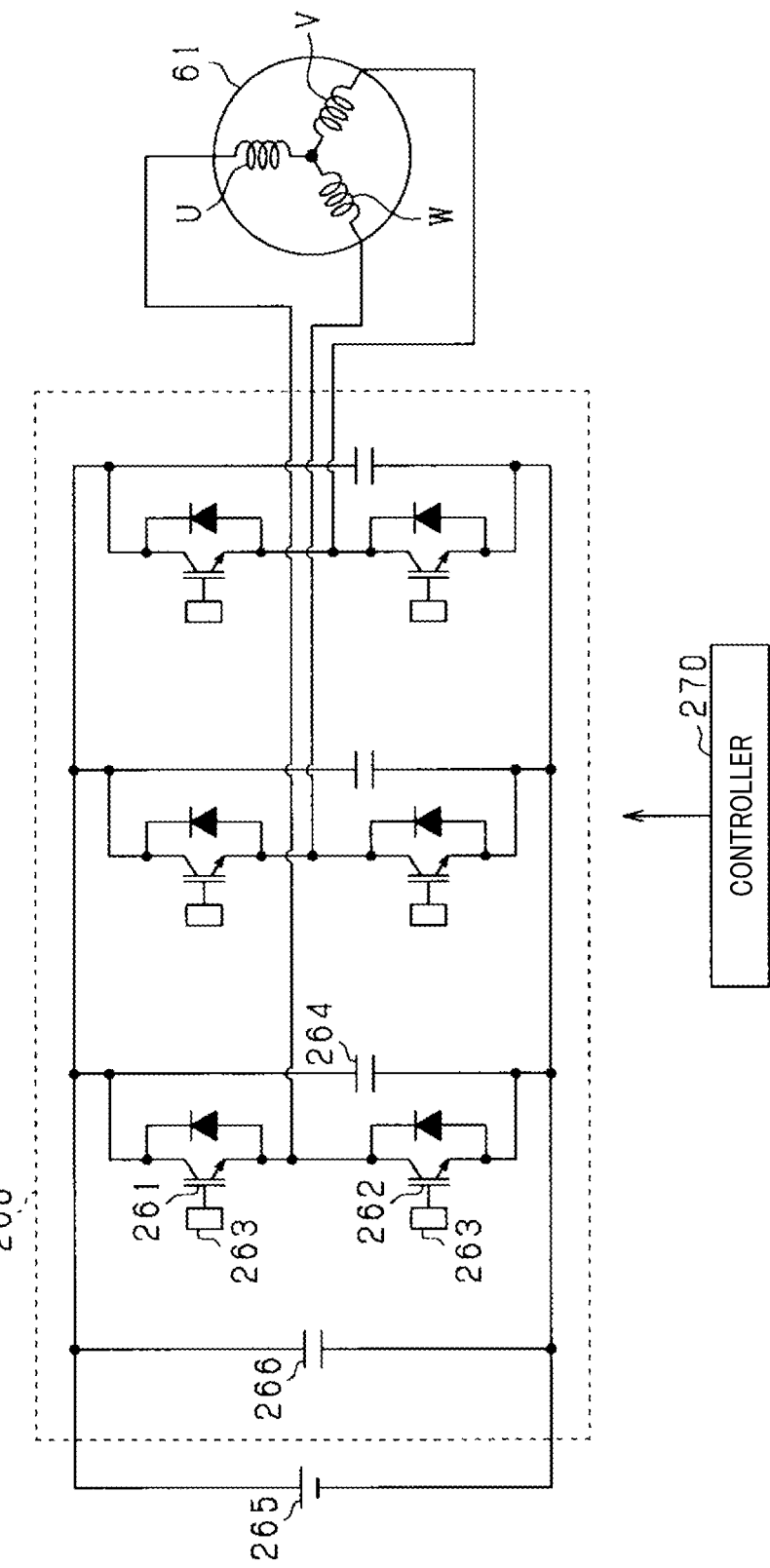
FIG. 35 is an electrical circuit diagram which illustrates a control system for a rotating electrical machine.
Figure 36:
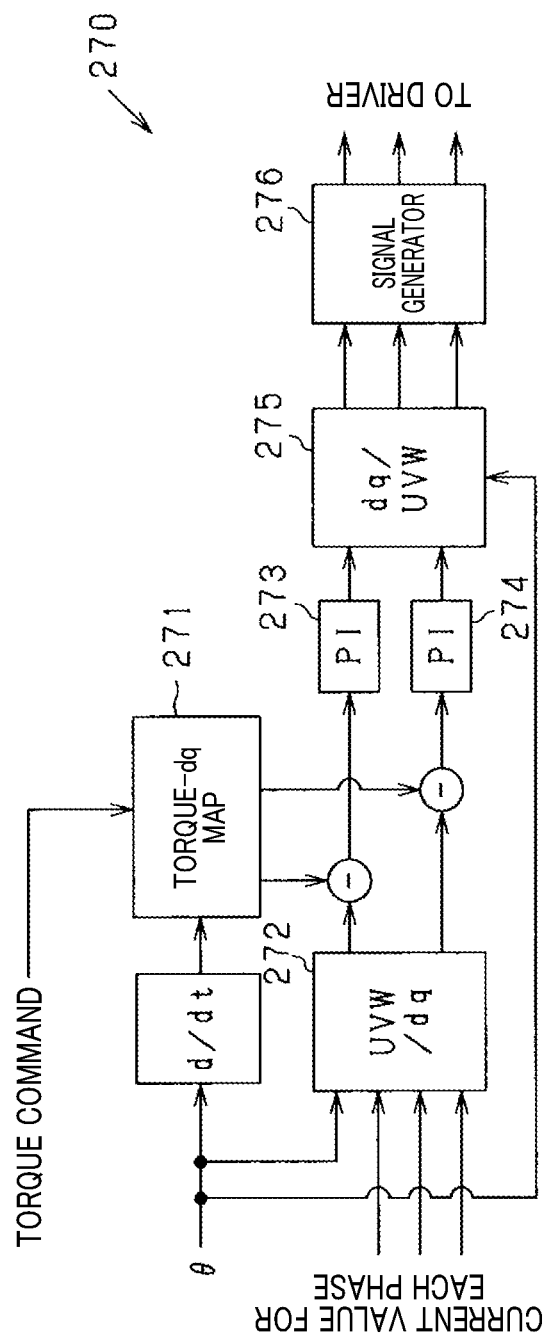
FIG. 36 is a functional block diagram which shows a current feedback control operation of a control device.

The structure of a control system for controlling an operation of the rotating electrical machine 10 will be described below. FIG. 35 is an electrical circuit diagram of the control system for the rotating electrical machine 10. FIG. 36 is a functional block diagram which illustrates control steps performed by the controller 270.

The stator winding 61 is, as illustrated in FIG. 35, made up of a U-phase winding, a V-phase winding, and a W-phase winding. The stator winding 61 connects with the inverter 260 working as a power converter. The inverter 260 is made of a bridge circuit having as many upper and lower arms as the phases of the stator winding 61. The inverter 260 is equipped with a series-connected part made up of the upper arm switch 261 and the lower arm switch 262 for each phase. Each of the switches 261 and 262 is turned on or off by a corresponding one of the driver circuits 263 to energize or deenergize a corresponding one of the phase windings. Each of the switches 261 and 262 is made of, for example, a semiconductor switch, such as a MOSFET or IGBT. The capacitor 264 is also connected to each of the series-connected parts made up of the switches 261 and 262 to output electrical charge required to achieve switching operations of the switches 261 and 262.

Intermediate joints of the upper arm switches 261 and the lower arm switches 262 are connected to ends of the U-phase winding, the V-phase winding, and the W-phase winding. The U-phase winding, the V-phase winding, and the W-phase winding are connected in the form of a star connection (i.e., Y-connection). The other ends of the U-phase winding, the V-phase winding, and the W-phase winding are connected with each other at a neutral point.

The control device 270 serves as a controller and is made up of a microcomputer equipped with a CPU and memories. The control device 270 analyzes information about parameters sensed in the rotating electrical machine 10 or a request for a motor mode or a generator mode in which the rotating electrical machine 10 operates to control switching operations of the switches 261 and 262 to excite or deexcite the stator winding 61. The parameters derived about the rotating electrical machine 10 include an angular position (i.e., electrical angle) of the rotor 20 measured by an angle detector, such as a resolver, the voltage at a power supply (i.e., voltage inputted to the inverter) measured by a voltage sensor, and/or exciting current for each phase winding measured by a current sensor. For instance, the control device 270 performs a PWM operation at a given switching frequency (i.e., carrier frequency) or an operation using a rectangular wave to turn on or off the switches 261 and 262. The control device 270 may be designed as a built-in controller installed inside the rotating electrical machine 10 or an external controller located outside the rotating electrical machine 10.

The rotating electrical machine 10 in this embodiment has a decreased electrical time constant because the rotating electrical machine 10 is of a slot-less structure (i.e., toothless structure), so that the stator 60 has a decreased inductance. In terms of the decreased electrical time constant, it is preferable to increase the switching frequency (i.e., carrier frequency) to enhance the switching speed in the rotating electrical machine 10. In terms of such requirements, the capacitor 264 serving as a charge supply capacitor is connected parallel to the series-connected part made up of the switches 261 and 262 for each phase of the stator winding 61, thereby reducing the wiring inductance, which deals with electrical surges even through the switching speed is enhanced.

The inverter 260 is connected at a high potential terminal thereof to a positive terminal of the dc power supply 265 and at a low potential terminal thereof to a negative terminal (i.e., ground) of the dc power supply 265. The dc power supply 265 is made of, for example, an assembly of a plurality of electrical cells connected in series with each other. The smoothing capacitor 266 is connected to the high and low potential terminals of the inverter 260 in parallel to the dc power supply 265.

FIG. 36 is a block diagram which illustrates a current feedback control operation to control electrical currents delivered to the U-phase winding, the V-phase winding, and the W-phase winding.

In FIG. 36, the current command determiner 271 uses a torque-dq map to determine current command values for the d-axis and the q-axis using a torque command value in the motor mode of the rotating electrical machine 10 (which will also be referred to as a motor-mode torque command value), a torque command value in the generator mode of the rotating electrical machine 10 (which will be referred to as a generator-mode torque command value), and an electrical angular velocity ω derived by differentiating an electrical angle θ with respect to time. The generator-mode torque command value is a regenerative torque command value in a case where the rotating electrical machine 10 is used as a power source of a vehicle.

The d-q converter 272 works to convert currents (i.e., three phase currents), as measured by current sensors mounted for the respective phase windings, into a d-axis current and a q-axis current that are components in a two-dimensional rotating Cartesian coordinate system in which a d-axis is defined as a direction of an axis of a magnetic field or field direction.

The d-axis current feedback control device 273 determines a command voltage for the d-axis as a manipulated variable for bringing the d-axis current into agreement with the current command value for the d-axis in a feedback mode. The q-axis current feedback control device 274 determines a command voltage for the q-axis as a manipulated variable for bringing the q-axis current into agreement with the current command value for the q-axis in a feedback mode. The feedback control devices 273 and 274 calculates the command voltage as a function of a deviation of each of the d-axis current and the q-axis current from a corresponding one of the current command values using PI feedback techniques.

The three-phase converter 275 works to convert the command values for the d-axis and the q-axis into command values for the U-phase, V-phase, and W-phase windings. Each of the devices 271 to 275 is engineered as a feedback controller to perform a feedback control operation for a fundamental current in the d-q transformation theory. The command voltages for the U-phase, V-phase, and W-phase windings are feedback control values.

The operation signal generator 276 uses the known triangle wave carrier comparison to produce operation signals for the inverter 260 as a function of the three-phase command voltages. Specifically, the operation signal generator 276 works to produce switch operation signals (i.e., duty signals) for the upper and lower arms for the three-phase windings (i.e., the U-, V-, and W-phase windings) under PWM control based on comparison of levels of signals derived by normalizing the three-phase command voltages using the power supply voltage with a level of a carrier signal, such as a triangle wave signal. The switch operation signals produced by the operation signal generator 276 are outputted to the drivers 263 of the inverter 260. The drivers 263 turn on or off the switches 261 and 263 for the phase windings.

Subsequently, a torque feedback control operation will be described below. This operation is to increase an output of the rotating electrical machine 10 and reduce torque loss in the rotating electrical machine 10, for example, in a high-speed and high-output range wherein an output voltage from the inverter 260 rises. The controller 270 selects one of the torque feedback control operation and the current feedback control operation and perform the selected one as a function of an operating condition of the rotating electrical machine 10.

Figure 37:
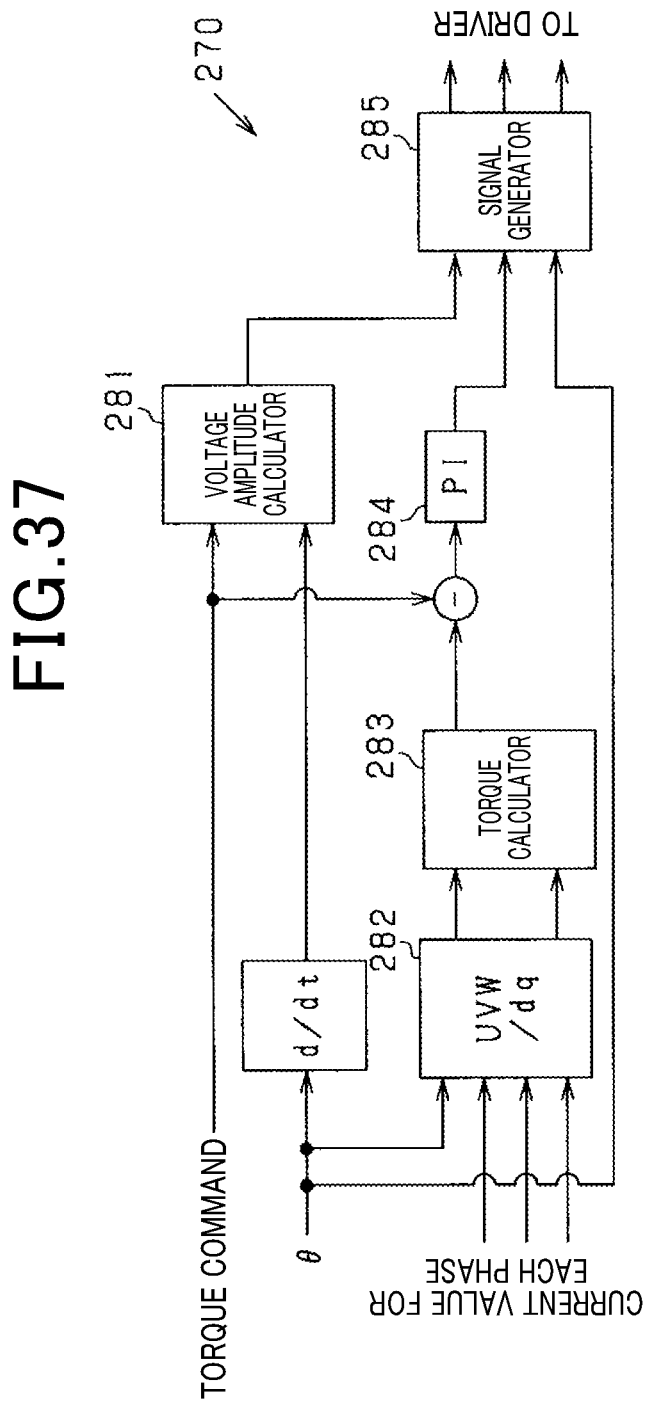
FIG. 37 is a functional block diagram which shows a torque feedback control operation of a control device.

FIG. 37 shows the torque feedback control operation for the U-, V-, and W-phase windings.

The voltage amplitude calculator 281 works to calculate a voltage amplitude command that is a command value of a degree of a voltage vector as a function of the motor-mode torque command value or the generator-mode torque command value for the rotating electrical machine 10 and the electrical angular velocity ω derived by differentiating the electrical angle θ with respect to time.

The d-q converter 282, like the d-q converter 272, works to convert currents, as measured by current sensors mounted for the respective phase windings, into a d-axis current and a q-axis current that are components. The torque calculator 283 calculates a torque value in the U-phase, V-phase, or the W-phase as a function of the d-axis current and the q-axis current converted by the d-q converter 282. The torque calculator 283 may be designed to calculate the voltage amplitude command using map listing relations among the d-axis current, the q-axis current, and the voltage amplitude command.

The torque feedback controller 284 calculates a voltage phase command that is a command value for a phase of the voltage vector as a manipulated variable for bringing the estimated torque value into agreement with the motor-mode torque command value or the generator-mode torque command value in the feedback mode. Specifically, the torque feedback controller 284 calculates the voltage phase command as a function of a deviation of the estimated torque value from the motor-mode torque command value or the generator-mode torque command value using PI feedback techniques.

The operation signal generator 285 works to produce the operation signal for the inverter 260 using the voltage amplitude command, the voltage phase command, and the electrical angle θ. Specifically, the operation signal generator 285 calculates the command values for the three-phase windings based on the voltage amplitude command, the voltage phase command, and the electrical angle θ and then generates switching operation signals for the upper and lower arms for the three-phase windings by means of PWM control based on comparison of levels of signals derived by normalizing the three-phase command voltages using the power supply voltage with a level of a carrier signal, such as a triangle wave signal. The switching operation signals produced by the operation signal generator 285 are then outputted to the drivers 263 of the inverter 260. The drivers 263 turns on or off the switches 261 and 262 for the phase windings.

The operation signal generator 285 may alternatively be designed to produce the switching operation signals using pulse pattern information that is map information about relations among the voltage amplitude command, the voltage phase command, the electrical angle θ, and the switching operation signal, the voltage amplitude command, the voltage phase command, and the electrical angle θ.

Modifications

Modifications of the above embodiment will be described below.

Figure 38:
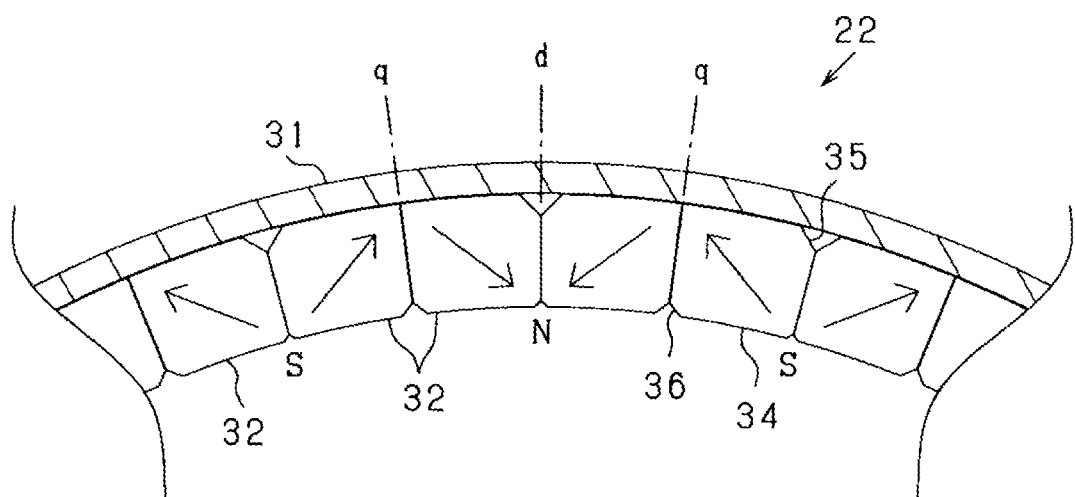
FIG. 38 is a partial transverse sectional view which illustrates a modified form of a magnet unit.

The arrangement of the magnets of the magnet unit 22 may be modified in the following way. The magnets 32 of the magnet unit 22 illustrated in FIG. 38 are each configured to have an easy axis of magnetization which is oblique to the radial direction of the magnet unit 22 and along which a magnetic path is created to extend linearly. This structure also enables the magnetic path created in each of the magnets 32 to have a length greater than the dimension or thickness of the magnets 32 in the radial direction, thereby enhancing the permeance in the magnets 32.

The magnet unit 22 may alternatively be engineered to have a Halbach array.

Each of the link portions 151 of each winding segment 151 may be bent to extend toward the radially inward or radially outward. Specifically, each first link portion 153A may be bent to be closer to the core assembly CA or farther away therefrom. Each second link portions 153B may be bent as long as the bent second link 153B circumferentially intersects with a part of the first link portion 153A at the axially outer side of the first link portion 153A.

The winding segments 151 may include only one of the first type of winding segments 151A and the second type of winding segments 151B. Specifically, each winding segment 151 may have a substantially L-shape or Z-shape as viewed from the side thereof.

When each winding segment 151 is shaped to have a substantially L-shape, one of the link portions of the corresponding winding segment 151 at one of the first and the second ends may be bent toward the radially inward or radially outward, and the other of the link portions may extend without being bent. Alternatively, when each winding segment 151 is shaped to have a substantially Z-shape, one of the link portions of the corresponding winding segment 151 at one of the first and the second ends may be bent toward the radially inward or radially outward, and the other of the link portions may be bent toward the opposite direction of the one of the link portions. In any case, the insulating covers, each of which covers over a corresponding one of the link portions, may preferably cause the coil modules 150 to be secured to the core assembly CA.

In the above structure, all the winding segments 151 for each phase winding are connected in parallel to each other, but this may be modified as follows. Specifically, all the winding segments 151 for each phase may be divided into plural parallel-connection groups in which the winding segments 151 are connected in parallel to each other, and the parallel-connection groups may be connected in series to each other. For example, all n winding segments 151 for each phase may be divided into two parallel-connection groups in which n/2 winding segments 151 are connected in parallel to each other, and the two parallel-connection groups may be connected in series to each other. As another example, all n winding segments 151 for each phase may be divided into three parallel-connection groups in which n/3 winding segments 151 are connected in parallel to each other, and the three parallel-connection groups may be connected in series to each other. Moreover, all the winding segments 151 for each phase winding are connected in series to each other.

The stator winding 61 of the rotating electrical machine 10 may be comprised of two-phase windings, such as U-phase winding and a V-phase winding. In this example, the pair of intermediate conductor portions 152 of each phase winding are arranged one coil pitch away from each other. This arrangement of the pair of intermediate conductor portions 152 of each phase winding enables one intermediate conductor portion 152 of the other phase winding to be arranged between the pair of intermediate conductor portions 152 of the corresponding phase winding.

Although the rotating electrical machine 10 is designed as an outer-rotor surface-magnet rotating electrical machine, but however, may be designed as an inner-rotor surface-magnet rotating electrical machine.

Figure 39A:
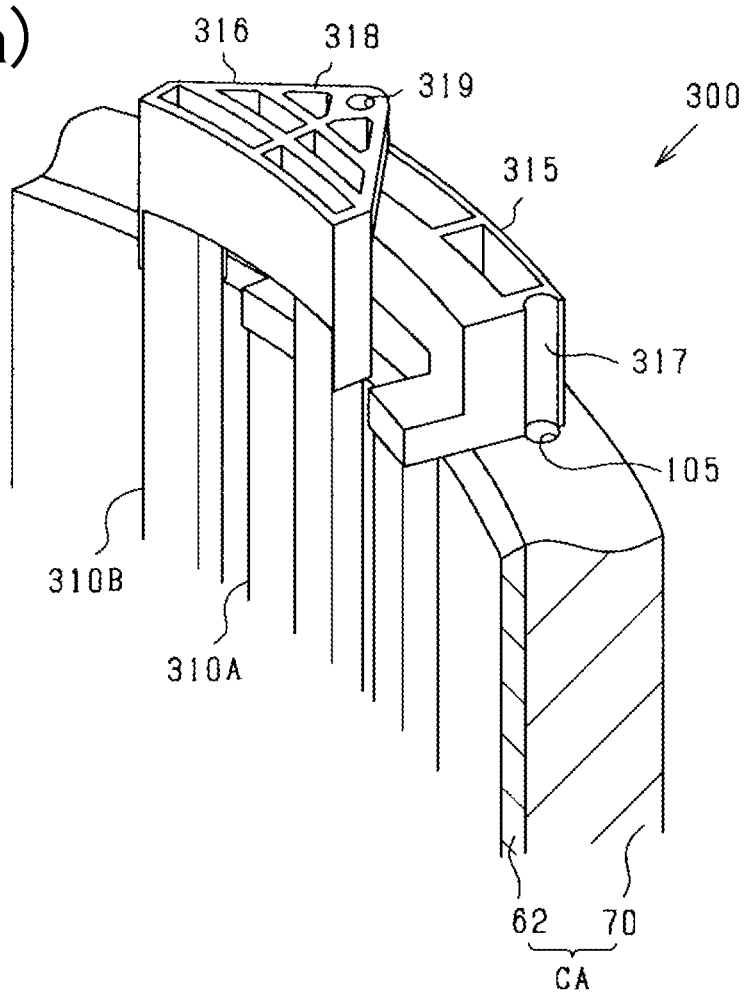
FIGS. 39(a) and 39(b) are views which illustrate a structure of an inner-rotor stator unit.
Figure 39B:
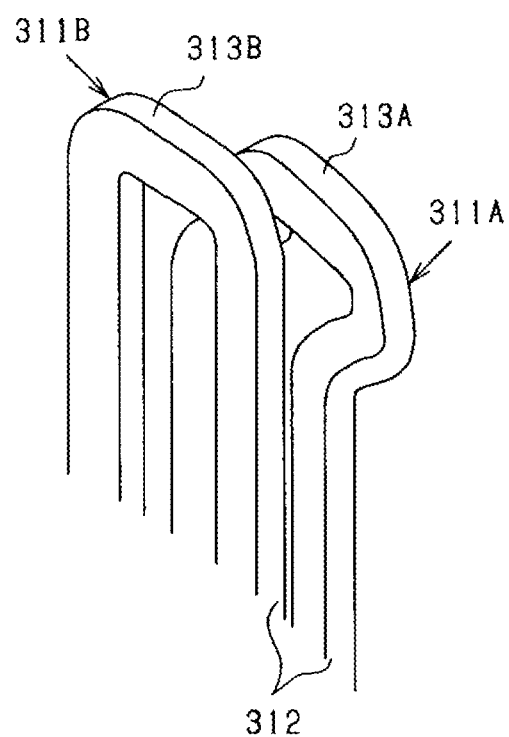

FIGS. 39(a) and 39(b) are views illustrating the structure of the stator unit 300 of the inner-rotor surface-magnet rotating electrical machine; the stator unit 300 is comprised of coil modules 310A and 310B. Specifically, FIG. 39(a) is a perspective view of the assembly of the core assembly CA and the coil modules 310A and 310B assembled to the inner peripheral surface of the core assembly CA. FIG. 39(b) is a perspective view of the winding segment 311A included in the coil module 310A and the winding segment 311B included in the coil module 310B. The inner-rotor surface-magnet rotating electrical machine is configured such that the stator holder 70 is assembled to the outer peripheral surface of the stator core 62 so that the core assembly CA is constructed. Additionally, the coil modules 310A and 310B are assembled to the inner peripheral surface of the stator core 62.

The winding segment 311A has substantially the same structure as that of the first winding segment 151A. Specifically, the winding segment 311A is comprised of a pair of intermediate conductor portions 312, and a pair of link portions 313A. Each of the link portions 313A is bent to extend radially outward toward the core assembly CA. The second winding segment 311B has substantially the same structure as that of the second winding segment 151B. Specifically, the winding segment 311B is comprised of a pair of intermediate conductor portions 312, and a pair of second link portions 313B. Each second link portion 313B circumferentially intersects with a part of the corresponding first link portion 313A at the axially outer side of the corresponding first link portion 313A. The insulating cover 315 is mounted to cover over each link portion 313A of the winding segment 311A. The insulating cover 316 is mounted to cover over each link portion 313B of the winding segment 311B.

The insulating cover 315 has opposing first and second circumferential sides, and the semi-circular recess 317 formed in each of the first and second circumferential sides thereof. The insulating cover 316 has the protrusion 318 extending radially outward. The protrusion 318 has an extending end, and a through hole 3019 formed through the extending end thereof.

Figure 40:
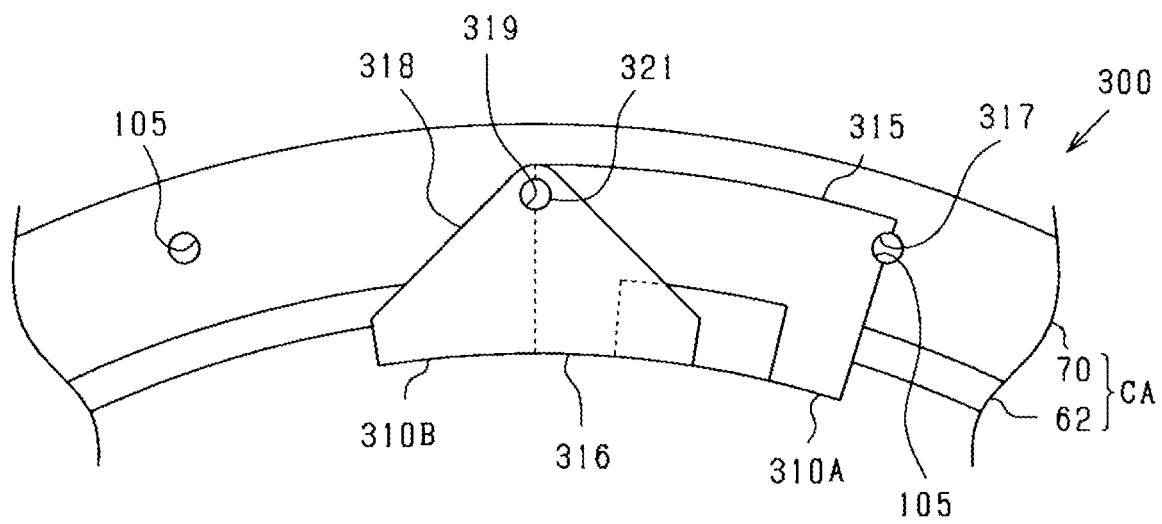
FIG. 40 is a plan view which illustrates a coil module attached to a core assembly.

FIG. 40 is a plan view illustrating that the first and second coil modules 310A and 310B are assembled to the core assembly CA. The stator holder 70, as illustrated in FIG. 40, has a plurality of recesses 105 formed in the end surface of each of the first and second ends in the axial direction. The recesses 105 are circumferentially arranged at regular intervals away from each other. The stator holder 70 has a cooling mechanism using liquid coolant or air. For example, the stator holder 70 may have, as an air-cooling mechanism, a plurality of fins mounted to the outer peripheral surface thereof.

Each insulating cover 316 is, as clearly illustrated in FIG. 40, axially overlapped with a corresponding circumferentially adjacent pair of insulating covers 315 while
(1) The through hole 319, which serves as a second engagement portion, formed in the corresponding insulating cover 316 at a circumferentially center thereof is axially aligned with a corresponding pair of recesses 317, which serves as second engagement portions, formed in the corresponding circumferentially adjacent pair of insulating covers 315,
(2) The fastening pin 321 is fit in the through hole 319 of each insulating cover 316 and the corresponding pair of recessed grooves 317 formed in the corresponding circumferentially adjacent pair of insulating covers 315, so that each insulating cover 316 and the corresponding circumferentially adjacent pair of insulating covers 315 are fastened to each other by the fastening pin 321.

Each fastening pin 321 is, as can be seen in FIG. 40, fit through the corresponding through hole 319 of the corresponding insulating cover 316 and the corresponding through hole formed by the recesses 317 of the insulating covers 315. This results in
(1) The insulating covers 315 and 316 being fixedly mounted to each of the first and second outer surfaces of the stator holder 70 in the axial direction; the stator holder 70 is located radially outside the stator core 62,
(2) The insulating covers 315 and 316 being fastened by the fastening pins 321.

The stator holder 70 is equipped with the coolant mechanism is, so that heat generated from the first winding segments 311A and 311B is likely to be transferred to the stator holder 70. The above configuration of the rotating electrical machine 10, therefore, has a higher performance of cooling the stator winding 61.

The stator 60 included in the rotating electrical machine 10 may include protrusions, such as teeth, protruding from its back yoke. In this modification, the coil modules 150 or other components may be assembled to the back yoke of the stator 60.

The rotating electrical machine 10 has a star-connection wiring structure, but however, may alternatively configured to have a delta-connection (Δ-configuration) wiring structure.

The rotating electrical machine 10, which is designed as a revolving-field type rotating electrical machine comprised of a rotor working as a magnetic field generator, and a stator working as an armature, but may be designed as a revolving armature type of rotating electrical machine comprised of a rotor working as an armature, and a stator serving as a magnetic field generator.

Second Modification

The magnet unit installed in the above embodiment and modifications thereof may be modified in ways described below. The following discussion will mainly refer to the structure of the magnet unit 500 and describe parts different from those of the above-described structures. The rotating electrical machine, as will be referred to below, has substantially the same structure in the first embodiment as an example.

Figure 41:
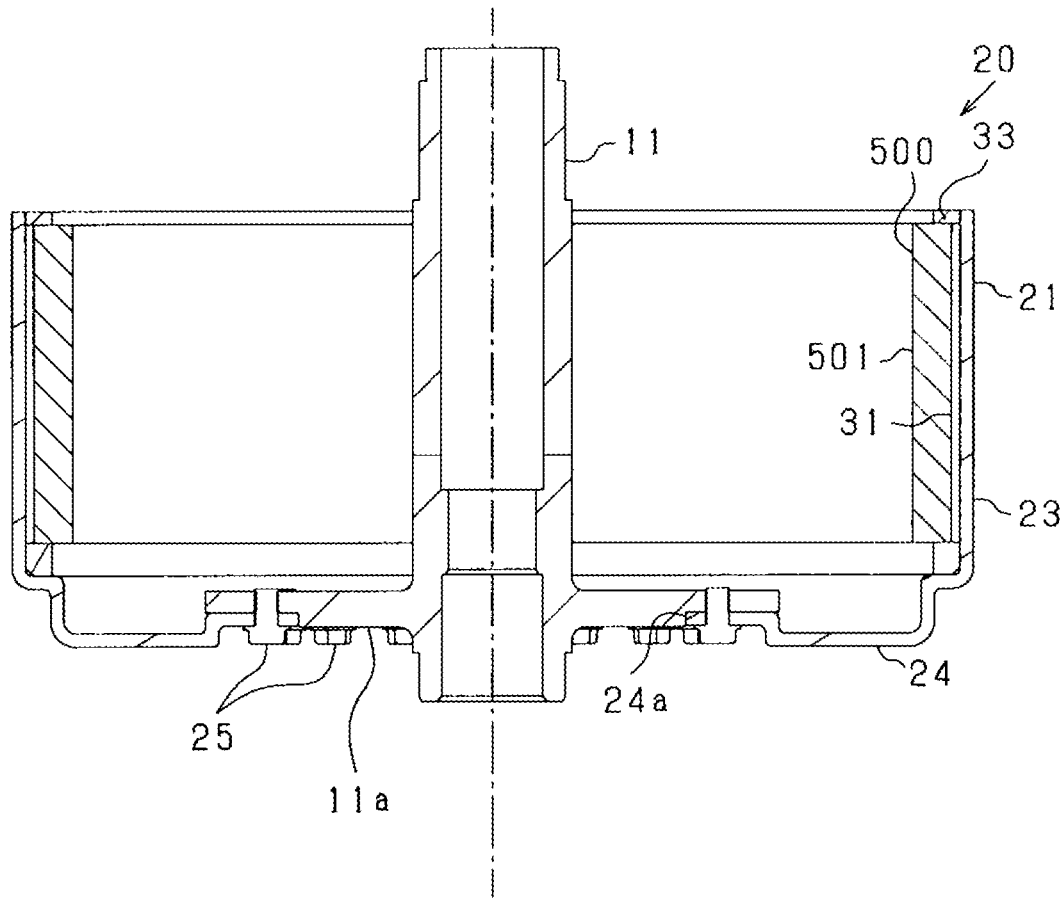
FIG. 41 is a sectional view of a second modification of a rotor.

The magnet unit 500, as illustrated in FIG. 41, includes the hollow cylindrical magnet holder 31, a plurality of magnets 501 attached to an inner periphery of the magnet holder 31, and the end plate 33. The end plate 33 is firmly disposed on one of axially opposed ends of the rotor carrier 21 which is located farther away from the end plate 24. The magnet holder 31 is shaped to have substantially the same dimension as those of the magnets 501 in the axial direction of the rotor 20. The magnets 501 are arrayed to have an outer periphery surrounded by the magnet holder 31. The magnet holder 31 and the magnets 501 are secured at axial ends thereof directly to the end plate 33. The magnet unit 500 will also be referred to as a magnet unit.

Figure 42:
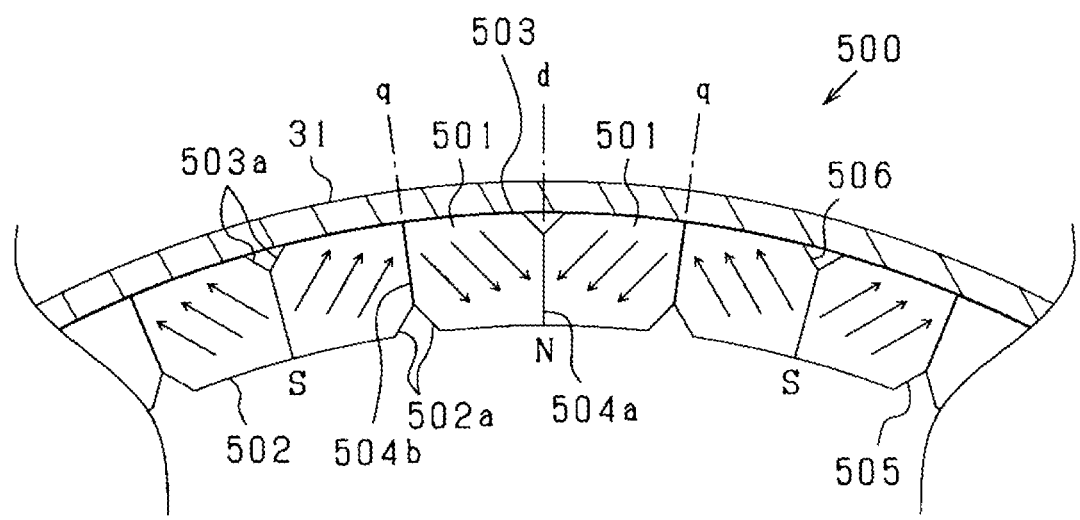
FIG. 42 is a partial transverse sectional view which illustrates a sectional structure of a second modification of a magnet unit.

FIG. 42 is a transverse sectional view which illustrates a sectional structure of the magnet unit 500. In FIG. 42, easy axes of magnetization in the magnets 501 are denoted by arrows. The magnets 501 of the magnet unit 500 are arranged adjacent each other to have magnetic polarities alternating in the circumferential direction of the rotor 20. The magnet unit 500, thus, has a plurality of magnetic poles arranged in the circumferential direction. Each of the magnets 501 is made of an anisotropic permanent sintered neodymium magnet whose intrinsic coercive force is 400 [kA/m] or more and whose remanent flux density is 1.0 [T] or more.

The configuration of the magnets 501 will be described below. Each of the magnets 501 is shaped to have an arc-transverse section. The magnets 501 are arranged adjacent each other in the form of a single ring.

Each of the magnets 501 has the stator facing peripheral surface 502 (i.e., armature-facing peripheral surface) which faces radially inside the magnet unit 500, that is, the stator 60 and the stator remote peripheral surface 503 (i.e., armature remote peripheral surface) which faces radially outside the magnet unit 500, that is, the cylindrical portion 23. The stator facing peripheral surface 502 serves as a magnetic flux acting surface into or from which a magnetic flux flows.

Each of the magnets 501 has peripheral side surfaces which are opposed to each other in the circumferential direction of the magnet unit 500 and flat in the radial direction of the magnetic unit 500. In the following discussion, one of the peripheral side surfaces of each magnet 501 which faces or coincides with the d-axis will also be referred to as the d-axis facing end surface 504a, while one of the peripheral side surfaces of each magnet 501 which faces or coincides with the q-axis will also be referred to as the q-axis facing end surface 504b.

A respective circumferentially adjacent two of the magnets 501 forms a magnet pair which shows one magnetic pole. In other words, each of the circumferentially arrayed magnets 501 of the magnet unit 500 has the division surfaces (i.e., the d-axis facing end surface 504a and the q-axis facing end surface 504b) which coincide with the d-axis and the q-axis. The magnets 501 are disposed in direct contact with or close to each other.

To say it in a different way, each of the magnets 501 is located between the d-axis that is the center of a magnetic pole and the q-axis that is circumferentially adjacent the d-axis and defines a magnetic boundary between the N-pole and the S-pole. In other words, the magnets 501 are discrete or separate from each other through the d-axis and the q-axis. The magnets 501 arranged to be symmetrical with respect to the d-axis in the circumferential direction of the magnet unit 500. The magnets 501 each have a given dimension or thickness in the axial direction of the magnet unit 500.

The stator facing peripheral surface 502 of each of the magnets 501 is shaped to extend in substantially an arc-shape in the circumferential direction of the magnet unit 500. Each magnet 501 also has the slant q-axis facing surface 502a which faces the q-axis and is inclined relative to the stator facing peripheral surface 502. The slant q-axis facing surfaces 502a of the magnets 501 define the stator-facing recesses 505 each of which is concave from the stator facing peripheral surface 502 around the q-axis in the radial direction of an arc-shaped circumferential array of the magnets 501.

In other words, each of the magnets 501 has a chamfered corner between the stator facing peripheral surface 502 and the q-axis facing end surface 504b. This defines the slant q-axis facing surface 502a which is located on a corner of each magnet 501 between the stator facing peripheral surface 502 and the q-axis facing end surface 504b and inclined to extend from the stator facing peripheral surface 502 away from the stator 60.

The stator remote peripheral surface 503 of each of the magnets 501 is shaped to extend in substantially an arc-shape in the circumferential direction of the magnet unit 500. Each magnet 501 also has the slant d-axis facing surface 503a which faces the d-axis and is inclined relative to the stator remote peripheral surface 503. The slant d-axis facing surfaces 503a of the magnets 501 define the stator remote recesses 506 each of which is concave from the stator remote peripheral surface 503 around the d-axis in the radial direction of the arc-shaped circumferential array of the magnets 501.

In other words, each of the magnets 501 has a chamfered corner between the stator remote peripheral surface 503 and the d-axis facing end surface 504a. This defines the slant d-axis facing surface 503a which is located on a corner of each magnet 501 between the stator remote peripheral surface 503 and the d-axis facing end surface 504a and inclined to extend from the stator remote peripheral surface 503 toward the stator 60.

Figure 43:
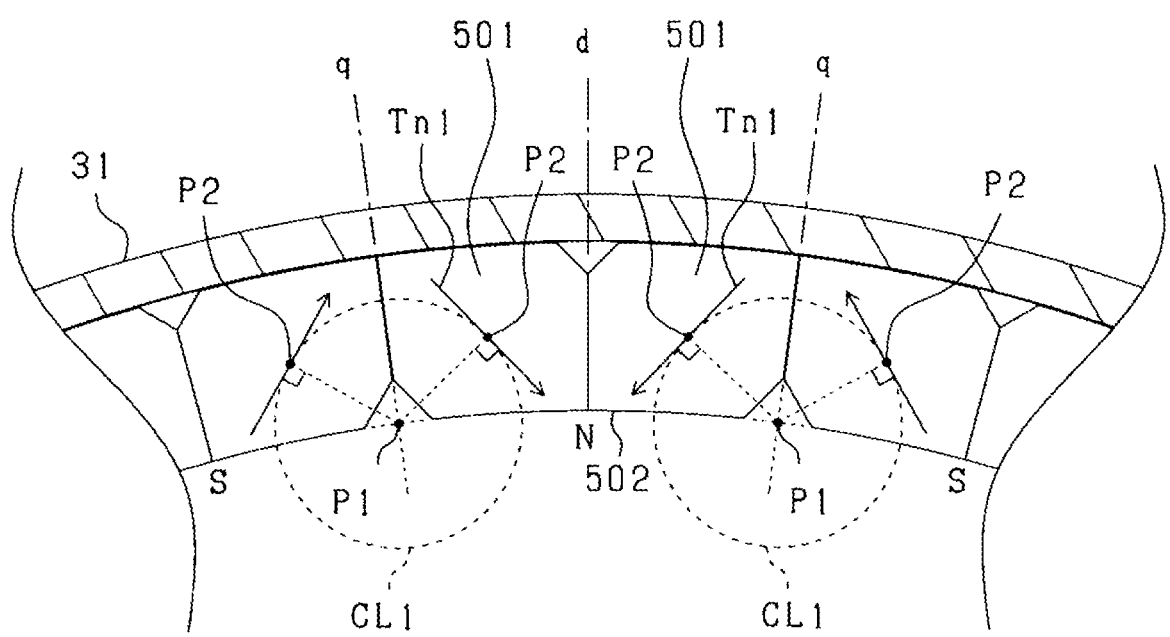
FIG. 43 is an enlarge view of FIG. 42.

Next, magnetic paths (which will also be referred to in this disclosure as a magnet-produced magnetic path) created in each of the magnets 501 will be described using FIG. 43.

Each of the magnets 501 has easy axes of magnetization which extend linearly in parallel to each other and along which a plurality of magnetic paths are defined. The magnetic paths and the easy axes of magnetization are arranged to be symmetrical with respect to the d-axis in the circumferential direction of the magnetic unit 500.

Providing the structure of each of the magnets 501, like the magnets 52 in the first embodiment, whose intrinsic coercive force is 400 [kA/m] or more and remanent flux density is 1.0 [T] or more and in which the easy axes of magnetization are oriented to extend in an arc-shape requires each magnet 501 to be made of a sintered magnet. In general, however, magnetizing magnets to orient easy axes of magnetization in an arc-shape involves a significant effort as compared with the case where the magnets are magnetically oriented to have linear easy axes of magnetization.

In order to alleviate the above drawback, the second modification orients the easy axes of magnetization to define the magnetic paths in the following way. Specifically, the easy axes of magnetization in each of the magnets 501 are, as can be seen in FIG. 43, oriented at a given angle to the d-axis. More specifically, each of the magnets 501 has the easy axes of magnetization each of which extends parallel to the tangent line Tn1. The tangent line Tn1 is a straight line touching the plane circle CL1 at the gravity center P2 of a corresponding one of the magnets 501. The plane circle CL1 is a circle around the center P1 defined on the q-axis on a plane extending along the stator facing peripheral surface 502. In the second modification where the magnets 501 have the stator-facing recesses 505 on the q-axis, the center P1 is defined to lie at an intersection of an imaginary plane extending along the stator facing peripheral surface 502 and the q-axis.

The magnets 501 are engineered so that the back electromotive force constant Ke (i.e., the torque constant Kt) has a peak value when an angle of rotation of the rotor 20 matches an angle of the center P2 of gravity of the magnets 501. In other words, the rotating electrical machine 10 is engineered to have a maximum degree of output torque or peak value of output torque when an angle of rotation of the rotor 20 agrees with an angle of the gravity center P2 of the magnets 501. To say it in a different way, the magnetic flux in the magnets 501 has a peak when an angle of rotation of the rotor 20 coincides with an angle of the gravity center P2 of the magnets 501.

Figure 44:
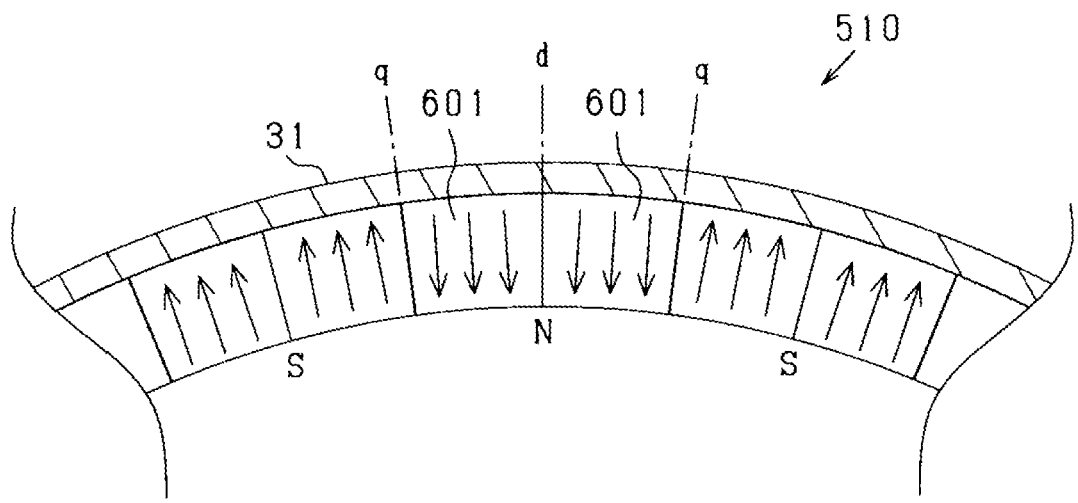
FIG. 44 is a sectional view which illustrates parallel-oriented magnets in a prior art example.

The following will describe examples of the prior art magnet units 510 and 520 for comparison with the magnets 510 in the second modification. The magnet unit 510, as illustrated in FIG. 44, includes a plurality of magnets 601. The magnets 601 are each magnetically oriented to have easy axes of magnetization which extend linearly parallel to the d-axis and define magnetic paths along them. Such magnetically oriented magnets will also be referred to below as parallel-oriented magnets 601. The magnet unit 510 is preferably shaped to have the same configuration as that of the magnet unit 500 in the second modification. Specifically, it is advisable that the magnet unit 510 be identical in inner and outer diameters and axial length with the magnet unit 500. It is also advisable that the parallel-oriented magnets 601 be shaped to have the same configuration as that of the magnets 501 and also have the stator facing recesses 505 and the stator remote recesses 506. The parallel-oriented magnets 601 are also preferably made from the same material as the magnets 501.

Figure 45:
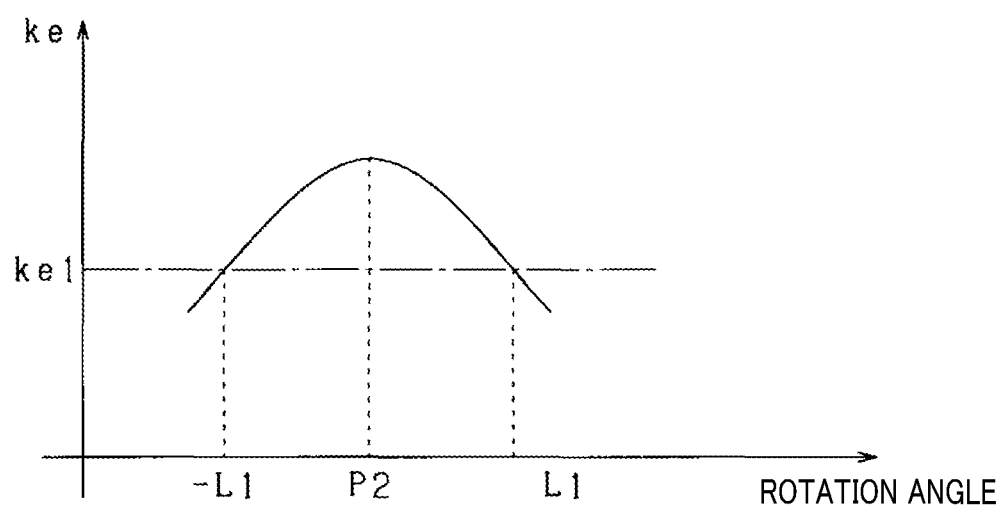
FIG. 45 is a view which represents a relation of an angle of rotation and a back electromotive force constant.

The parallel-oriented magnets 601 are designed to have a relation between an angle of rotation of the rotor 20 and the back electromotive force constant Ke (i.e., torque constant Kt) which is indicated by an alternate long and short dash line in FIG. 45. Specifically, the back electromotive force constant Ke has a constant value Ke1 regardless of the angle of rotation of the rotor 20.

FIG. 45 also indicates a relation between an angle of rotation of the rotor 20 and the back electromotive force constant Ke (i.e., torque constant Kt) in the magnets 501 using a solid line. FIG. 45 shows that each of the magnets 501 has a peak value of the back electromotive force constant Ke which is higher than that of the parallel-oriented magnets 601. The magnets 501 are, as can be seen in FIG. 45, configured to have the back electromotive force constant Ke which is higher than that of the parallel-oriented magnets 601 when an angle of rotation of the rotor 20 lies in a first angle range including the gravity center P2. The first angle range is determined to be the gravity center P2±L1°.

Figure 46:
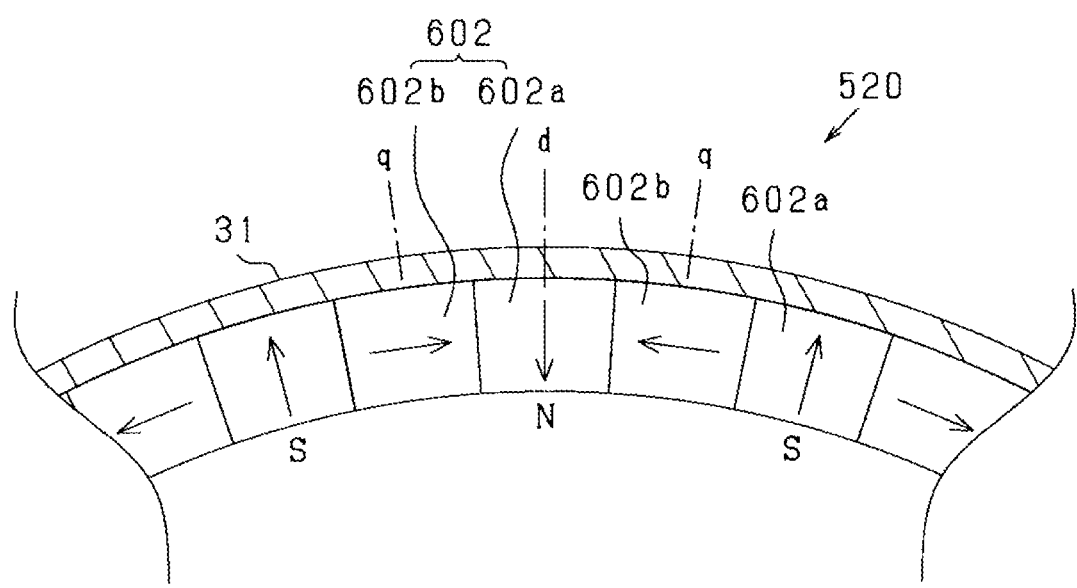
FIG. 46 is a sectional view which illustrates Halbach array magnets in a prior art example.

The magnets 602 shown in FIG. 46 are designed to be in the so-called Halbach array (which will also be referred below as Halbach array magnets 602). Specifically, each of the Halbach array magnets 602 includes the first magnet 602a and the second magnet 602b. The first magnet 602a has easy axes of magnetization which extend linearly along the d-axis and define magnetic paths along them. The second magnet 602b has easy axes of magnetization which extend linearly perpendicular to the q-axis and define magnetic paths along them. The first magnets 602a and the second magnets 602b are arrayed alternately in the circumferential direction of the magnet unit 520. The magnet unit 520 is preferably shaped to have the same configuration as that of the magnet unit 500 in the second modification. Specifically, it is advisable that the magnet unit 520 be identical in inner and outer diameters and axial length with the magnet unit 500. It is also advisable that the magnets 602 be shaped to have the stator facing recesses 505 and the stator remote recesses 506. The magnets 602 are also preferably made from the same material as the magnets 501.

Figure 47:
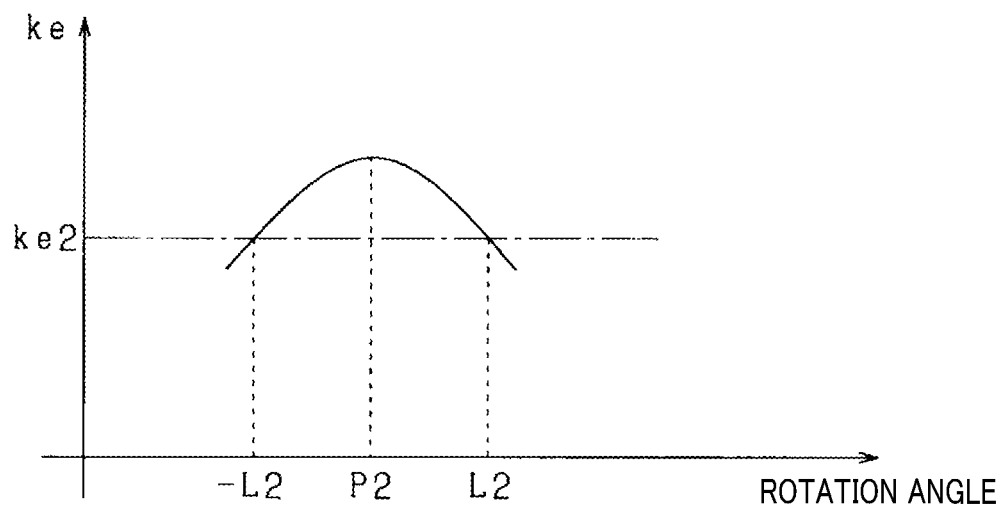
FIG. 47 is a view which represents a relation of an angle of rotation and a back electromotive force constant.

The Halbach array magnets 602 are designed to have a relation between an angle of rotation of the rotor 20 and the back electromotive force constant Ke (i.e., torque constant Kt) which is indicated by an alternate long and short dash line in FIG. 47. Specifically, the back electromotive force constant Ke has a constant value Ke2 regardless of the angle of rotation of the rotor 20.

FIG. 47 also indicates a relation between an angle of rotation of the rotor 20 and the back electromotive force constant Ke (i.e., torque constant Kt) in the magnets 501 using a solid line. FIG. 45 shows that each of the magnets 501 has a peak value of the back electromotive force constant Ke which is higher than that of the Halbach array magnets 602. The magnets 501 are, as can be seen in FIG. 44, configured to have the back electromotive force constant Ke which is higher than that of the Halbach array 602 when an angle of rotation of the rotor 20 lies in a second angle range including the gravity center P2. The second angle range is determined to be the gravity center P2±L2° and narrower than the first angle range in FIG. 45 (i.e., L2<L1).

The above described second modification has the following beneficial advantages.

The magnets 501 are, as described above, configured to have the back electromotive force constant Ke which is higher than that of the parallel-oriented magnets 601 when an angle of rotation of the rotor 20 lies in the first angle range including the gravity center P2. The parallel-oriented magnets 601 are, as described above, designed to have the magnetic paths which are, unlike the magnets 501, oriented along the easy axes of magnetization extending linearly parallel to the d-axis. The structure of the magnets 501, therefore, serves to enhance the density of magnetic flux near the d-axis which is higher than that in the parallel-oriented magnets 601, thereby resulting in an increased degree of torque outputted by the rotating electrical machine 10 and facilitating production of the magnets 501 as compared with magnets oriented to have arc-shaped easy axes of magnetization.

The magnets 501 are also configured to have the back electromotive force constant Ke which is higher than that of the Halbach array magnets 602 when an angle of rotation of the rotor 20 lies in the second angle range including the gravity center P2. The Halbach array magnets 601 are, as described above, designed to have the magnetic paths different in orientation or configuration from the magnets 501. The structure of the magnets 501, therefore, serves to enhance the density of magnetic flux near the d-axis which is higher than that in the Halbach array magnets 602, thereby resulting in an increased degree of torque outputted by the rotating electrical machine 10 and facilitating production of the magnets 501 as compared with magnets oriented to have arc-shaped easy axes of magnetization.

The magnets 501 are also designed to have the back electromotive force constant Ke which is maximized to have a peak value when an angle of rotation of the rotor 20 matches the gravity center P2 of the magnet 501. This results in density of magnetic flux near the d-axis which is the highest among magnets whose easy axes of magnetization are oriented linearly parallel to each other, thereby enhancing the degree of torque outputted by the rotating electrical machine 10.

Each of the magnets 501 is, as described above, configured to have the easy axes of magnetization each of which extends parallel to the tangent line Tn1. The tangent line Tn1 is a straight line touching the plane circle CL1 at the gravity center P2 of a corresponding one of the magnets 501. The plane circle CL1 is a circle around the center P1 defined on the q-axis on a plane extending along the stator facing peripheral surface 502. This structure of the magnets 501 provides the back electromotive force constant Ke which has a peak value when an angle of rotation of the rotor 20 coincides with the gravity center P2 of the magnets 501. This results in density of magnetic flux closer to the d-axis than to the q-axis which is the highest among magnets whose easy axes of magnetization are oriented linearly parallel to each other, thereby enhancing the degree of torque outputted by the rotating electrical machine 10 and facilitating the ease of production of the magnets 501 as compared with magnets oriented to have arc-shaped easy axes of magnetization.

Each magnet 501 has a corner which is located close to the q-axis and faces the stator 20 or close to the d-axis and faces away from the stator 20 and in which the magnetic path has a length shorter than in another region in the corresponding magnet 501, thus facilitating the ease of demagnetization of the above corner. In order to alleviate such a drawback, each magnet 501 is designed to have chamfered corners which are located to the q-axis and faces the stator 20 and to the d-axis and faces away from the stator 20 to form the slant d-axis facing surface 503a and the slant q-axis facing surface 502a. In other words, the magnets 501 have the stator-facing recesses 505 and the stator remote recesses 506, thereby minimizing a risk that the density of magnetic flux around the d-axis may be reduced, which enables the volume of material of each magnet 501 to be decreased.

It is advisable that the slant d-axis facing surface 503a and the slant q-axis facing surface 502a be shaped to be flat or planar along the easy axis of magnetization. This minimizes a risk that the magnetic path may be interrupted by the slant d-axis facing surface 503*a* and/or the slant q-axis facing surface 502*a*.

Variation of Second Modification

The magnet unit 500 in the above described second modification may be altered in the following way. The following discussion will be made based on the second modification, as an example, and mainly refer to parts which are different from the above embodiment or modifications.

Figure 48:
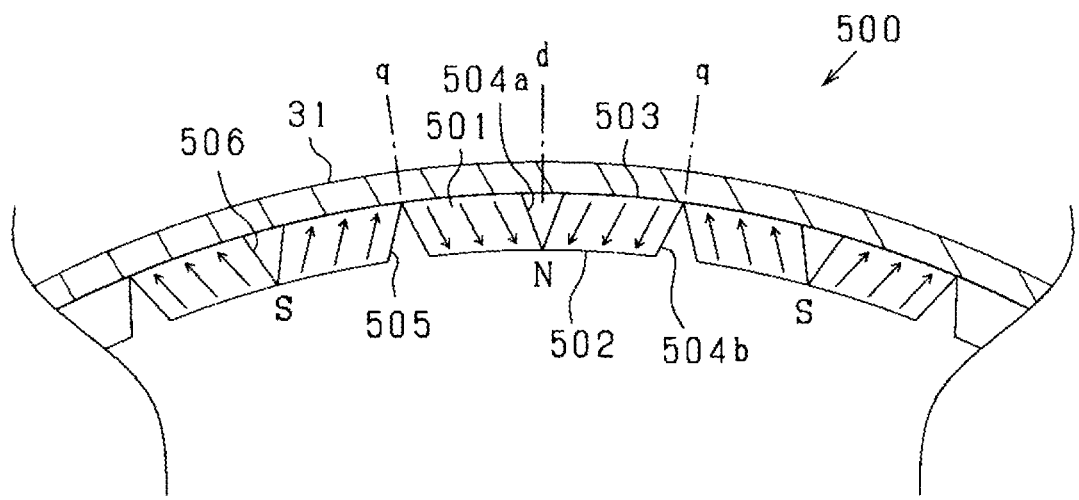
FIG. 48 is a partial transverse sectional view which shows a sectional structure of a magnet unit in another example.

Each of the magnets 501 in the second modification may be, as illustrated in FIG. 48, designed to have the d-axis facing end surface 504*a* and the q-axis facing end surface 504*b* which are flat or planar along the easy axes of magnetization. At least one of the d-axis facing end surface 504*a* and the q-axis facing end surface 504*b* may alternatively be flat along the easy axes of magnetization. This minimizes a reduction in density of magnetic flux around the d-axis and enable the volume of the magnets 501 to be decreased.

Each of the magnets 501 in the second modification may be designed to have neither the stator-facing recesses 505 nor the stator remote recesses 506 or have only one of the stator-facing recesses 505 and the stator remote recesses 506.

The magnets 501 in the second modification are, as described above, configured to have the back electromotive force constant Ke which is maximized when an angle of rotation of the rotor 20 matches the gravity center P2 of the magnets 501, but however, may alternatively be shaped to have the peak value of the back electromotive force constant Ke when an angle of rotation of the rotor 20 lies in the first angle range or the second angle range.

This disclosure in this application is not limited to the above-described embodiments. This disclosure includes the above embodiments and modifications which may be made by those of ordinary skill in the art. For instance, this disclosure is not limited to parts or combinations of the parts referred to in the embodiments, but may be realized using various combinations of the parts. This disclosure may include additional possible arrangements or omissions of the parts in the embodiments. This disclosure may include exchanges of the parts among the embodiments or combinations of the parts in the embodiments. Disclosed technical scopes are not limited to statements in the embodiments. It should be appreciated that the disclosed technical scopes include elements specified in the appended claims, equivalents of the elements, or all possible modifications of the elements without departing from the principle of this disclosure.

While this disclosure has referred to the preferred embodiments, it should be appreciated that the disclosure is not limited to the embodiments. This disclosure may include a variety of combinations of the embodiments, a combination of diverse modifications of the embodiments and equivalents thereof.

What is claimed is:

1. A rotating electrical machine comprising:
a magnetic field-producing unit including a magnet unit which is equipped with a plurality of magnetic poles whose polarities alternate in a circumferential direction of the magnet unit;
an armature which includes a multi-phase armature winding; and
a rotor which is implemented by one of the magnetic field-producing unit and the armature, wherein
the magnet unit includes magnets each of which has a plurality of easy axes of magnetization oriented to extend linearly parallel to each other, the easy axes of magnetization defining a plurality of magnetic paths extending therealong,
the magnets of the magnet unit are discrete from each other through a d-axis defined on a center of the magnetic pole and a q-axis defined on a magnetic boundary between the magnetic poles, and
the magnets of the magnet unit are configured to have a back electromotive force constant which is higher than that of parallel-oriented magnets when an angle of rotation of the rotor lies in a first angle range including a gravity center of the magnets, the parallel-oriented magnets being designed to have magnetic paths which are different from those of the magnets of the magnet unit and oriented along easy axes of magnetization extending linearly parallel to the d-axis.

2. The rotating electrical machine as set forth in claim 1, wherein the magnets are configured to have the back electromotive force constant which has a peak value when the angle of rotation of the rotor matches the gravity center of the magnets of the magnet unit.

3. The rotating electrical machine as set forth in claim 2, wherein each of the magnets has a chamfered corner that is at least one of a first corner which is located close to the q-axis and faces the armature and a second corner which is located close to the d-axis and faces away from the armature, the chamfered corner having a flat surface which extends along the easy axes of magnetization.

4. The rotating electrical machine as set forth in claim 2, wherein each of the magnets has a q-axis facing end surface and a d-axis facing end surface at least one of which is shaped to be flat along the easy axes of magnetization.

5. The rotating electrical machine as set forth in claim 1, wherein each of the magnets has a chamfered corner that is at least one of a first corner which is located close to the q-axis and faces the armature and a second corner which is located close to the d-axis and faces away from the armature, the chamfered corner having a flat surface which extends along the easy axes of magnetization.

6. The rotating electrical machine as set forth in claim 1, wherein each of the magnets has a q-axis facing end surface and a d-axis facing end surface at least one of which is shaped to be flat along the easy axes of magnetization.

7. A rotating electrical machine comprising:
a magnetic field-producing unit including a magnet unit which is equipped with a plurality of magnetic poles whose polarities alternate in a circumferential direction of the magnet unit;
an armature which includes a multi-phase armature winding; and
a rotor which is implemented by one of the magnetic field-producing unit and the armature, wherein
the magnet unit includes magnets each of which has a plurality of easy axes of magnetization oriented to extend linearly parallel to each other, the easy axes of magnetization defining a plurality of magnetic paths extending therealong,
the magnets of the magnet unit are discrete from each other through a d-axis defined on a center of the magnetic pole and a q-axis defined on a magnetic boundary between the magnetic poles, and
the magnets of the magnet unit are configured to have a back electromotive force constant which is higher than that of Halbach array magnets when an angle of rotation of the rotor lies in a second angle range including a gravity center of the magnets, the Halbach array magnets being designed to have magnetic paths different from those in the magnets of the magnet unit.

8. The rotating electrical machine as set forth in claim 7, wherein the magnets are configured to have the back electromotive force constant which has a peak value when the angle of rotation of the rotor matches the gravity center of the magnets of the magnet unit.

9. The rotating electrical machine as set forth in claim 8, wherein each of the magnets has a chamfered corner that is at least one of a first corner which is located close to the q-axis and faces the armature and a second corner which is located close to the d-axis and faces away from the armature, the chamfered corner having a flat surface which extends along the easy axes of magnetization.

10. The rotating electrical machine as set forth in claim 8, wherein each of the magnets has a q-axis facing end surface and a d-axis facing end surface at least one of which is shaped to be flat along the easy axes of magnetization.

11. The rotating electrical machine as set forth in claim 7, wherein each of the magnets has a chamfered corner that is at least one of a first corner which is located close to the q-axis and faces the armature and a second corner which is located close to the d-axis and faces away from the armature, the chamfered corner having a flat surface which extends along the easy axes of magnetization.

12. The rotating electrical machine as set forth in claim 7, wherein each of the magnets has a q-axis facing end surface and a d-axis facing end surface at least one of which is shaped to be flat along the easy axes of magnetization.

13. A rotating electrical machine comprising:
a magnetic field-producing unit including a magnet unit which is equipped with a plurality of magnetic poles whose polarities alternate in a circumferential direction of the magnet unit;
an armature which includes a multi-phase armature winding; and
a rotor which is implemented by one of the magnetic field-producing unit and the armature, wherein
the magnet unit includes magnets each of which has a plurality of easy axes of magnetization oriented to extend linearly parallel to each other, the easy axes of magnetization defining a plurality of magnetic paths extending therealong,
the magnets of the magnet unit are discrete from each other through a d-axis defined on a center of the magnetic pole and a q-axis defined on a magnetic boundary between the magnetic poles, and
each of the easy axes of magnetization of the magnets is oriented to extend parallel to a tangent line, which is a straight line touching a circle at a gravity center of a corresponding one of the magnets, the circle having a center defined (i) on the q-axis and (ii) on a plane extending along an armature facing peripheral surface, which is a peripheral surface of a corresponding one of the magnets that faces the armature.

14. The rotating electrical machine as set forth in claim 13, wherein each of the magnets has a chamfered corner that is at least one of a first corner which is located close to the q-axis and faces the armature and a second corner which is located close to the d-axis and faces away from the armature, the chamfered corner having a flat surface which extends along the easy axes of magnetization.

15. The rotating electrical machine as set forth in claim 13, wherein each of the magnets has a q-axis facing end surface and a d-axis facing end surface at least one of which is shaped to be flat along the easy axes of magnetization.

* * * * *